US012737540B1

(12) United States Patent
Persidsky

(10) Patent No.: US 12,737,540 B1
(45) Date of Patent: Sep. 15, 2026

(54) SYSTEMS AND METHODS FOR IMPROVING AUTOCORRECT ACCURACY BY FUSING KEYSTROKE INPUT WITH REAL-TIME LIP-MOVEMENT CUES AND OPTIONAL WHISPER-LEVEL AUDIO

(71) Applicant: Andre Persidsky, Mill Valley, CA (US)

(72) Inventor: Andre Persidsky, Mill Valley, CA (US)

( * ) Notice: Subject to any disclaimer, the term of this patent is extended or adjusted under 35 U.S.C. 154(b) by 0 days.

(21) Appl. No.: 19/679,685

(22) Filed: May 17, 2026

Related U.S. Application Data

(60) Provisional application No. 63/921,290, filed on Nov. 20, 2025, provisional application No. 63/808,665, filed on May 20, 2025.

(51) Int. Cl.
*G06F 40/232* (2020.01)
*G06F 40/166* (2020.01)
*G10L 15/25* (2013.01)

(52) U.S. Cl.
CPC .......... *G06F 40/232* (2020.01); *G06F 40/166* (2020.01); *G10L 15/25* (2013.01)

(58) Field of Classification Search
CPC ....... G06F 40/232; G06F 40/166; G10L 15/25
See application file for complete search history.

(56) References Cited

U.S. PATENT DOCUMENTS 5,502,774 A 3/1996 Bellegarda et al.
5,855,000 A 12/1998 Waibel et al.
(Continued)

FOREIGN PATENT DOCUMENTS

EP 4343499 A2 3/2024

OTHER PUBLICATIONS

Sun, Ke; Yu, Chun; Shi, Weinan; Liu, Lan; Shi, Yuanchun, "Lip-Interact: Improving Mobile Device Interaction with Silent Speech Commands," Proceedings of the 31st Annual ACM Symposium on User Interface Software and Technology (UIST 2018), ACM, New York, NY, USA, pp. 581-593, Oct. 2018, DOI: 10.1145/3242587.3242599.

(Continued)

*Primary Examiner* — Tadesse Hailu

(57) ABSTRACT

A text-entry correction system improves autocorrect accuracy by combining typed input with mouth-region visual evidence and, optionally, whisper-level audio evidence. A typed string is processed through an autocorrect or spell-correction pipeline to obtain or generate candidate text strings. Lip-movement evidence captured by an imaging sensor during or in association with text entry is converted into visual speech cues, such as syllable counts, viseme sequences, mouth-shape cues, or learned visual embeddings, and used to compute candidate-specific visual compatibility scores. The system may rerank text-origin candidates, retrieve or inject candidates absent from a standard autocorrect list, operate with any subset of typed, visual, and optional audio channels without explicit mode switching, or generate orthographic proxy strings for submission to an existing spell-correction engine. Fused scores and confidence rules are used to suggest, preview, reorder, or automatically insert correction results while supporting on-device processing, privacy controls, and fallback to text-only correction.

30 Claims, 22 Drawing Sheets

(56) References Cited

U.S. PATENT DOCUMENTS

| | | | | |
|---|---|---|---|---|
| 7,587,318 | B2 | 9/2009 | Seshadri | |
| 7,720,682 | B2 | 5/2010 | Stephanick et al. | |
| 7,881,936 | B2 | 2/2011 | Longe et al. | |
| 8,719,014 | B2 | 5/2014 | Wagner | |
| 8,994,660 | B2 | 3/2015 | Neels et al. | |
| 12,254,882 | B2 | 3/2025 | Maizels et al. | |
| 2007/0100619 | A1 | 5/2007 | Purho | |
| 2008/0141125 | A1 | 6/2008 | Ghassabian | |
| 2021/0035585 | A1* | 2/2021 | Gupta | G10L 15/26 |
| 2021/0327431 | A1* | 10/2021 | Stewart | G06V 40/45 |
| 2023/0290332 | A1* | 9/2023 | Jawahar | G09B 21/009 |
| 2025/0266045 | A1 | 8/2025 | Maizels et al. | |
| 2025/0273203 | A1* | 8/2025 | Rekimoto | G06N 3/08 |

OTHER PUBLICATIONS

Pandey, Laxmi; Arif, Ahmed Sabbir, "LipType: A Silent Speech Recognizer Augmented with an Independent Repair Model," Proceedings of the 2021 CHI Conference on Human Factors in Computing Systems (CHI 2021), ACM, New York, NY, USA, Article 1, pp. 1-19, May 2021, DOI: 10.1145/3411764.3445565.

Su, Zixiong; Fang, Shitao; Rekimoto, Jun, "LipLearner: Customizable Silent Speech Interactions on Mobile Devices," Proceedings of the 2023 CHI Conference on Human Factors in Computing Systems (CHI 2023), ACM, New York, NY, USA, Article 696, pp. 1-21, Apr. 2023, DOI: 10.1145/3544548.3581465.

Pandey, Laxmi; Arif, Ahmed Sabbir, "Melder: The Design and Evaluation of a Real-time Silent Speech Recognizer for Mobile Devices," Proceedings of the 2024 CHI Conference on Human Factors in Computing Systems (CHI 2024), ACM, New York, NY, USA, Article 320, pp. 1-23, May 2024, DOI: 10.1145/3613904.3642348.

Wang, Xue; Su, Zixiong; Rekimoto, Jun; Zhang, Yang, "Watch Your Mouth: Silent Speech Recognition with Depth Sensing," Proceedings of the 2024 CHI Conference on Human Factors in Computing Systems (CHI 2024), ACM, New York, NY, USA, Article 323, pp. 1-15, May 2024, DOI: 10.1145/3613904.3642092.

Thomas, Marshall; Fish, Edward; Bowden, Richard, "VALLR: Visual ASR Language Model for Lip Reading," arXiv preprint arXiv:2503.21408, Mar. 2025.

Su, Zixiong; Fang, Shitao; Rekimoto, Jun, "Multimodal Silent Speech-based Text Entry with Word-initials Conditioned LLM," Proceedings of the 7th ACM Conference on Conversational User Interfaces (CUI 2025), ACM, New York, NY, USA, Article 68, pp. 1-14, Jul. 2025, DOI: 10.1145/3719160.3736612.

* cited by examiner

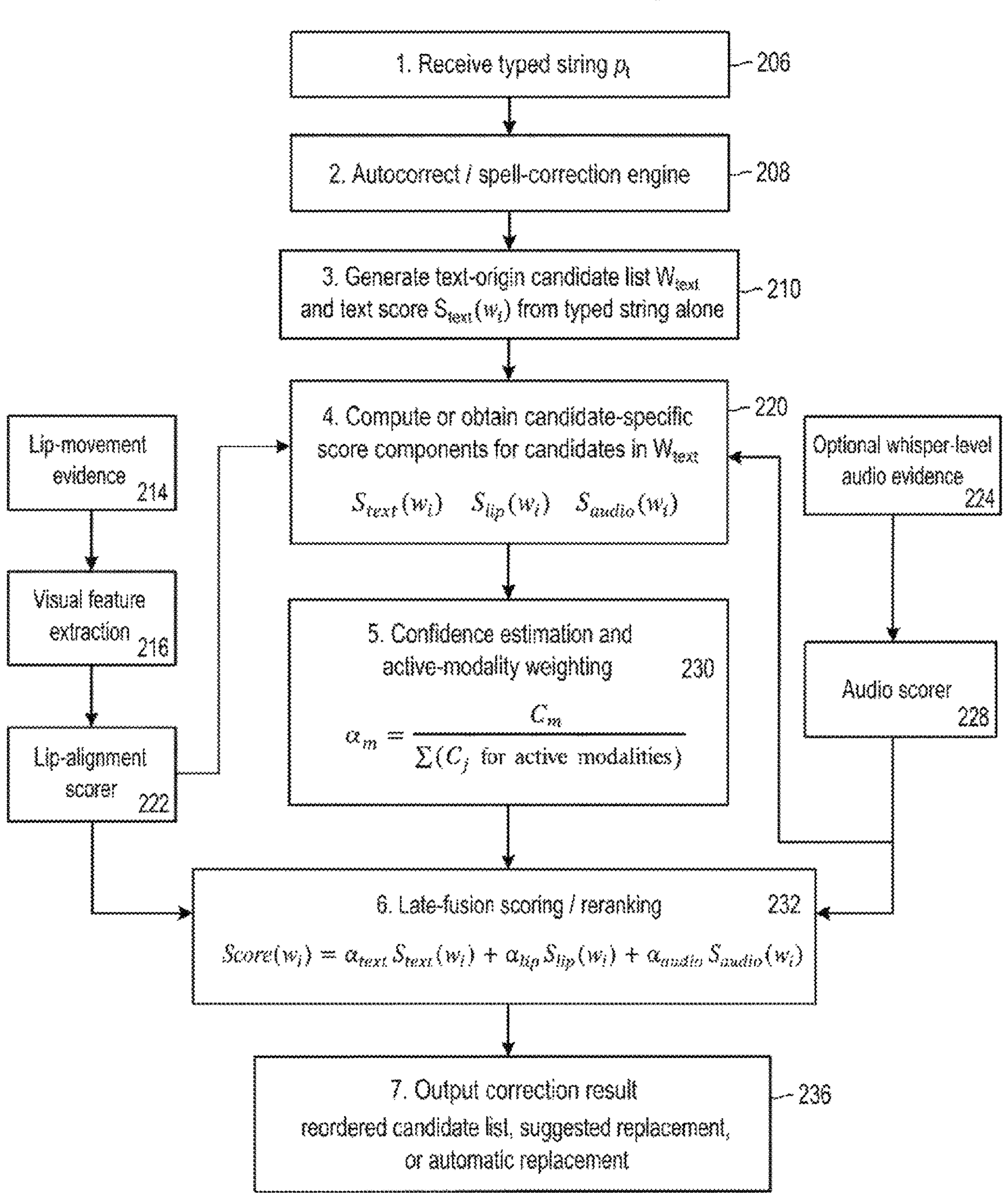
FIG. 2
Mode A late-fusion reranking
1. Receive typed string $p_t$
206
2. Autocorrect / spell-correction engine
208
3. Generate text-origin candidate list $W_{text}$ and text score $S_{text}(w_i)$ from typed string alone
210
4. Compute or obtain candidate-specific score components for candidates in $W_{text}$
$S_{text}(w_i)$ $S_{lip}(w_i)$ $S_{audio}(w_i)$
220
Lip-movement evidence
214
Visual feature extraction
216
Lip-alignment scorer
222
Optional whisper-level audio evidence
224
Audio scorer
228
5. Confidence estimation and active-modality weighting
230
$\alpha_m = \frac{C_m}{\sum(C_j \text{ for active modalities})}$
6. Late-fusion scoring / reranking
232
$Score(w_i) = \alpha_{text} S_{text}(w_i) + \alpha_{lip} S_{lip}(w_i) + \alpha_{audio} S_{audio}(w_i)$
7. Output correction result
reordered candidate list, suggested replacement, or automatic replacement
236

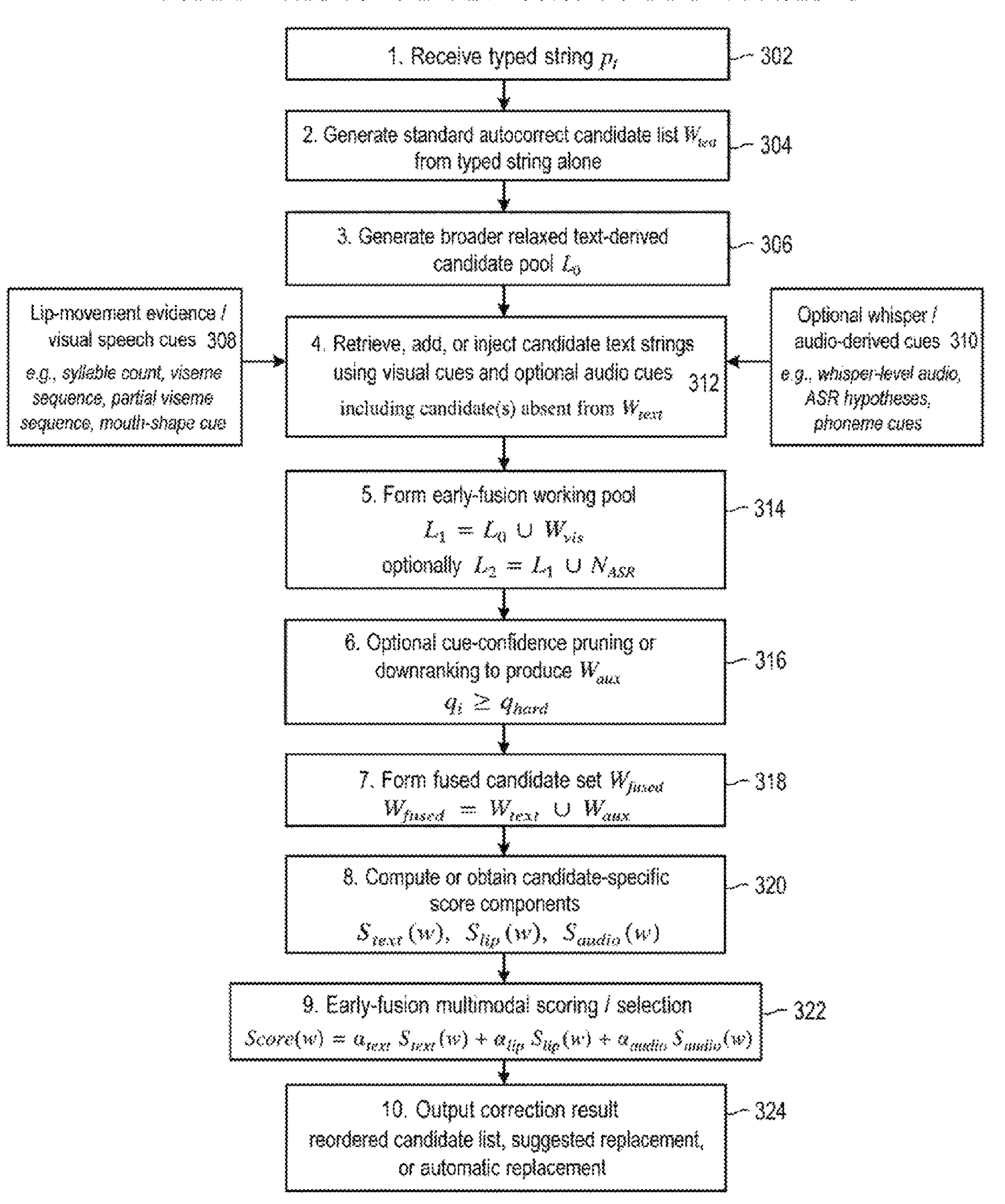
FIG. 3
MODE B-1: HEURISTIC EARLY FUSION / CANDIDATE INJECTION
1. Receive typed string $p_t$
302
2. Generate standard autocorrect candidate list $W_{text}$ from typed string alone
304
3. Generate broader relaxed text-derived candidate pool $L_0$
306
Lip-movement evidence / visual speech cues 308
e.g., syllable count, viseme sequence, partial viseme sequence, mouth-shape cue
4. Retrieve, add, or inject candidate text strings using visual cues and optional audio cues including candidate(s) absent from $W_{text}$
312
Optional whisper / audio-derived cues 310
e.g., whisper-level audio, ASR hypotheses, phoneme cues
5. Form early-fusion working pool
$L_1 = L_0 \cup W_{vis}$
optionally $L_2 = L_1 \cup N_{ASR}$
314
6. Optional cue-confidence pruning or downranking to produce $W_{aux}$
$q_i \geq q_{hard}$
316
7. Form fused candidate set $W_{fused}$
$W_{fused} = W_{text} \cup W_{aux}$
318
8. Compute or obtain candidate-specific score components
$S_{text}(w)$, $S_{lip}(w)$, $S_{audio}(w)$
320
9. Early-fusion multimodal scoring / selection
$Score(w) = \alpha_{text} S_{text}(w) + \alpha_{lip} S_{lip}(w) + \alpha_{audio} S_{audio}(w)$
322
10. Output correction result
reordered candidate list, suggested replacement, or automatic replacement
324

MODE B-2: NEURAL EARLY FUSION

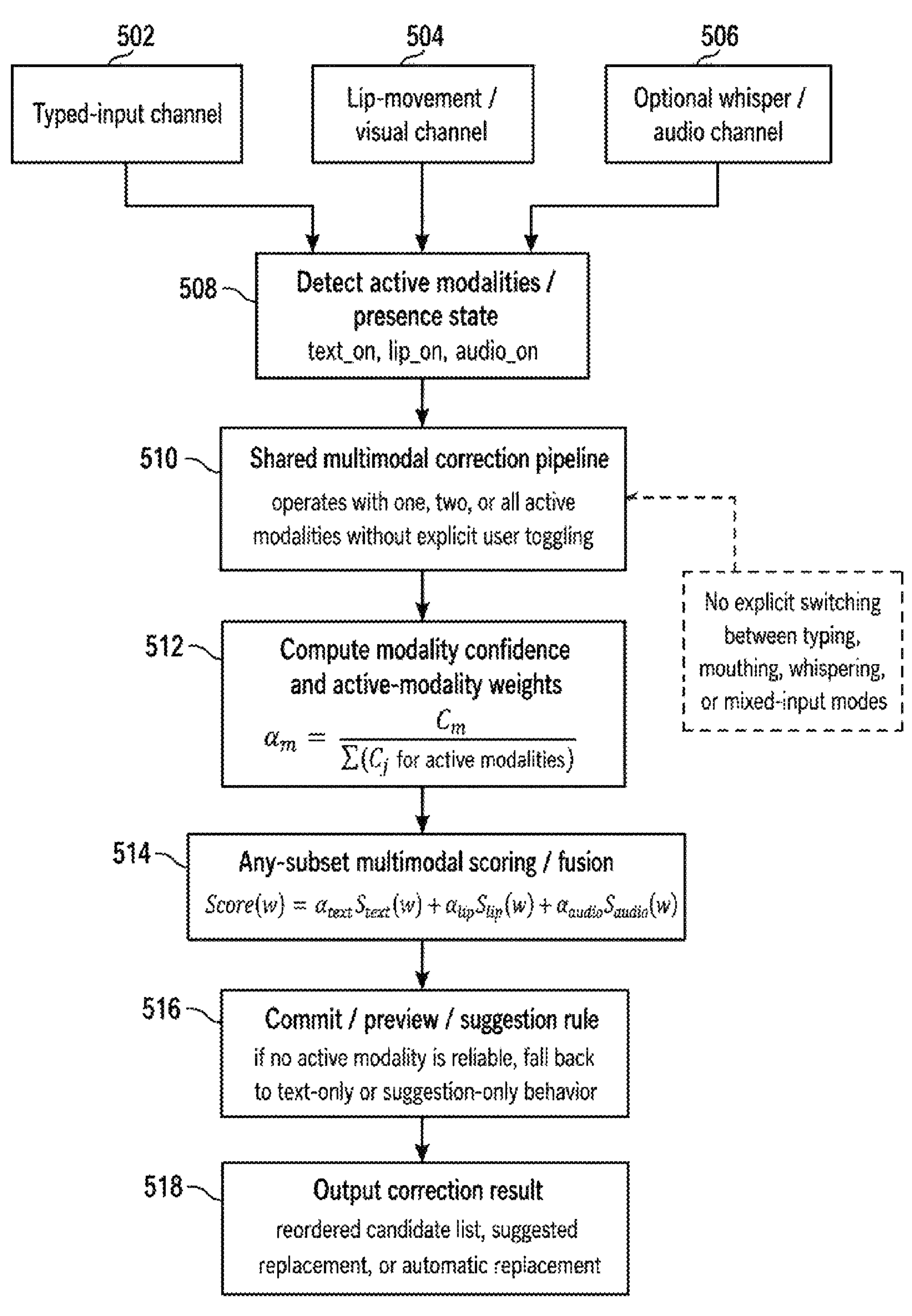
FIG. 5
MODE C: SEAMLESS MULTIMODAL / ANY-SUBSET OPERATION
502
Typed-input channel
504
Lip-movement / visual channel
506
Optional whisper / audio channel
508
Detect active modalities / presence state
text_on, lip_on, audio_on
510
Shared multimodal correction pipeline
operates with one, two, or all active modalities without explicit user toggling
No explicit switching between typing, mouthing, whispering, or mixed-input modes
512
Compute modality confidence and active-modality weights
$\alpha_m = \frac{C_m}{\sum(C_j \text{ for active modalities})}$
514
Any-subset multimodal scoring / fusion
$Score(w) = \alpha_{text} S_{text}(w) + \alpha_{lip} S_{lip}(w) + \alpha_{audio} S_{audio}(w)$
516
Commit / preview / suggestion rule
if no active modality is reliable, fall back to text-only or suggestion-only behavior
518
Output correction result
reordered candidate list, suggested replacement, or automatic replacement

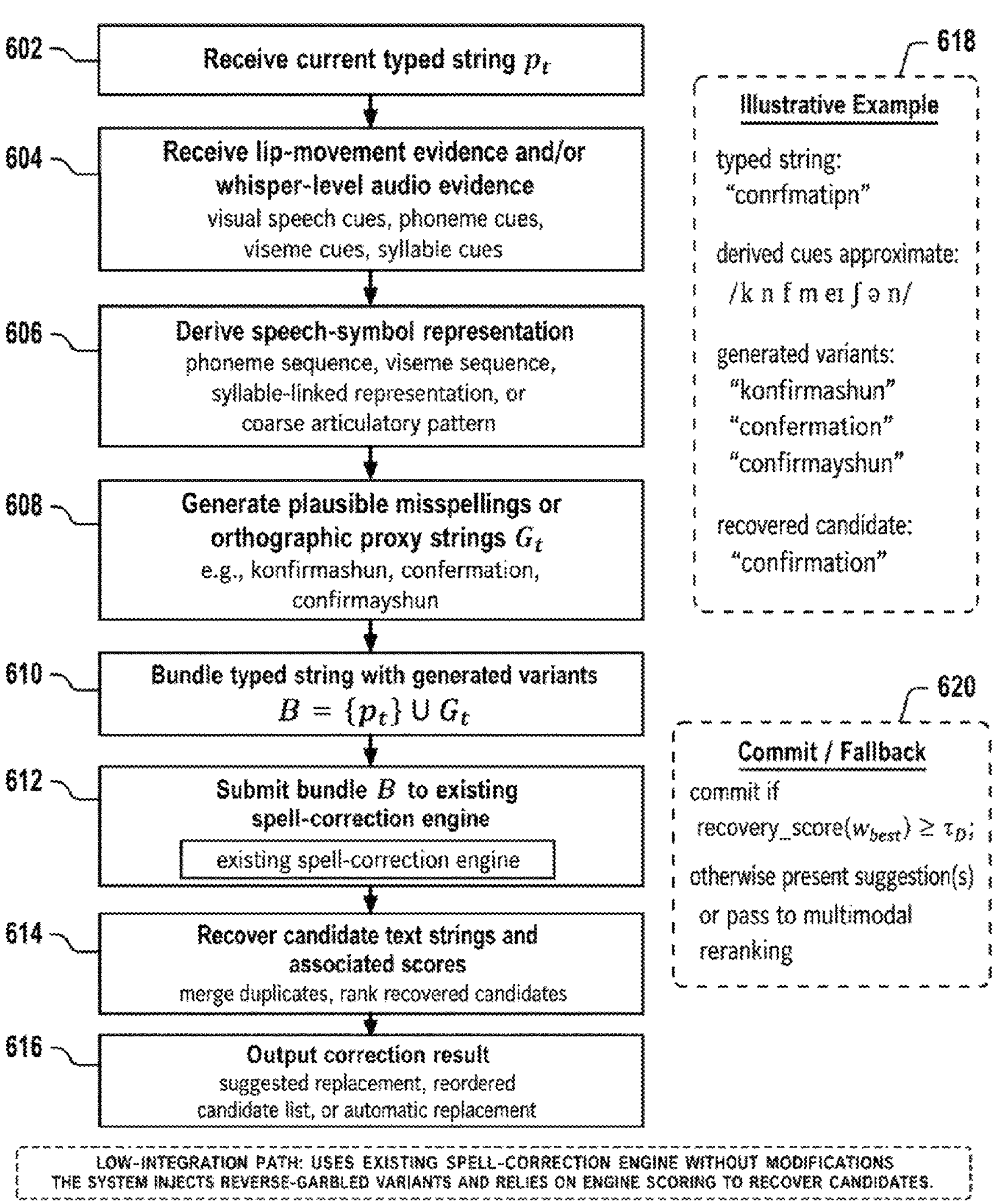
FIG. 6
MODE D — REVERSE-GARBLED INJECTION USING PLAUSIBLE MISSPELLINGS OR ORTHOGRAPHIC PROXY STRINGS
602
Receive current typed string $p_t$
604
Receive lip-movement evidence and/or whisper-level audio evidence
visual speech cues, phoneme cues, viseme cues, syllable cues
606
Derive speech-symbol representation
phoneme sequence, viseme sequence, syllable-linked representation, or coarse articulatory pattern
608
Generate plausible misspellings or orthographic proxy strings $G_t$
e.g., konfirmashun, confermation, confirmayshun
610
Bundle typed string with generated variants
$B = \{p_t\} \cup G_t$
612
Submit bundle $B$ to existing spell-correction engine
existing spell-correction engine
614
Recover candidate text strings and associated scores
merge duplicates, rank recovered candidates
616
Output correction result
suggested replacement, reordered candidate list, or automatic replacement
618
Illustrative Example
typed string:
"conrfmatipn"
derived cues approximate:
/k n f m eɪ ʃ ə n/
generated variants:
"konfirmashun"
"confermation"
"confirmayshun"
recovered candidate:
"confirmation"
620
Commit / Fallback
commit if
recovery_score($w_{best}$) ≥ $\tau_D$;
otherwise present suggestion(s) or pass to multimodal reranking
LOW-INTEGRATION PATH: USES EXISTING SPELL-CORRECTION ENGINE WITHOUT MODIFICATIONS
THE SYSTEM INJECTS REVERSE-GARBLED VARIANTS AND RELIES ON ENGINE SCORING TO RECOVER CANDIDATES.

CALIBRATION AND LIVE VISEME FEEDBACK INTERFACE

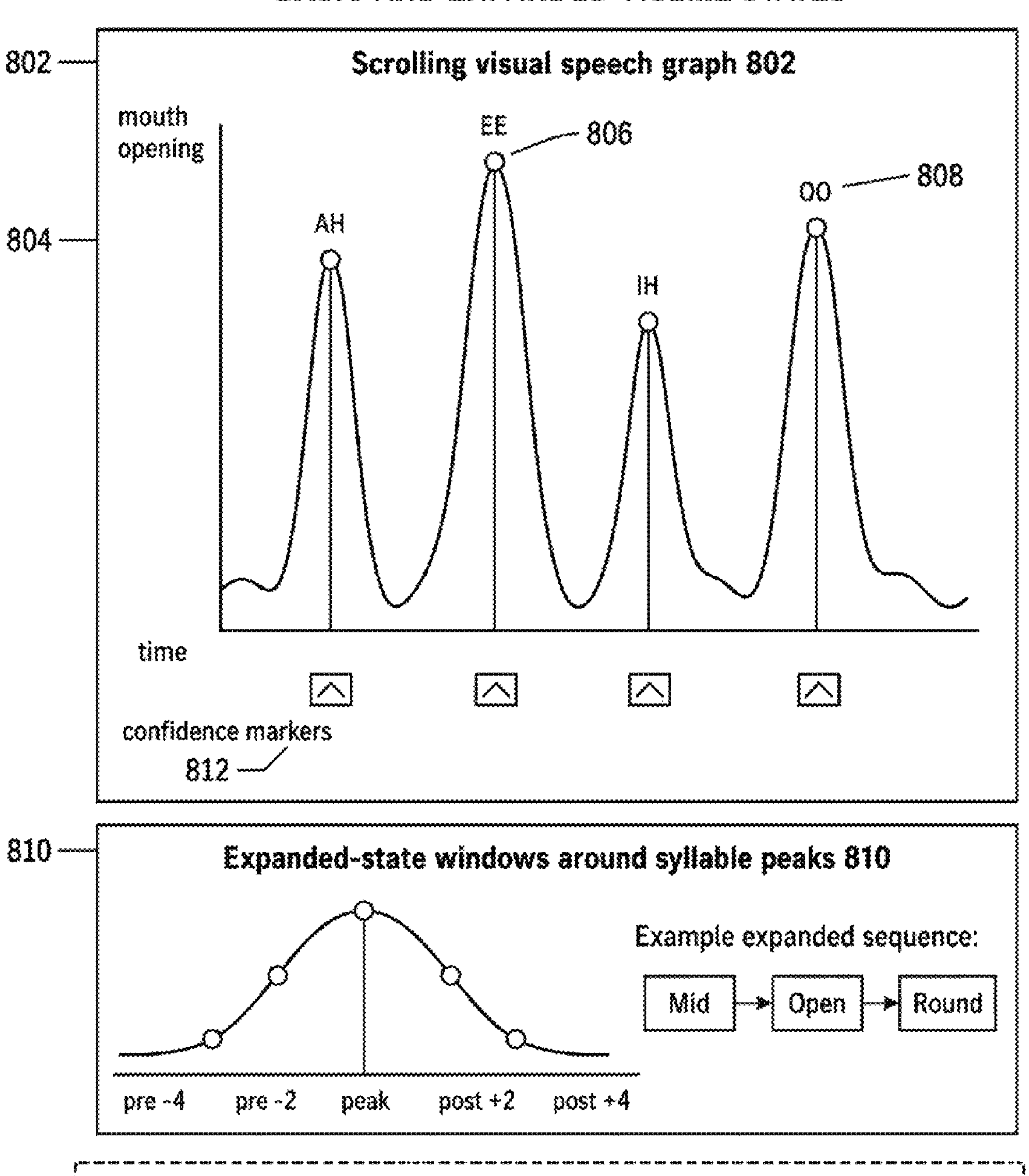
FIG. 8
REAL-TIME VISUAL SPEECH GRAPH WITH BASIC AND EXPANDED VISEME STATES
802
Scrolling visual speech graph 802
mouth opening
804
AH
EE
806
IH
OO
808
time
confidence markers
812
810
Expanded-state windows around syllable peaks 810
pre -4
pre -2
peak
post +2
post +4
Example expanded sequence:
Mid
Open
Round
Normalized mouth-opening signal:
dev_norm = (current_mouth_height − closed_centroid_height) / (open_centroid_height − closed_centroid_height)

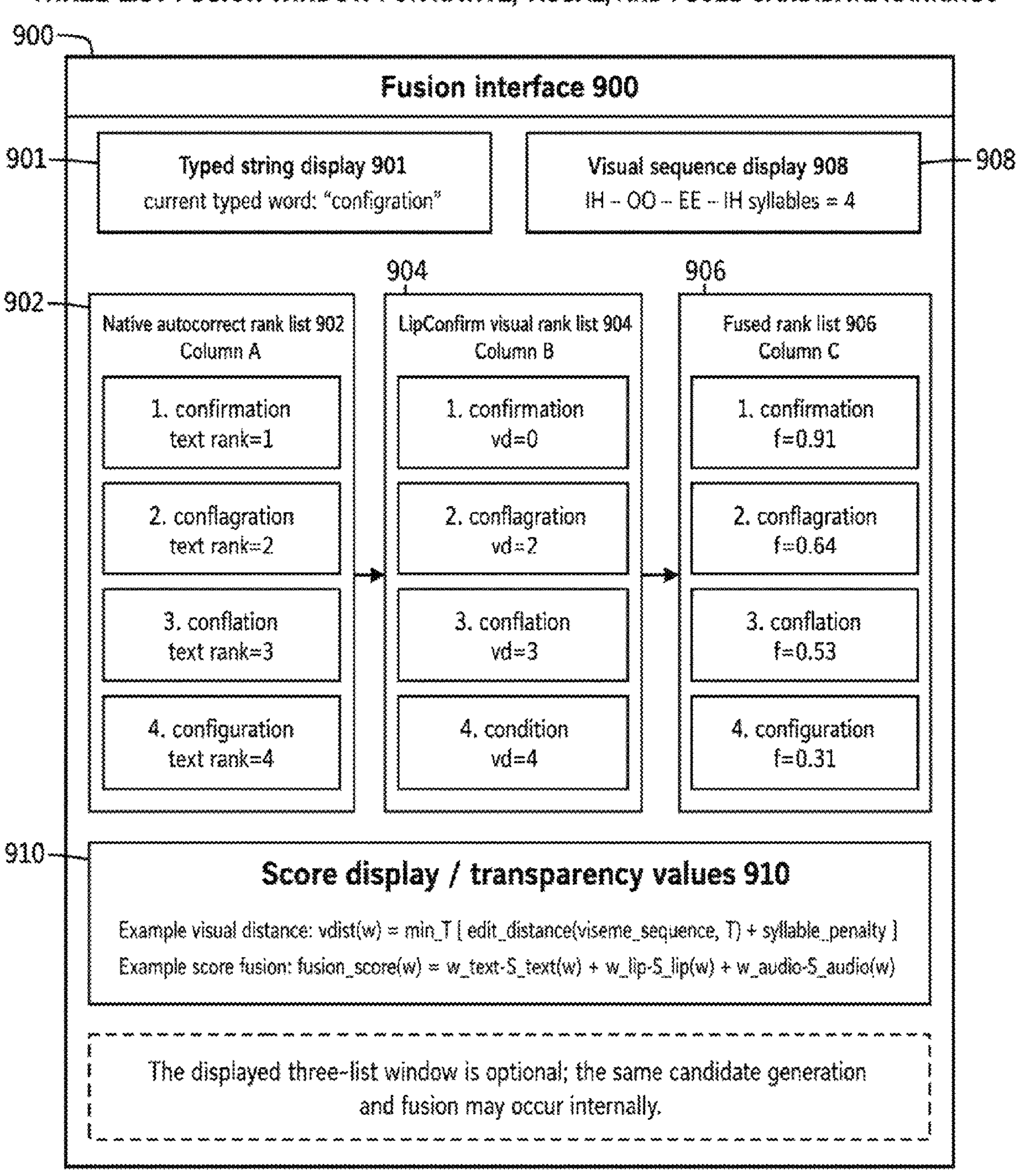
FIG. 9
THREE-LIST FUSION WINDOW FOR NATIVE, VISUAL, AND FUSED CANDIDATE RANKINGS
900
Fusion interface 900
901
Typed string display 901
current typed word: "configration"
Visual sequence display 908
IH – OO – EE – IH syllables = 4
908
904
906
902
Native autocorrect rank list 902
Column A
1. confirmation
text rank=1
2. conflagration
text rank=2
3. conflation
text rank=3
4. configuration
text rank=4
LipConfirm visual rank list 904
Column B
1. confirmation
vd=0
2. conflagration
vd=2
3. conflation
vd=3
4. condition
vd=4
Fused rank list 906
Column C
1. confirmation
f=0.91
2. conflagration
f=0.64
3. conflation
f=0.53
4. configuration
f=0.31
910
Score display / transparency values 910
Example visual distance: vdist(w) = min_T [ edit_distance(viseme_sequence, T) + syllable_penalty ]
Example score fusion: fusion_score(w) = w_text-S_text(w) + w_lip-S_lip(w) + w_audio-S_audio(w)
The displayed three-list window is optional; the same candidate generation and fusion may occur internally.

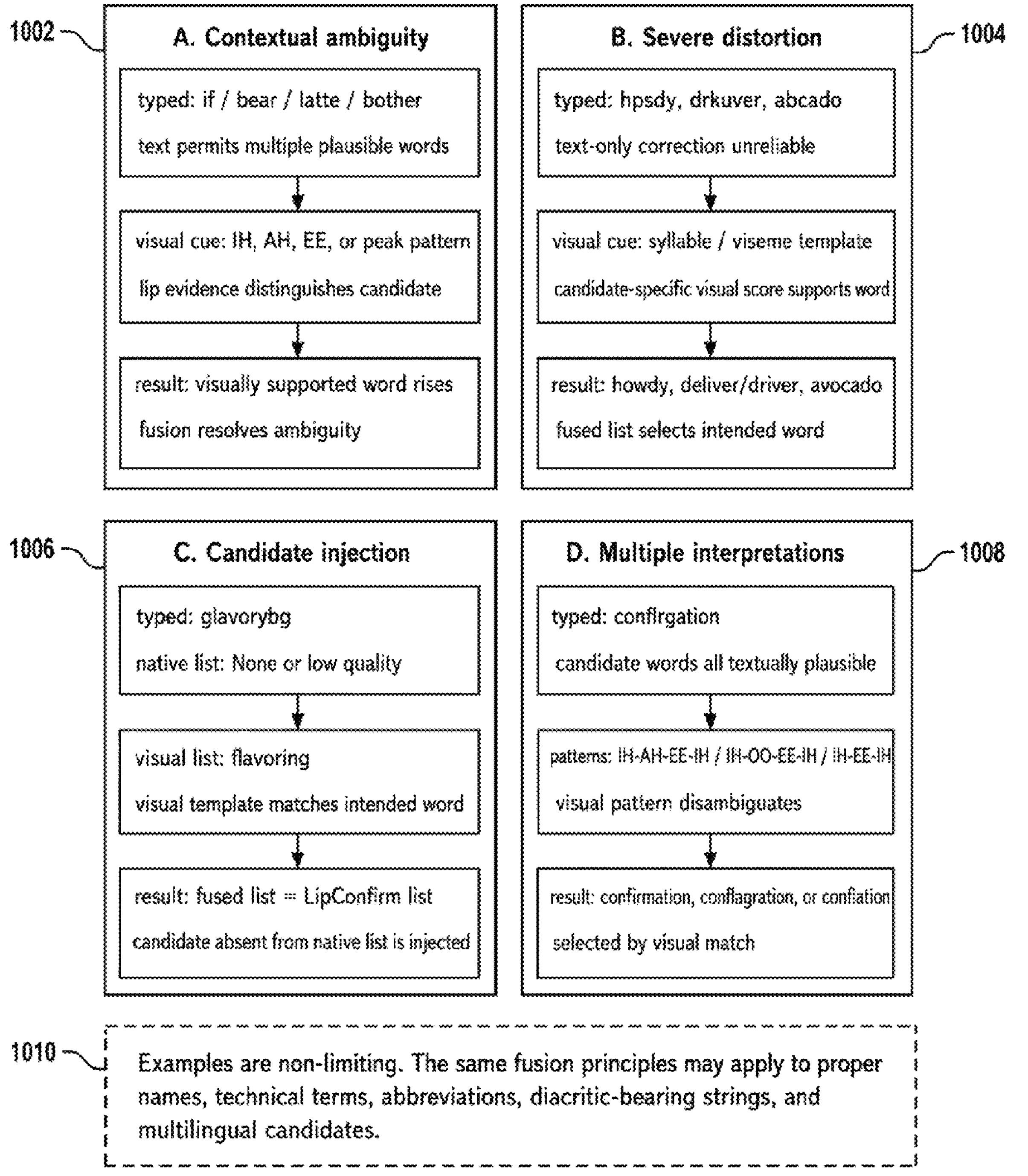
FIG. 10
REPRESENTATIVE FUSION EXAMPLES
1002
A. Contextual ambiguity
typed: if / bear / latte / bother
text permits multiple plausible words
visual cue: IH, AH, EE, or peak pattern
lip evidence distinguishes candidate
result: visually supported word rises
fusion resolves ambiguity
1004
B. Severe distortion
typed: hpsdy, drkuver, abcado
text-only correction unreliable
visual cue: syllable / viseme template
candidate-specific visual score supports word
result: howdy, deliver/driver, avocado
fused list selects intended word
1006
C. Candidate injection
typed: glavorybg
native list: None or low quality
visual list: flavoring
visual template matches intended word
result: fused list = LipConfirm list
candidate absent from native list is injected
1008
D. Multiple interpretations
typed: confirgation
candidate words all textually plausible
patterns: IH-AH-EE-IH / IH-OO-EE-IH / IH-EE-IH
visual pattern disambiguates
result: confirmation, conflagration, or confiation
selected by visual match
1010
Examples are non-limiting. The same fusion principles may apply to proper names, technical terms, abbreviations, diacritic-bearing strings, and multilingual candidates.

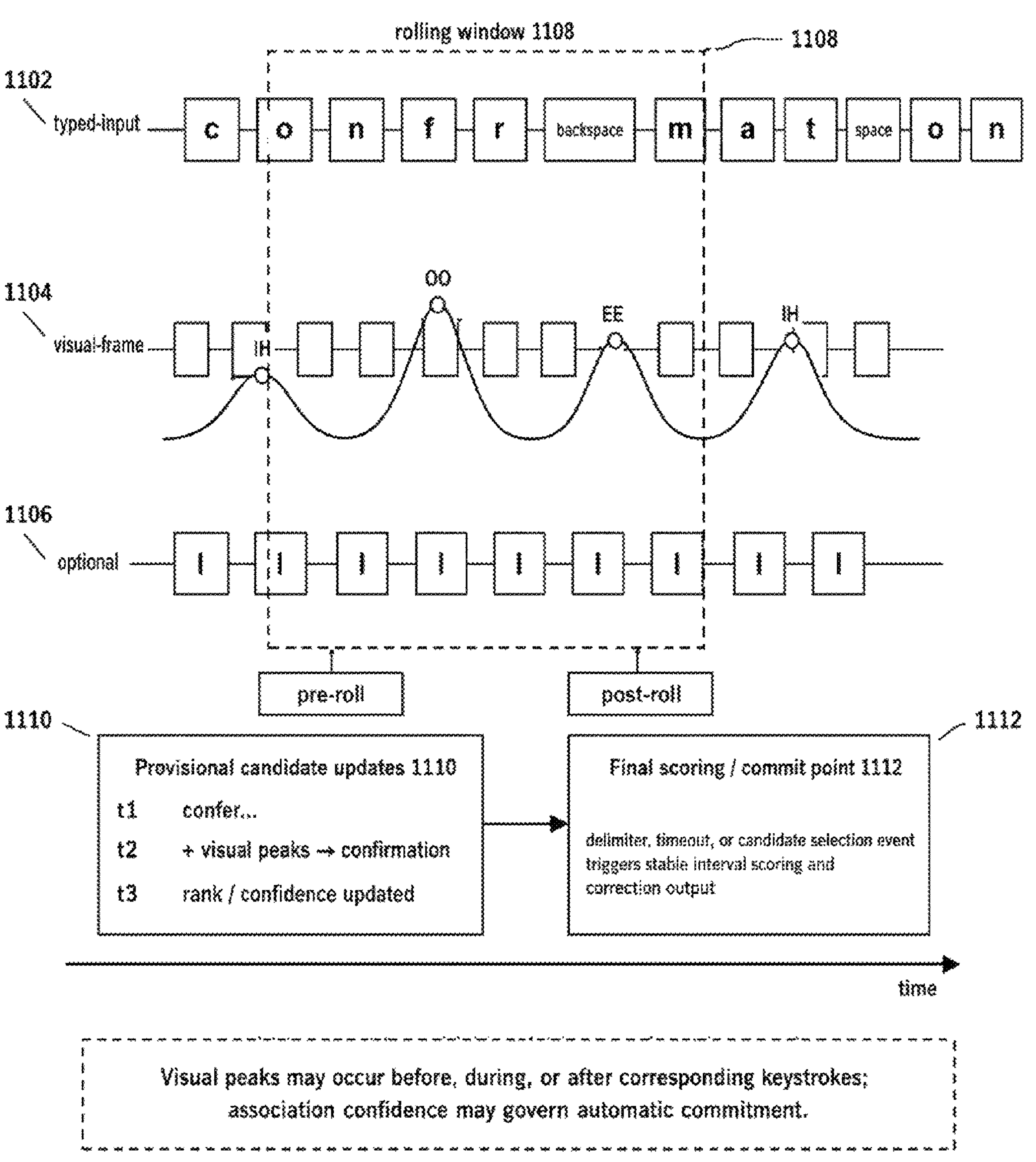
FIG. 11
CONCURRENT TYPING AND VISUAL EVIDENCE CAPTURE WITH ROLLING CANDIDATE UPDATES
rolling window 1108
1108
1102
typed-input
c
o
n
f
r
backspace
m
a
t
space
o
n
1104
visual-frame
OO
IH
EE
IH
1106
optional
pre-roll
post-roll
1110
1112
Provisional candidate updates 1110
t1 confer...
t2 + visual peaks → confirmation
t3 rank / confidence updated
Final scoring / commit point 1112
delimiter, timeout, or candidate selection event triggers stable interval scoring and correction output
time
Visual peaks may occur before, during, or after corresponding keystrokes; association confidence may govern automatic commitment.

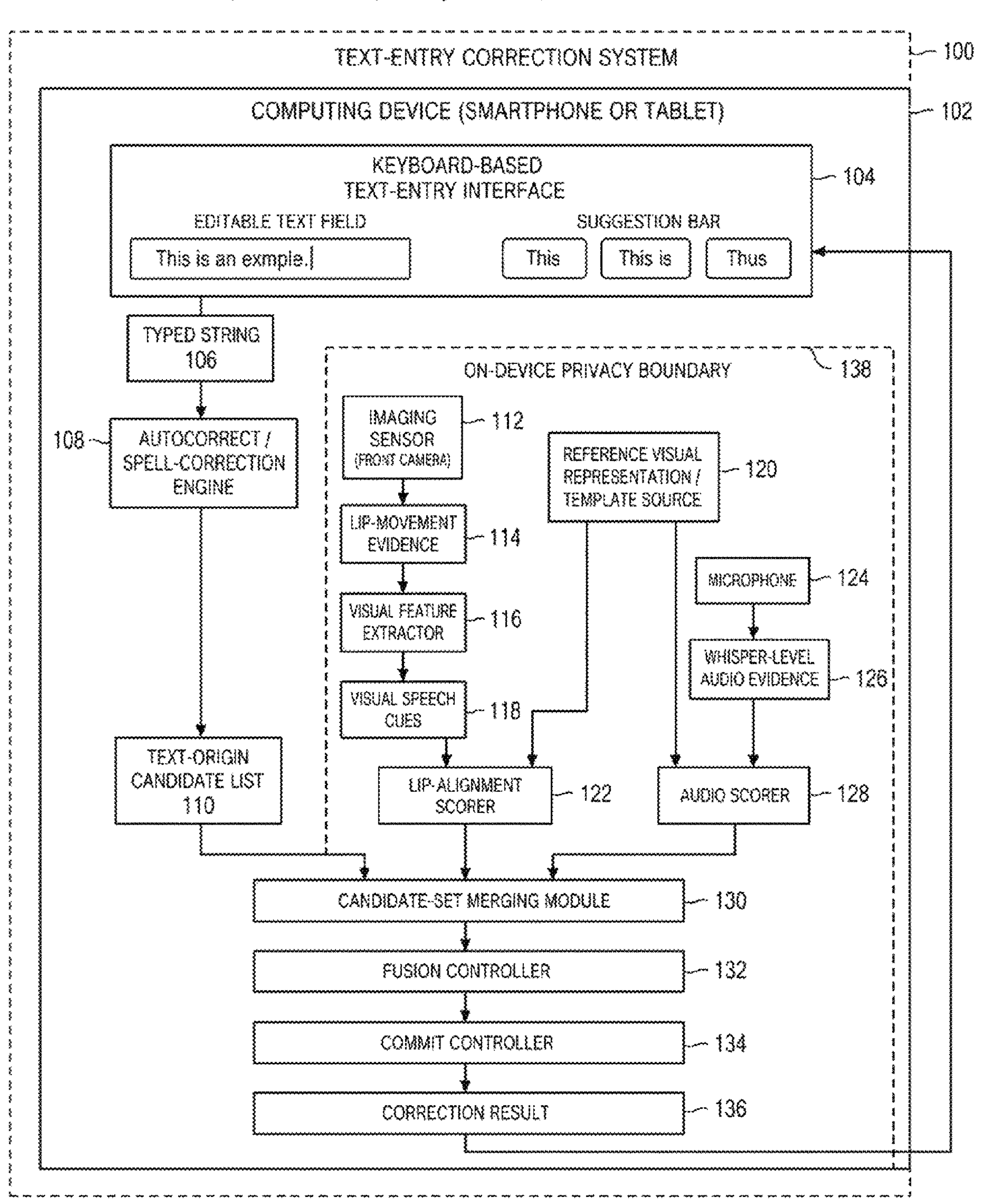
FIG. 12
OVERALL SYSTEM / PLATFORM ARCHITECTURE
TEXT-ENTRY CORRECTION SYSTEM
100
COMPUTING DEVICE (SMARTPHONE OR TABLET)
102
KEYBOARD-BASED TEXT-ENTRY INTERFACE
104
EDITABLE TEXT FIELD
This is an exmple.
SUGGESTION BAR
This
This is
Thus
TYPED STRING 106
ON-DEVICE PRIVACY BOUNDARY
138
108
AUTOCORRECT / SPELL-CORRECTION ENGINE
IMAGING SENSOR (FRONT CAMERA)
112
REFERENCE VISUAL REPRESENTATION / TEMPLATE SOURCE
120
LIP-MOVEMENT EVIDENCE
114
MICROPHONE
124
VISUAL FEATURE EXTRACTOR
116
WHISPER-LEVEL AUDIO EVIDENCE
126
VISUAL SPEECH CUES
118
TEXT-ORIGIN CANDIDATE LIST 110
LIP-ALIGNMENT SCORER
122
AUDIO SCORER
128
CANDIDATE-SET MERGING MODULE
130
FUSION CONTROLLER
132
COMMIT CONTROLLER
134
CORRECTION RESULT
136

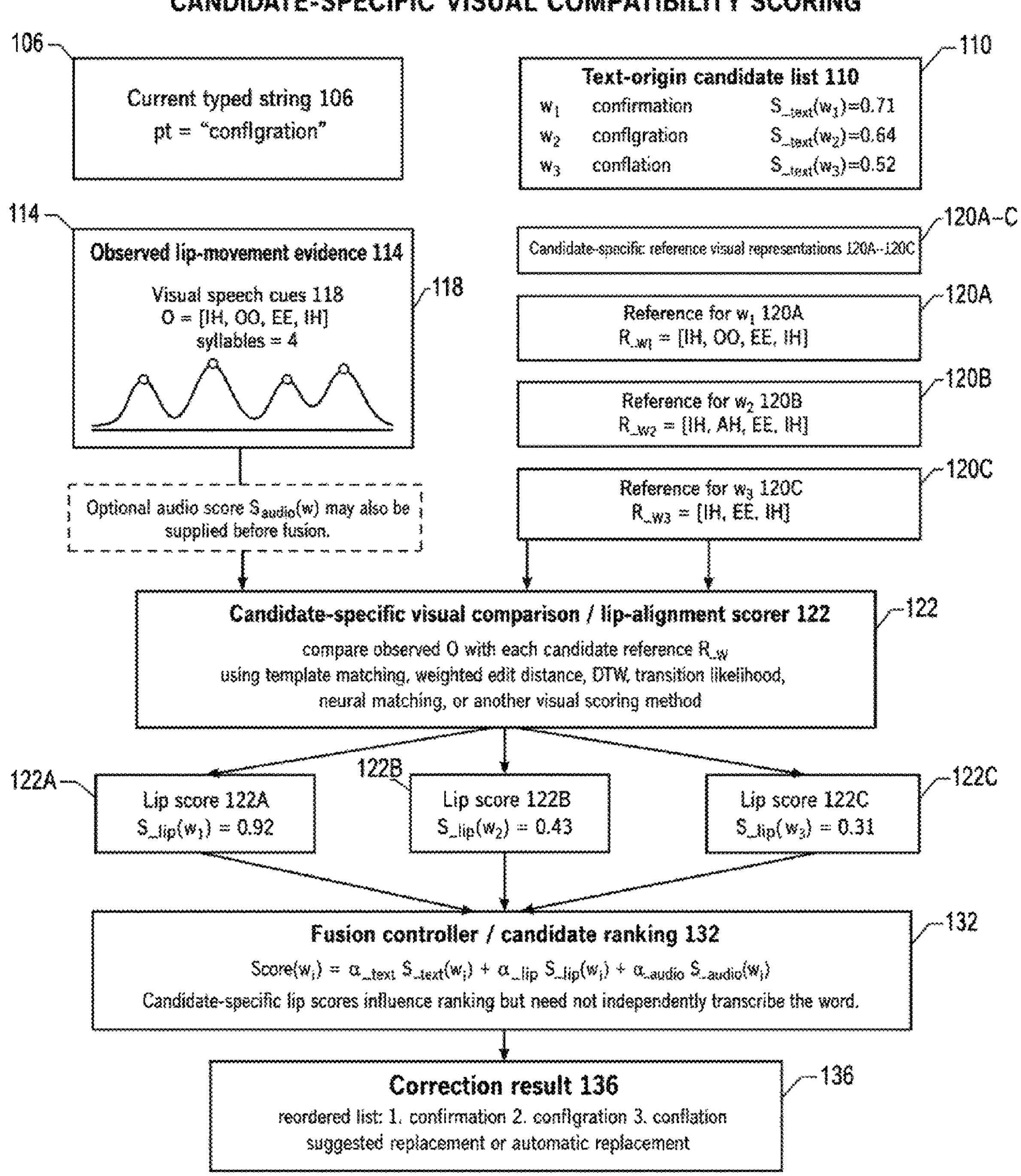
FIG. 13
CANDIDATE-SPECIFIC VISUAL COMPATIBILITY SCORING
106
Current typed string 106
pt = "conflgration"
110
Text-origin candidate list 110
w1 confirmation S_text(w1)=0.71
w2 conflgration S_text(w2)=0.64
w3 conflation S_text(w3)=0.52
114
Observed lip-movement evidence 114
Visual speech cues 118
O = [IH, OO, EE, IH]
syllables = 4
118
120A~C
Candidate-specific reference visual representations 120A~120C
120A
Reference for w1 120A
R_w1 = [IH, OO, EE, IH]
120B
Reference for w2 120B
R_w2 = [IH, AH, EE, IH]
120C
Reference for w3 120C
R_w3 = [IH, EE, IH]
Optional audio score S_audio(w) may also be supplied before fusion.
122
Candidate-specific visual comparison / lip-alignment scorer 122
compare observed O with each candidate reference R_w
using template matching, weighted edit distance, DTW, transition likelihood, neural matching, or another visual scoring method
122A
Lip score 122A
S_lip(w1) = 0.92
122B
Lip score 122B
S_lip(w2) = 0.43
122C
Lip score 122C
S_lip(w3) = 0.31
132
Fusion controller / candidate ranking 132
Score(wi) = α_text S_text(wi) + α_lip S_lip(wi) + α_audio S_audio(wi)
Candidate-specific lip scores influence ranking but need not independently transcribe the word.
136
Correction result 136
reordered list: 1. confirmation 2. conflgration 3. conflation
suggested replacement or automatic replacement

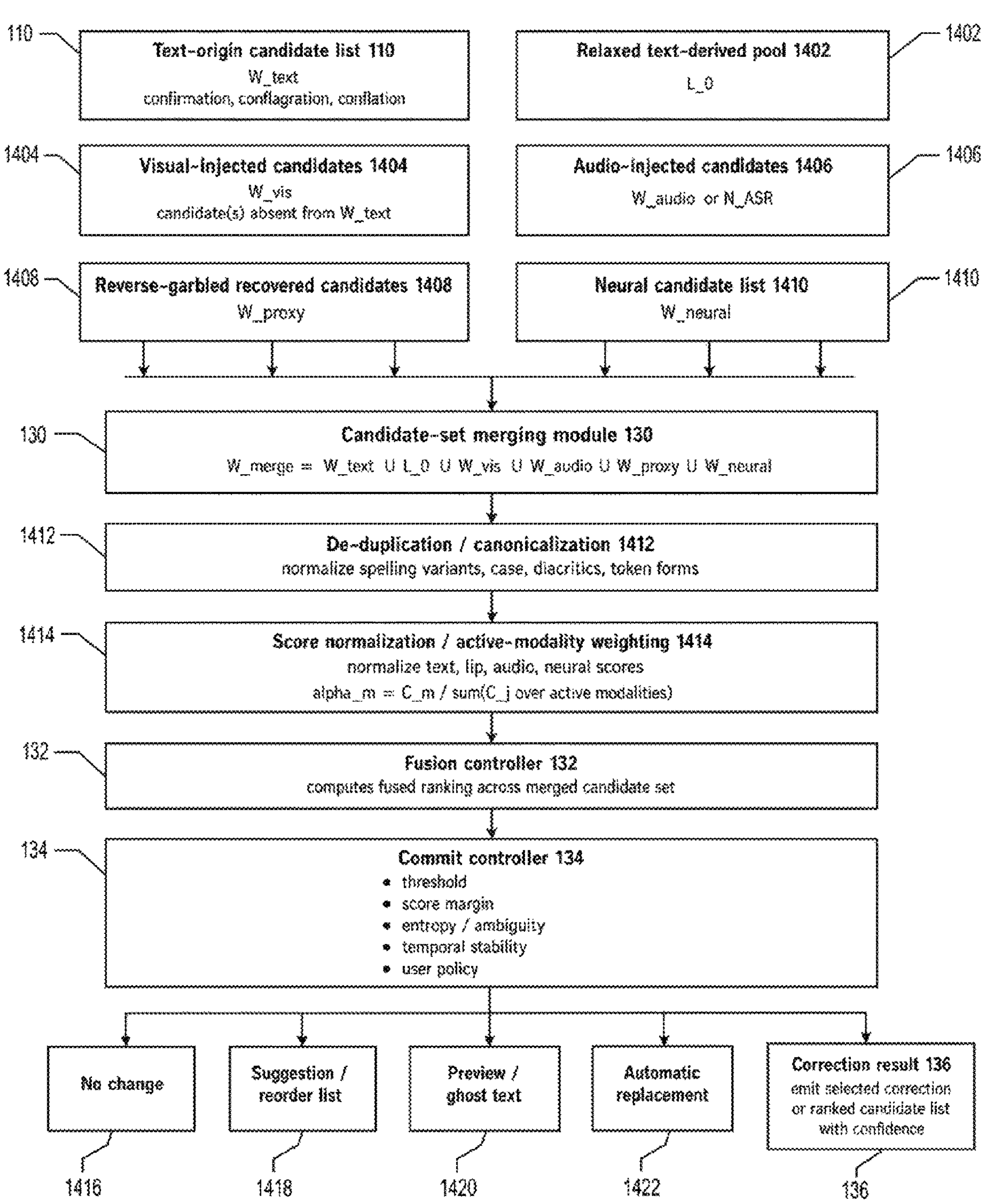
FIG. 14
CANDIDATE-SET MERGING AND COMMIT CONTROLLER
110
Text-origin candidate list 110
W_text
confirmation, conflagration, conflation
1402
Relaxed text-derived pool 1402
L_0
1404
Visual-injected candidates 1404
W_vis
candidate(s) absent from W_text
1406
Audio-injected candidates 1406
W_audio or N_ASR
1408
Reverse-garbled recovered candidates 1408
W_proxy
1410
Neural candidate list 1410
W_neural
130
Candidate-set merging module 130
W_merge = W_text ∪ L_0 ∪ W_vis ∪ W_audio ∪ W_proxy ∪ W_neural
1412
De-duplication / canonicalization 1412
normalize spelling variants, case, diacritics, token forms
1414
Score normalization / active-modality weighting 1414
normalize text, lip, audio, neural scores
alpha_m = C_m / sum(C_j over active modalities)
132
Fusion controller 132
computes fused ranking across merged candidate set
134
Commit controller 134
threshold
score margin
entropy / ambiguity
temporal stability
user policy
No change
Suggestion / reorder list
Preview / ghost text
Automatic replacement
Correction result 136
emit selected correction or ranked candidate list with confidence
1416
1418
1420
1422
136

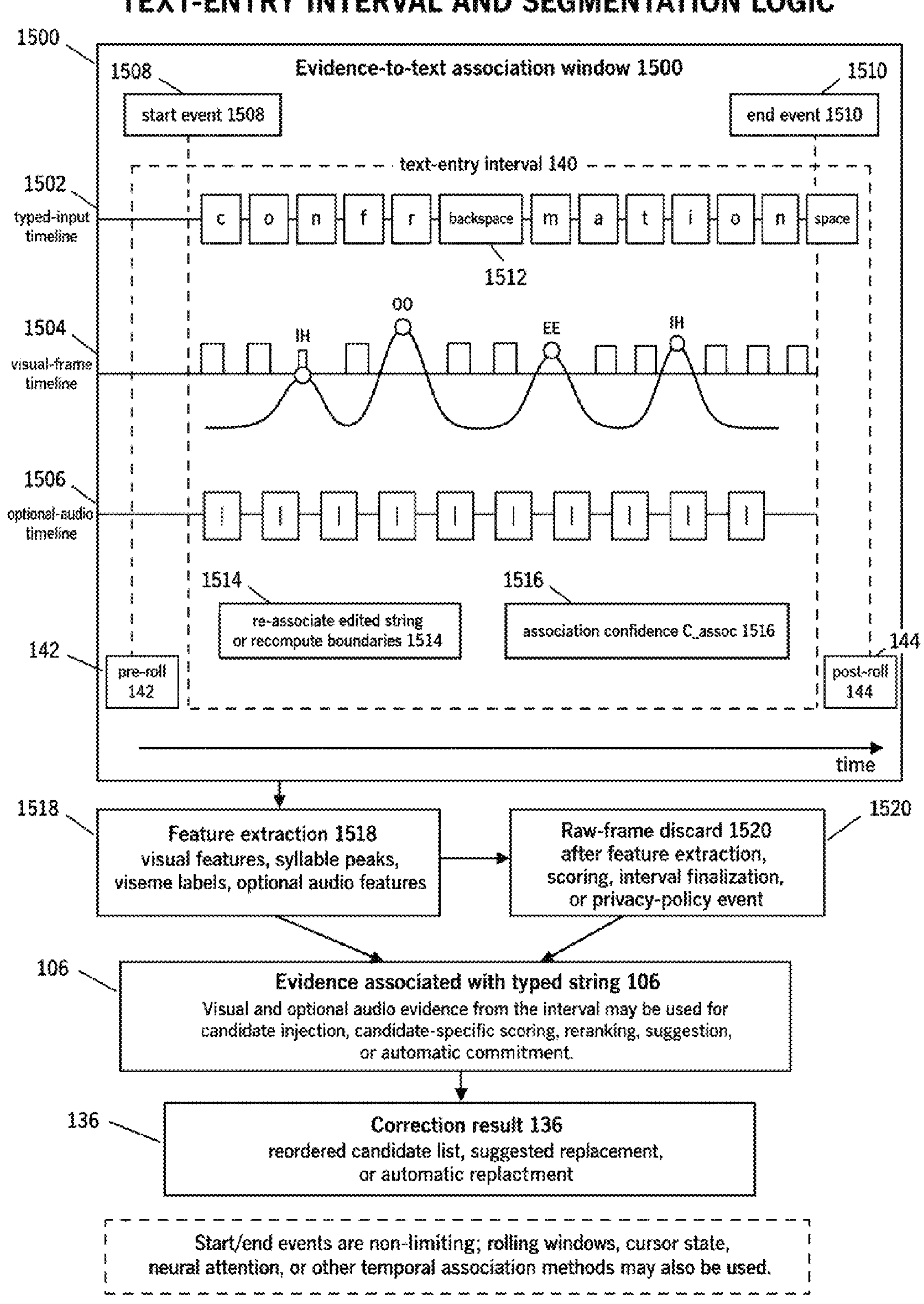
FIG. 15
TEXT-ENTRY INTERVAL AND SEGMENTATION LOGIC
1500
Evidence-to-text association window 1500
1508
start event 1508
1510
end event 1510
text-entry interval 140
1502
typed-input timeline
c
o
n
f
r
backspace
m
a
t
i
o
n
space
1512
1504
visual-frame timeline
IH
OO
EE
IH
1506
optional-audio timeline
1514
re-associate edited string or recompute boundaries 1514
1516
association confidence C_assoc 1516
142
pre-roll 142
144
post-roll 144
time
1518
Feature extraction 1518 visual features, syllable peaks, viseme labels, optional audio features
1520
Raw-frame discard 1520 after feature extraction, scoring, interval finalization, or privacy-policy event
106
Evidence associated with typed string 106
Visual and optional audio evidence from the interval may be used for candidate injection, candidate-specific scoring, reranking, suggestion, or automatic commitment.
136
Correction result 136
reordered candidate list, suggested replacement, or automatic replactment
Start/end events are non-limiting; rolling windows, cursor state, neural attention, or other temporal association methods may also be used.

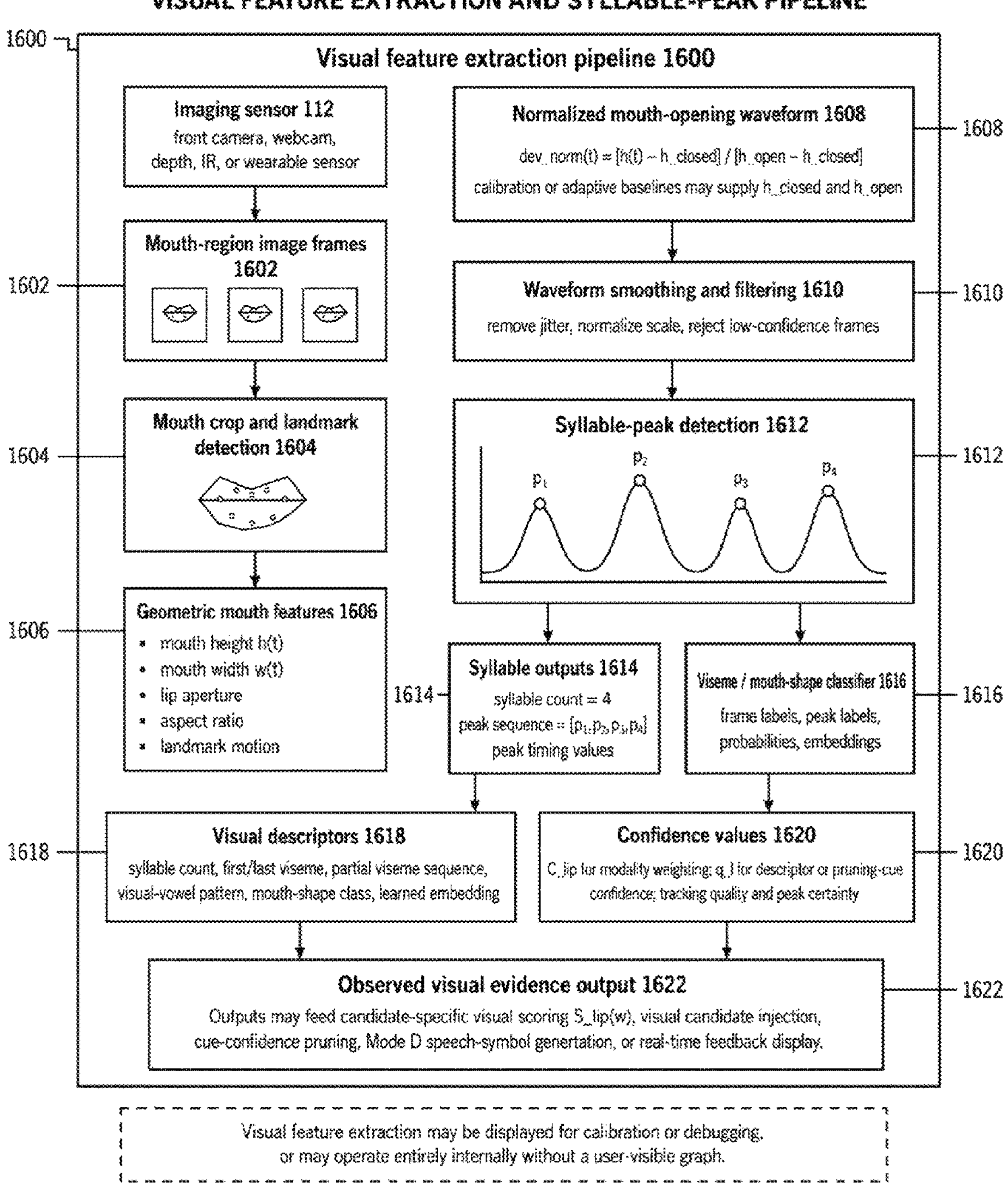
FIG. 16
VISUAL FEATURE EXTRACTION AND SYLLABLE-PEAK PIPELINE
1600
Visual feature extraction pipeline 1600
Imaging sensor 112
front camera, webcam, depth, IR, or wearable sensor
Mouth-region image frames 1602
1602
Mouth crop and landmark detection 1604
1604
Geometric mouth features 1606
mouth height h(t)
mouth width w(t)
lip aperture
aspect ratio
landmark motion
1606
Normalized mouth-opening waveform 1608
dev_norm(t) = [h(t) − h_closed] / [h_open − h_closed]
calibration or adaptive baselines may supply h_closed and h_open
1608
Waveform smoothing and filtering 1610
remove jitter, normalize scale, reject low-confidence frames
1610
Syllable-peak detection 1612
p1
p2
p3
p4
1612
Syllable outputs 1614
syllable count = 4
peak sequence = [p1, p2, p3, p4]
peak timing values
1614
Viseme / mouth-shape classifier 1616
frame labels, peak labels, probabilities, embeddings
1616
Visual descriptors 1618
syllable count, first/last viseme, partial viseme sequence, visual-vowel pattern, mouth-shape class, learned embedding
1618
Confidence values 1620
C_lip for modality weighting; q_j for descriptor or pruning-cue confidence; tracking quality and peak certainty
1620
Observed visual evidence output 1622
Outputs may feed candidate-specific visual scoring S_lip(w), visual candidate injection, cue-confidence pruning, Mode D speech-symbol genertation, or real-time feedback display.
1622
Visual feature extraction may be displayed for calibration or debugging, or may operate entirely internally without a user-visible graph.

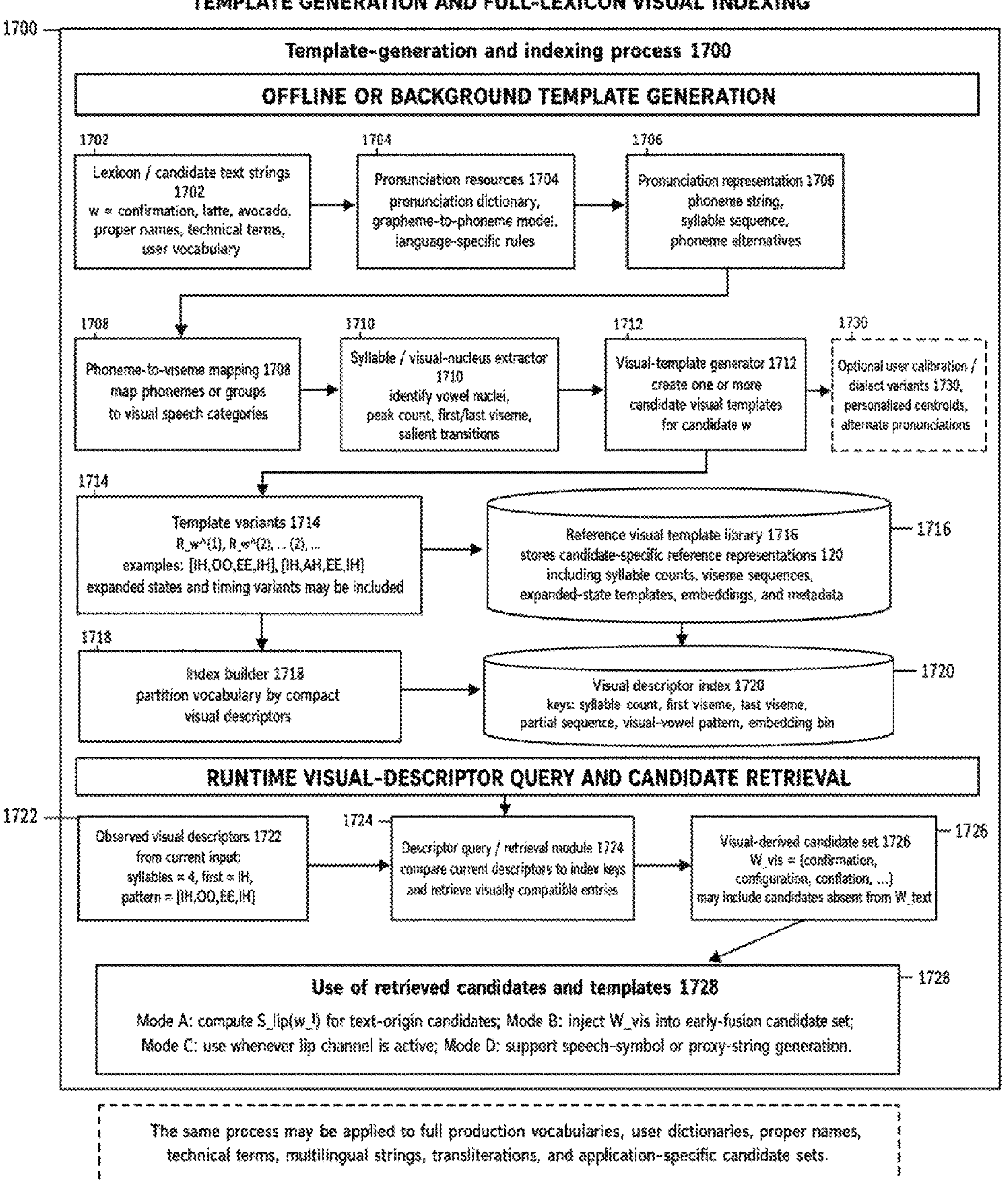
FIG. 17
TEMPLATE GENERATION AND FULL-LEXICON VISUAL INDEXING
1700
Template-generation and indexing process 1700
OFFLINE OR BACKGROUND TEMPLATE GENERATION
1702
Lexicon / candidate text strings 1702
w = confirmation, latte, avocado, proper names, technical terms, user vocabulary
1704
Pronunciation resources 1704
pronunciation dictionary, grapheme-to-phoneme model, language-specific rules
1706
Pronunciation representation 1706
phoneme string, syllable sequence, phoneme alternatives
1708
Phoneme-to-viseme mapping 1708
map phonemes or groups to visual speech categories
1710
Syllable / visual-nucleus extractor 1710
identify vowel nuclei, peak count, first/last viseme, salient transitions
1712
Visual-template generator 1712
create one or more candidate visual templates for candidate w
1730
Optional user calibration / dialect variants 1730, personalized centroids, alternate pronunciations
1714
Template variants 1714
examples: [IH,OO,EE,IH], [IH,AH,EE,IH]
expanded states and timing variants may be included
1716
Reference visual template library 1716
stores candidate-specific reference representations 120 including syllable counts, viseme sequences, expanded-state templates, embeddings, and metadata
1718
Index builder 1718
partition vocabulary by compact visual descriptors
1720
Visual descriptor index 1720
keys: syllable count, first viseme, last viseme, partial sequence, visual-vowel pattern, embedding bin
RUNTIME VISUAL-DESCRIPTOR QUERY AND CANDIDATE RETRIEVAL
1722
Observed visual descriptors 1722
from current input:
syllables = 4, first = IH,
pattern = [IH,OO,EE,IH]
1724
Descriptor query / retrieval module 1724
compare current descriptors to index keys and retrieve visually compatible entries
1726
Visual-derived candidate set 1726
W_vis = {confirmation, configuration, conflation, ...}
may include candidates absent from W_text
1728
Use of retrieved candidates and templates 1728
Mode A: compute S_lip(w_i) for text-origin candidates; Mode B: inject W_vis into early-fusion candidate set;
Mode C: use whenever lip channel is active; Mode D: support speech-symbol or proxy-string generation.
The same process may be applied to full production vocabularies, user dictionaries, proper names, technical terms, multilingual strings, transliterations, and application-specific candidate sets.

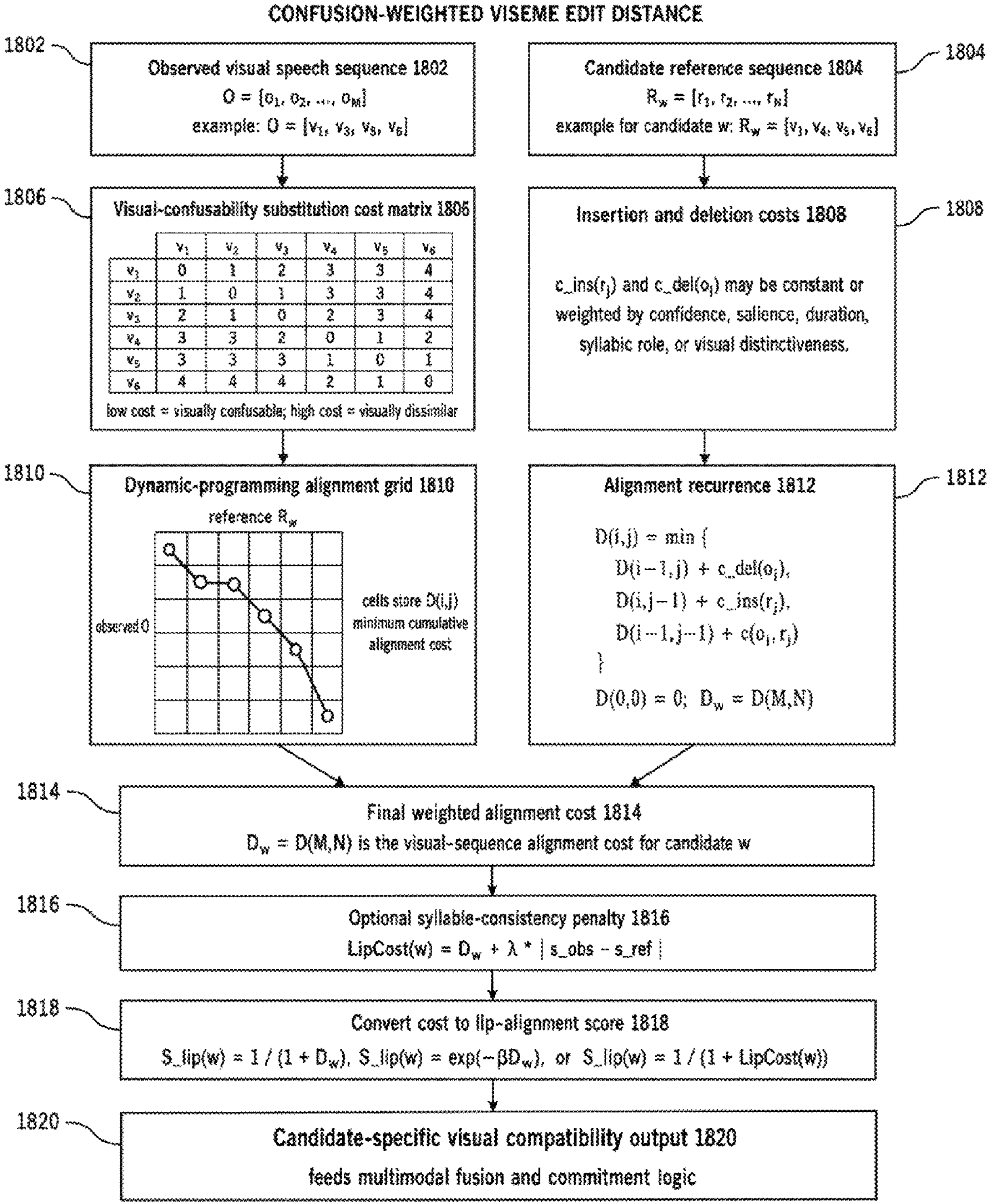
FIG. 18
CONFUSION-WEIGHTED VISEME EDIT DISTANCE
1802
Observed visual speech sequence 1802
O = [o1, o2, ..., oM]
example: O = [v1, v3, v5, v6]
1804
Candidate reference sequence 1804
Rw = [r1, r2, ..., rN]
example for candidate w: Rw = [v1, v4, v5, v6]
1806
Visual-confusability substitution cost matrix 1806
v1 v2 v3 v4 v5 v6
v1 0 1 2 3 3 4
v2 1 0 1 3 3 4
v3 2 1 0 2 3 4
v4 3 3 2 0 1 2
v5 3 3 3 1 0 1
v6 4 4 4 2 1 0
low cost = visually confusable; high cost = visually dissimilar
1808
Insertion and deletion costs 1808
c_ins(rj) and c_del(oi) may be constant or weighted by confidence, salience, duration, syllabic role, or visual distinctiveness.
1810
Dynamic-programming alignment grid 1810
reference Rw
observed O
cells store D(i,j) minimum cumulative alignment cost
1812
Alignment recurrence 1812
D(i,j) = min {
D(i−1,j) + c_del(oi),
D(i,j−1) + c_ins(rj),
D(i−1,j−1) + c(oi, rj)
}
D(0,0) = 0; Dw = D(M,N)
1814
Final weighted alignment cost 1814
Dw = D(M,N) is the visual-sequence alignment cost for candidate w
1816
Optional syllable-consistency penalty 1816
LipCost(w) = Dw + λ * | s_obs − s_ref |
1818
Convert cost to lip-alignment score 1818
S_lip(w) = 1 / (1 + Dw), S_lip(w) = exp(−βDw), or S_lip(w) = 1 / (1 + LipCost(w))
1820
Candidate-specific visual compatibility output 1820
feeds multimodal fusion and commitment logic

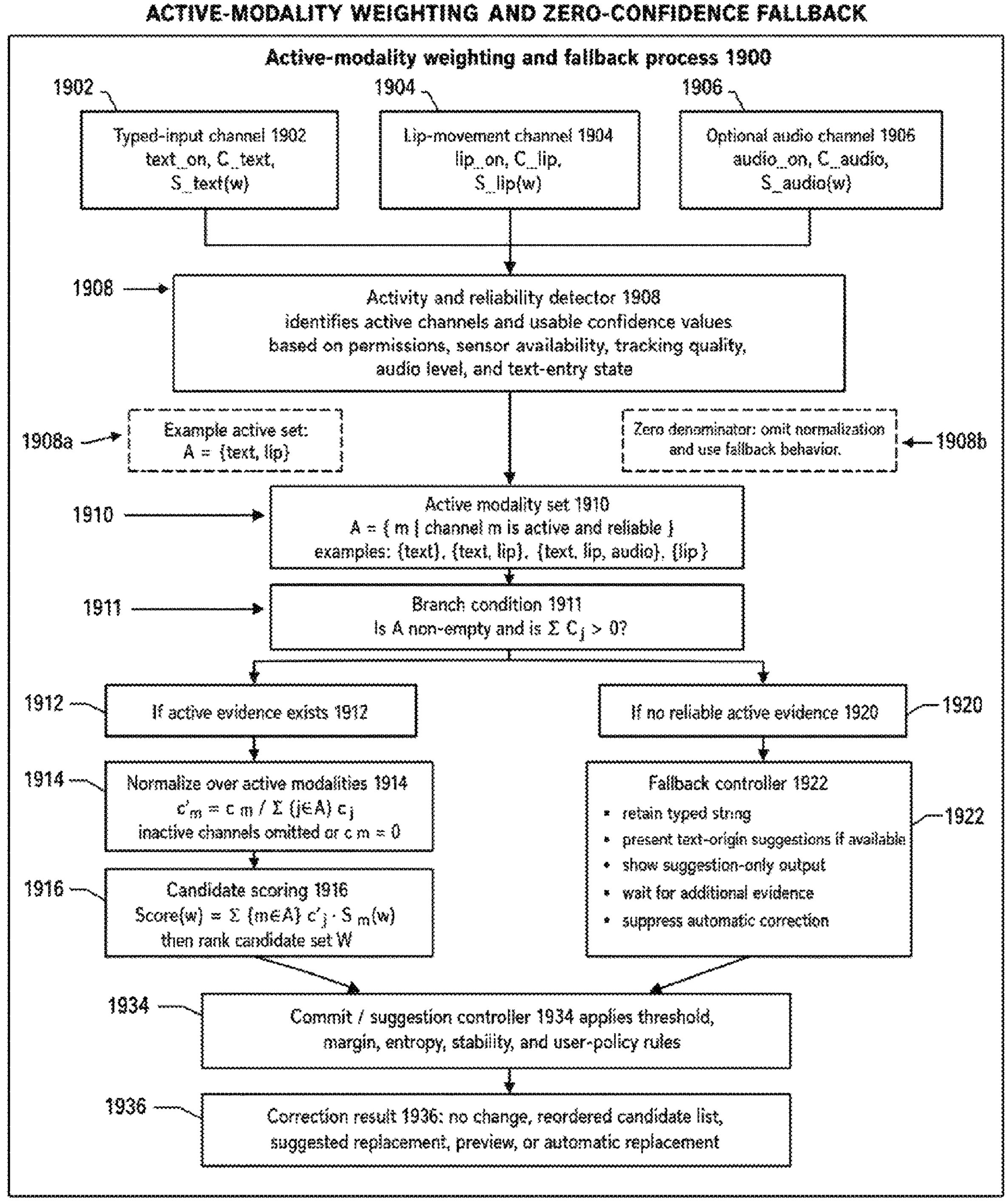
FIG. 19
ACTIVE-MODALITY WEIGHTING AND ZERO-CONFIDENCE FALLBACK
Active-modality weighting and fallback process 1900
1902
1904
1906
Typed-input channel 1902
text_on, C_text,
S_text(w)
Lip-movement channel 1904
lip_on, C_lip,
S_lip(w)
Optional audio channel 1906
audio_on, C_audio,
S_audio(w)
1908
Activity and reliability detector 1908
identifies active channels and usable confidence values
based on permissions, sensor availability, tracking quality,
audio level, and text-entry state
1908a
Example active set:
A = {text, lip}
Zero denominator: omit normalization
and use fallback behavior.
1908b
1910
Active modality set 1910
A = { m | channel m is active and reliable }
examples: {text}, {text, lip}, {text, lip, audio}, {lip}
1911
Branch condition 1911
Is A non-empty and is Σ C_j > 0?
1912
If active evidence exists 1912
If no reliable active evidence 1920
1920
1914
Normalize over active modalities 1914
c'_m = c_m / Σ {j∈A} c_j
inactive channels omitted or c_m = 0
Fallback controller 1922
retain typed string
present text-origin suggestions if available
show suggestion-only output
wait for additional evidence
suppress automatic correction
1922
1916
Candidate scoring 1916
Score(w) = Σ {m∈A} c'_j · S_m(w)
then rank candidate set W
1934
Commit / suggestion controller 1934 applies threshold,
margin, entropy, stability, and user-policy rules
1936
Correction result 1936: no change, reordered candidate list,
suggested replacement, preview, or automatic replacement

DETAILED NEURAL EARLY-FUSION ARCHITECTURE

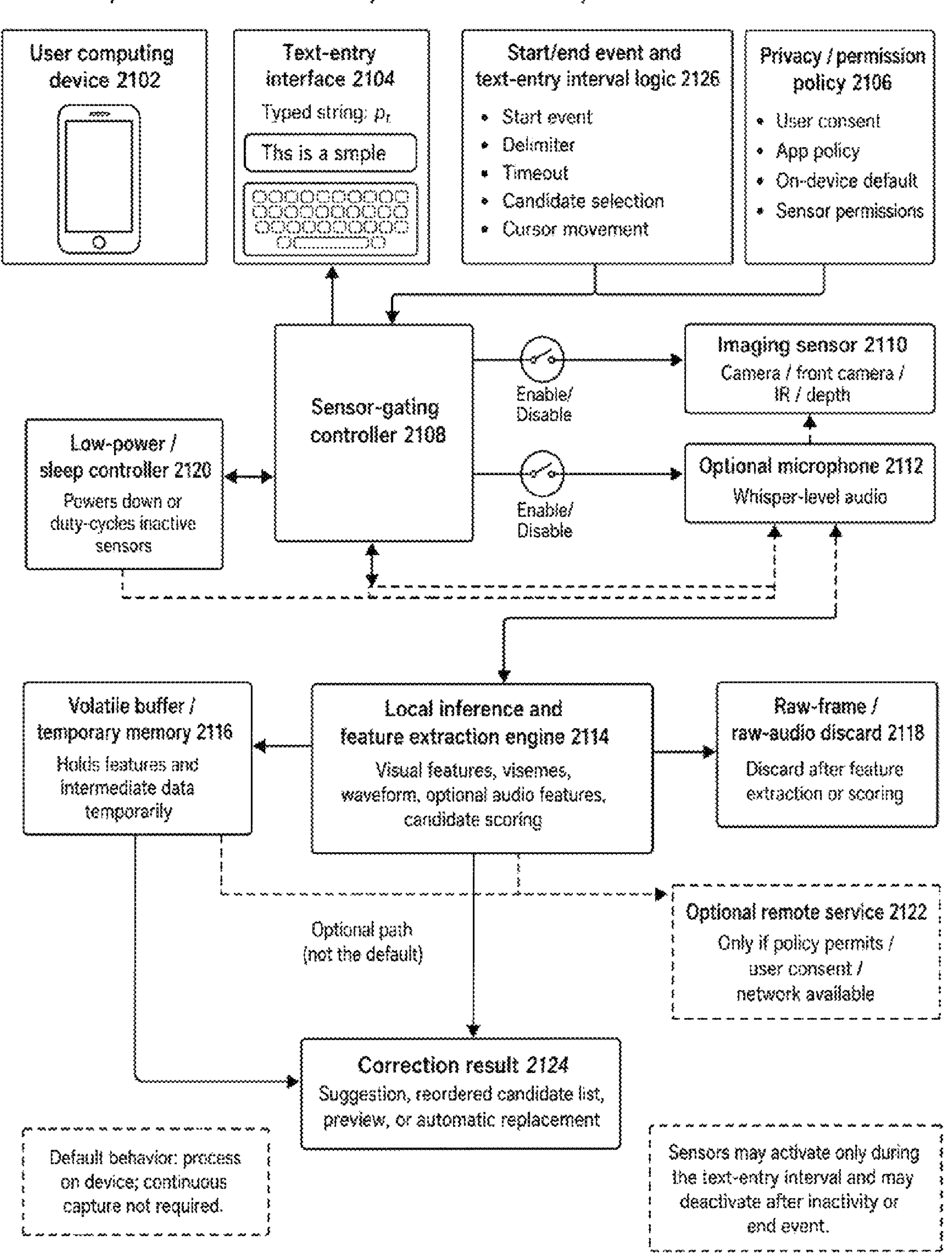
FIG. 21
PRIVACY, LOCAL PROCESSING, SENSOR GATING, AND POWER MANAGEMENT
User computing device 2102
Text-entry interface 2104
Typed string: $p_r$
Ths is a smple
Start/end event and text-entry interval logic 2126
Start event
Delimiter
Timeout
Candidate selection
Cursor movement
Privacy / permission policy 2106
User consent
App policy
On-device default
Sensor permissions
Sensor-gating controller 2108
Enable/ Disable
Imaging sensor 2110
Camera / front camera / IR / depth
Enable/ Disable
Optional microphone 2112
Whisper-level audio
Low-power / sleep controller 2120
Powers down or duty-cycles inactive sensors
Volatile buffer / temporary memory 2116
Holds features and intermediate data temporarily
Local inference and feature extraction engine 2114
Visual features, visemes, waveform, optional audio features, candidate scoring
Raw-frame / raw-audio discard 2118
Discard after feature extraction or scoring
Optional remote service 2122
Only if policy permits / user consent / network available
Optional path (not the default)
Correction result 2124
Suggestion, reordered candidate list, preview, or automatic replacement
Default behavior: process on device; continuous capture not required.
Sensors may activate only during the text-entry interval and may deactivate after inactivity or end event.

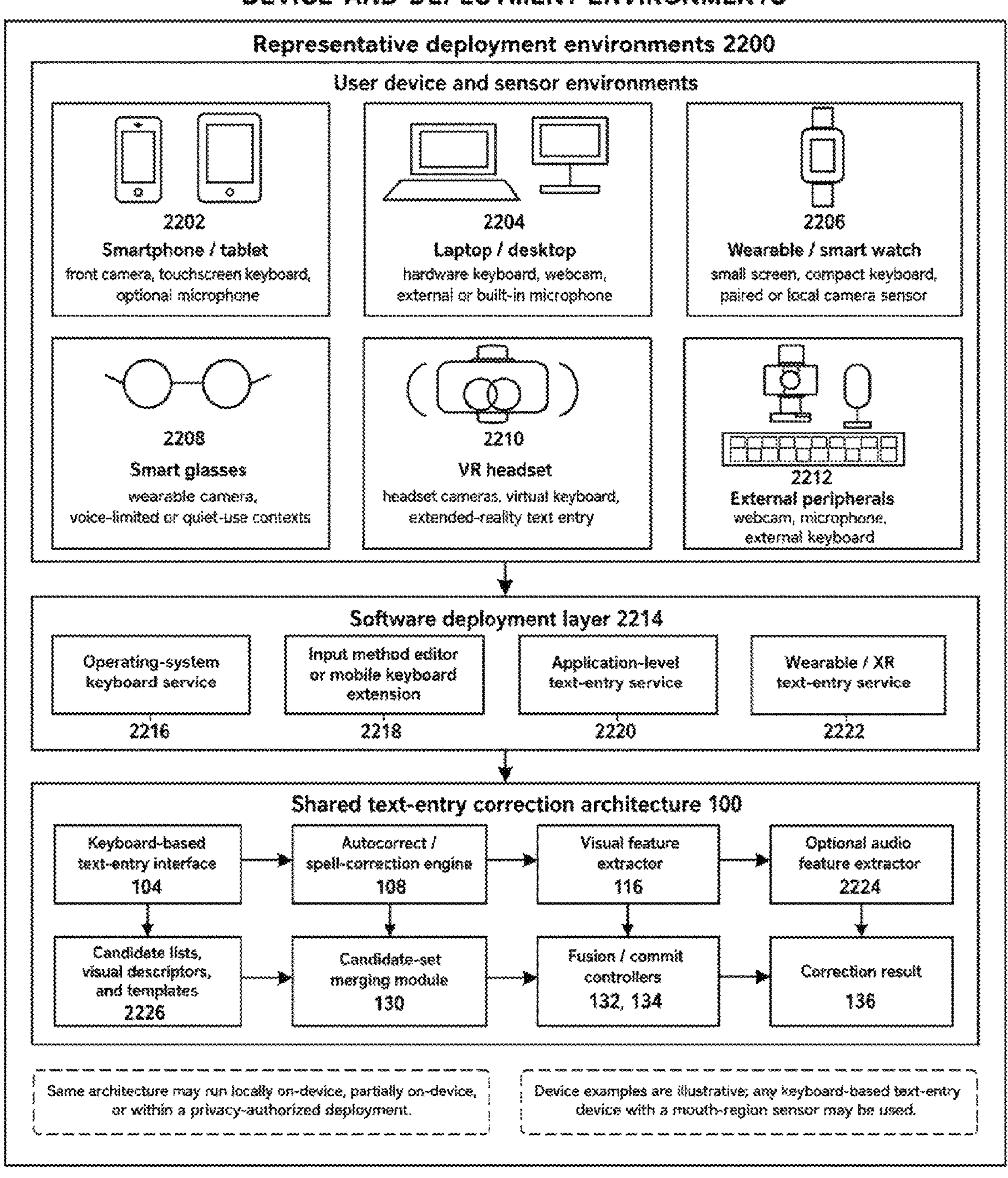
FIG. 22
DEVICE AND DEPLOYMENT ENVIRONMENTS
Representative deployment environments 2200
User device and sensor environments
2202
Smartphone / tablet
front camera, touchscreen keyboard, optional microphone
2204
Laptop / desktop
hardware keyboard, webcam, external or built-in microphone
2206
Wearable / smart watch
small screen, compact keyboard, paired or local camera sensor
2208
Smart glasses
wearable camera, voice-limited or quiet-use contexts
2210
VR headset
headset cameras, virtual keyboard, extended-reality text entry
2212
External peripherals
webcam, microphone, external keyboard
Software deployment layer 2214
Operating-system keyboard service
2216
Input method editor or mobile keyboard extension
2218
Application-level text-entry service
2220
Wearable / XR text-entry service
2222
Shared text-entry correction architecture 100
Keyboard-based text-entry interface 104
Autocorrect / spell-correction engine 108
Visual feature extractor 116
Optional audio feature extractor 2224
Candidate lists, visual descriptors, and templates 2226
Candidate-set merging module 130
Fusion / commit controllers 132, 134
Correction result 136
Same architecture may run locally on-device, partially on-device, or within a privacy-authorized deployment.
Device examples are illustrative; any keyboard-based text-entry device with a mouth-region sensor may be used.

SYSTEMS AND METHODS FOR IMPROVING AUTOCORRECT ACCURACY BY FUSING KEYSTROKE INPUT WITH REAL-TIME LIP-MOVEMENT CUES AND OPTIONAL WHISPER-LEVEL AUDIO

CROSS-REFERENCE TO RELATED APPLICATIONS

This application claims the benefit of and priority to U.S. Provisional Patent Application No. 63/808,665, filed May 20, 2025, and U.S. Provisional Patent Application No. 63/921,290, filed Nov. 20, 2025. The disclosures of those provisional applications are incorporated herein by reference in their entireties to the fullest extent permitted.

TECHNICAL FIELD

The invention lies in the field of human-computer interaction, text-entry technology, keyboard-based correction, and multimodal input. It concerns systems and methods for improving autocorrect accuracy and text-entry correction using typed input together with real-time lip-movement evidence and optional whisper-level audio evidence. The systems may be implemented on smartphones, tablets, laptops, desktop computers, wearables, smart watches, smart glasses, extended-reality headsets, and other devices that accept keyboard input and include, or communicate with, a camera or other mouth-region imaging sensor and, optionally, a microphone.

BACKGROUND

Accurate typing on compact and mobile devices remains difficult despite continued software refinement in on-device correction engines. Users often type rapidly on small or densely packed keys, type while distracted, use portrait-mode keyboards with limited key spacing, or enter text on wearables, projected keyboards, extended-reality keyboards, and other interfaces that provide little tactile feedback. Text-entry errors are also common when users enter proper names, jargon, abbreviations, emojis, technical terms, foreign words, transliterations, diacritic-bearing words, or other strings that conventional correction engines may not rank highly. Modern keyboard software commonly combines suggestion and automatic replacement in an autocorrect or spell-correction engine.

As used herein, an autocorrect engine may generate a ranked list of candidate corrections and may automatically commit a high-confidence candidate. Conventional engines may use edit-distance tables, keyboard-adjacency models, word frequency, user history, language models, or contextual prediction. Even with those tools, a severely garbled typed string may fail to produce the intended candidate, and a text-only system may choose an incorrect but plausible alternative.

A user may be able to provide additional intent information through speech, but full-volume voice dictation is not always desirable. Speaking aloud can be socially awkward, disruptive in quiet environments, power intensive if continuously active, or unsuitable where privacy is important. Users may prefer a private or low-effort auxiliary channel that helps the correction engine without requiring full voice dictation. Mouth-region visual evidence and quiet speech evidence can carry information about syllable count, vowel-like mouth shapes, viseme patterns, phoneme-like cues, or other articulatory features. There remains a need for keyboard-based text-entry correction systems that use such auxiliary evidence in association with a typed string to improve candidate generation, candidate scoring, candidate ranking, suggestion, preview, or automatic commitment while preserving the ordinary typing workflow.

SUMMARY OF THE INVENTION-MULTIMODAL AUTOCORRECT FRAMEWORK

Disclosed are systems and methods for improving autocorrect accuracy and text-entry correction accuracy by augmenting a keyboard-based text-entry interface with mouth-region visual evidence and optional whisper-level audio evidence. In some embodiments, the system receives a typed string, obtains or generates candidate text strings, captures lip-movement evidence associated with entry of the typed string, computes candidate-specific visual compatibility or lip-alignment scores, and uses those scores to rerank, retrieve, inject, prune, suggest, preview, or commit a correction candidate. In several embodiments, the system receives keystrokes from an on-screen keyboard, hardware keyboard, projected keyboard, input method editor, or other text-entry mechanism.

The system may also receive lip-movement cues captured by a front-facing camera, external webcam, wearable camera, headset camera, infrared sensor, depth sensor, or other imaging sensor. The lip-movement cues may provide syllable counts, syllable peaks, viseme sequences, partial viseme sequences, mouth-shape cues, visual-vowel patterns, landmark trajectories, or learned visual embeddings. Optional whisper-level audio may be captured by a microphone and used as an auxiliary low-amplitude speech signal. The disclosed framework may improve autocorrect accuracy by supplying evidence that is not available from typed characters alone.

For example, lip-movement evidence may disambiguate between textually plausible candidates, elevate a low-ranked candidate, or retrieve a candidate absent from a standard text-origin suggestion list. Optional whisper-level audio may provide an additional private channel when the user chooses to speak softly. The auxiliary evidence may be used without requiring standalone lip reading or full speech dictation.

At a core architectural level, the disclosed system preserves the keyboard-based correction workflow while adding auxiliary visual or quiet-audio evidence at one or more points in the correction pipeline. In different embodiments, the auxiliary evidence may (i) rerank candidates generated from typed input alone, (ii) retrieve or inject candidates before final scoring, including candidates absent from a standard text-origin list, (iii) permit operation with any subset of typed, lip-movement, and whisper-level audio channels without explicit mode switching, and/or (iv) generate phonetic, viseme-derived, syllable-derived, or visually derived orthographic proxy strings for submission to an existing spell-correction engine. These embodiments may be implemented separately or together, and none requires the lip-movement channel to perform full standalone visual speech recognition.

Illustrative Operating Modes

Mode A is a text-first late-fusion mode. In Mode A, a standard autocorrect or spell-correction engine first generates a text-origin candidate list from the typed string alone. Lip-movement evidence and optional whisper-level audio evidence are then used to compute candidate-specific scores for candidates in that text-origin list, and the list is reranked, suggested, previewed, or committed according to a fused score and confidence rule. Mode B is an early-fusion or candidate-injection mode. In Mode B, visual descriptors derived from lip-movement evidence, and optionally audio-derived cues, may influence candidate generation before final scoring.

Such cues may widen a relaxed text-derived candidate pool, retrieve visually compatible candidates, inject candidates absent from a standard autocorrect list, prune or downrank inconsistent candidates when confidence is sufficient, and then score the resulting fused candidate set. Mode C is a seamless any-subset operation mode. In Mode C, the typed-input channel, lip-movement channel, and optional whisper-level audio channel may operate in any subset without explicit user switching. The same correction pipeline may operate when the user types only, types while mouthing, types while whispering, mouths with little or no text, whispers with little or no text, or uses all three channels together. Mode D is an orthographic proxy-string injection mode, also referred to in some embodiments as reverse-garbled injection.

In Mode D, lip-derived and/or whisper-derived speech information may be converted into a bounded set of plausible misspellings, phonetic proxy strings, or other orthographic variants. Those variants may be bundled with the typed string and submitted to an existing spell-correction engine so that the existing engine can recover candidate text strings using its ordinary correction logic.

Representative Fusion Formula

A representative, non-limiting fusion formula is:

$$\text{Score}(w)=\alpha_{text}S_{text}(w)+\alpha_{lip}S_{lip}(w)+\alpha_{audio}S_{audio}(w)$$

with modality weights such as:

$$\alpha_m = \frac{C_m}{\sum_{j\in A} C_j}$$

where A is the set of active modalities. The audio term and corresponding weight may be omitted when whisper-level audio is inactive or unavailable. Other fusion schemes, including product-of-experts, log-linear fusion, neural attention, learned weighted fusion, transformer fusion, rule-based fusion, or other multimodal combinations, may be substituted.

Benefits and Technical Advantages

The disclosed systems and methods may improve autocorrect accuracy under rapid typing, severe misspellings, ambiguous text context, hard-to-spell names, technical vocabulary, and other difficult text-entry conditions. In some embodiments, the system may reduce backspacing, reduce manual correction, surface intended candidates that would otherwise be absent or low-ranked, and preserve the familiar keyboard workflow. In some embodiments, the framework may be implemented as a lightweight retrofit layer over existing keyboard, spell-checker, autocorrect, input-method, or language-model infrastructure. Existing correction engines may remain intact while lip-movement evidence and optional whisper-level audio evidence are added as auxiliary candidate-generation, scoring, reranking, injection, validation, or commitment signals.

In some embodiments, privacy and power features may be used. Camera and microphone pipelines may activate only during text-entry intervals or other authorized contexts, raw image and audio frames may be processed locally and discarded after feature extraction or scoring, and the system may fall back to lower-power or text-only operation when auxiliary channels are unavailable or unreliable.

In platform implementations, the host keyboard, input-method, autocorrect, spell-checker, language-model, dictionary, user-history, and ranking infrastructure may remain substantially intact. The lip-movement and optional whisper-level components may operate as auxiliary candidate-generation, candidate-retrieval, candidate-validation, rescoring, or commitment-control layers, thereby allowing a device manufacturer or operating-system provider to add multimodal correction capability without replacing the established text-entry stack.

BRIEF DESCRIPTION OF THE DRAWINGS

FIG. 2 is a flowchart illustrating a Mode A late-fusion reranking process using a typed string, a text-origin candidate list, candidate-specific lip scoring, optional audio scoring, active-modality weighting, and a correction output.

FIG. 3 is a flowchart illustrating a Mode B-1 heuristic early-fusion process in which visual speech cues and optional audio cues may retrieve, add, inject, prune, downrank, and score candidate text strings, including candidates absent from a standard autocorrect list.

FIG. 5 is a flowchart illustrating a Mode C seamless multimodal or any-subset operation in which typed-input, lip-movement, and optional audio channels feed a shared correction pipeline without explicit user mode switching.

FIG. 6 is a flowchart illustrating a Mode D orthographic proxy-string injection, or reverse-garbled injection, process in which lip-derived or whisper-derived speech-symbol information is converted into plausible misspellings or orthographic proxy strings and submitted to an existing spell-correction engine.

FIG. 8 is a graph and interface diagram illustrating a real-time visual speech graph with a normalized mouth-opening waveform, syllable peaks, peak labels, expanded-state windows, and confidence markers.

FIG. 9 is a schematic interface diagram illustrating a three-list fusion window having a native autocorrect rank list, a LipConfirm visual rank list, and a fused rank list.

FIG. 10 is a schematic multi-panel diagram illustrating representative fusion examples, including contextual ambiguity, severe distortion, candidate injection, and multiple valid interpretations.

FIG. 11 is a timeline diagram illustrating concurrent typing and visual evidence capture with rolling candidate updates and a final scoring or commit point.

FIG. 12 is a block diagram illustrating an overall text-entry correction system and platform architecture.

FIG. 13 is a block diagram illustrating candidate-specific visual compatibility scoring by comparing observed lip-movement evidence with candidate-specific reference visual representations.

FIG. 14 is a block diagram illustrating candidate-set merging, de-duplication, score normalization, fusion control, commitment control, and correction outputs.

FIG. 15 is a timeline and flow diagram illustrating text-entry interval and segmentation logic for associating visual and optional audio evidence with a typed string.

FIG. 16 is a flow diagram illustrating a visual feature extraction and syllable-peak pipeline.

FIG. 17 is a flow diagram illustrating template generation and full-lexicon visual indexing.

FIG. 18 is a flow and mathematical diagram illustrating confusion-weighted viseme edit-distance scoring.

FIG. 19 is a flowchart illustrating active-modality weighting and zero-confidence fallback.

FIG. 21 is a block diagram illustrating privacy, local processing, sensor gating, and power-management embodiments.

FIG. 22 is a schematic diagram illustrating representative device and deployment environments for the disclosed text-entry correction architecture.

DETAILED DESCRIPTION OF THE INVENTION

Introductory Overview

Figure 1:
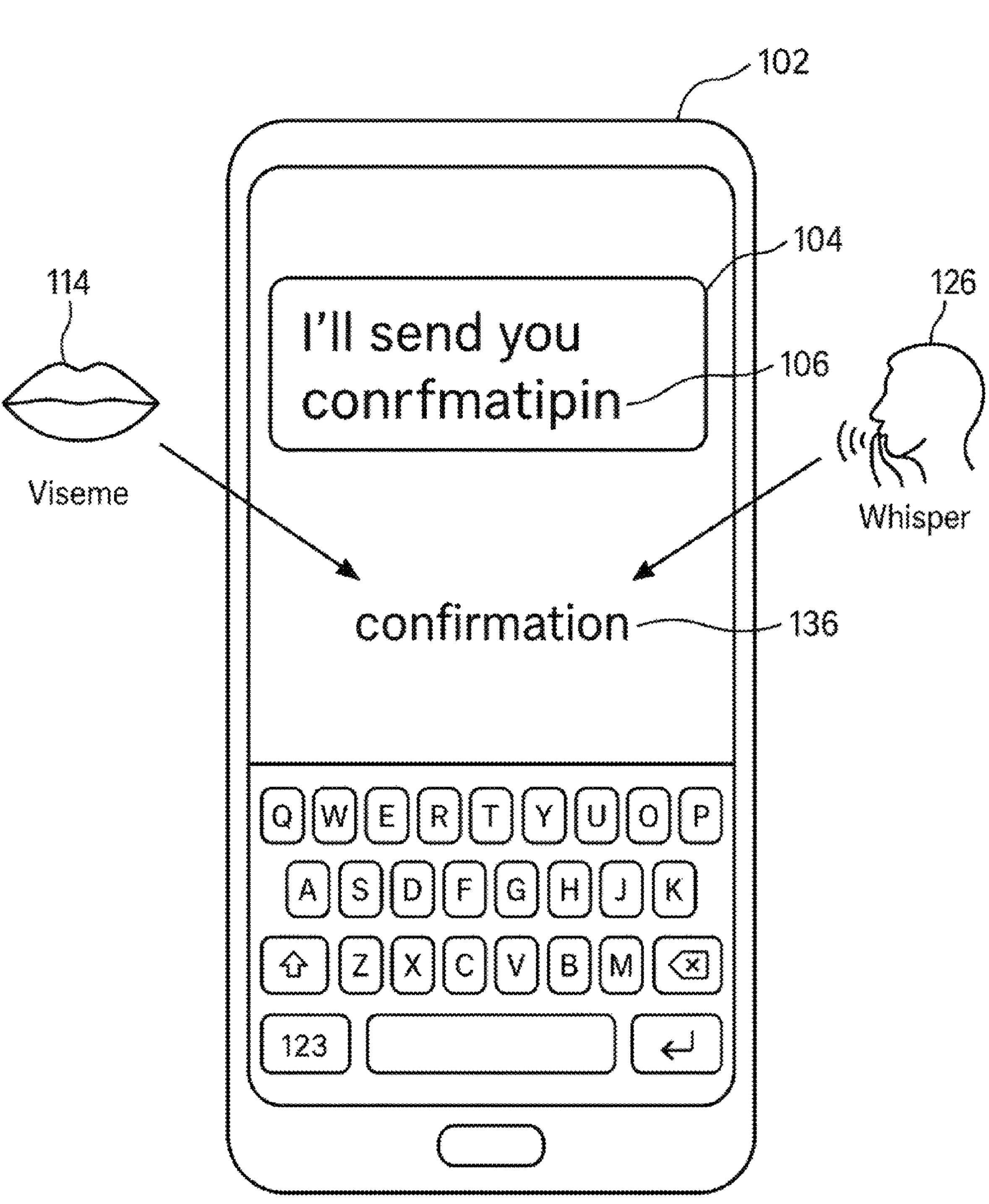
FIG. 1 is a schematic diagram illustrating a high-level smartphone example in which typed input, lip-movement evidence, and optional whisper-level audio evidence guide correction of a misspelled or garbled typed string.

FIG. 1 illustrates the core operation of the disclosed multimodal autocorrect system.

A smartphone or other computing device in portrait orientation shows a user typing a sentence with a misspelled or garbled token corresponding to a word such as "confirmation" above an on-screen keyboard. Two auxiliary symbols flank the device: a lip icon representing lip-movement or viseme evidence captured by a camera or other imaging sensor, and a quiet-speech icon representing optional whisper-level audio captured by a microphone. Arrows from the auxiliary symbols converge on the misspelled token, indicating that these auxiliary streams may supply user-intent evidence that assists the correction engine. Depending on the operating mode, the system may use that evidence to promote an existing candidate, inject a new candidate, generate proxy strings for an existing spell-correction engine, suggest a replacement, preview a replacement, or, when confidence is sufficiently high, automatically insert an intended correction such as "confirmation." The system supports four core input-fusion architectures, referred to herein as Modes A through D.

Those modes enable flexible integration of typing, lip movement, and optional whisper-level audio across a wide range of devices, operating contexts, and user scenarios. The modes are illustrative and non-limiting; a commercial implementation may combine the modes, select among them dynamically, or expose none of the mode labels to a user.

Terminology and Core Architecture Overview

Terminology Used in the Detailed Description

The following terminology is used for clarity and is not intended to limit the scope of the embodiments. A term defined in this section may be used interchangeably with broader or narrower examples elsewhere in this specification unless the context requires otherwise. Use of the word "word" in an example may encompass a broader candidate text string as described below. Typed string. A "typed string" includes a current text input, typed prefix, token, word, phrase, subword, editable text segment, composition string, or other text-entry state entered through a keyboard-based interface, hardware keyboard, soft keyboard, projected keyboard, input method editor, or other text-entry mechanism. Candidate text string or candidate.

A "candidate text string" or "candidate" may include a word, token, phrase, subword, proper name, abbreviation, transliteration, diacritic-bearing string, emoji-associated string, application-specific term, technical term, or other replacement or completion text. Text-origin candidate list. A "text-origin candidate list" is a candidate list generated from typed input without using mouth-region image data or lip-movement evidence. A "standard autocorrect candidate list" is one example of a text-origin candidate list produced by an ordinary autocorrect or spell-correction engine from the typed string alone. Text-derived candidate pool.

A "text-derived candidate pool" may be broader than a standard autocorrect candidate list and may include candidates generated using relaxed edit-distance thresholds, keyboard-adjacency costs, language-model probabilities, prefix consistency, user history, application context, or other text-derived evidence. Lip-movement evidence and mouth-region visual evidence. "Lip-movement evidence" or "mouth-region visual evidence" includes image-derived, video-derived, depth-derived, infrared-derived, landmark-derived, or other sensor-derived evidence of mouth, lip, jaw, or lower-face motion. Non-limiting examples include viseme sequences, syllable counts, syllable peaks, mouth-opening waveforms, mouth landmark trajectories, visual articulatory features, expanded visual speech states, and learned visual embeddings. Visual speech cue.

A "visual speech cue" is a lip-derived or mouth-region-derived cue usable for candidate scoring, candidate retrieval, candidate injection, candidate pruning, candidate confirmation, or candidate rejection. Examples include syllable count, first or last viseme, partial viseme sequence, coarse phoneme class, mouth-shape class, onset class, ending class, or a learned visual embedding. Lip-alignment score and candidate-specific visual compatibility score. A "lip-alignment score" is a candidate-specific score measuring agreement between observed lip-movement or visual speech evidence and an expected representation for a candidate.

A "candidate-specific visual compatibility score" is a broader term that includes a lip-alignment score and other candidate-specific visual scoring methods. Whisper-level audio evidence. "Whisper-level audio evidence" includes optional low-volume, whispered, near-whispered, subvocal, low-amplitude, breathy, or otherwise quiet acoustic evidence, including acoustic features, phoneme posteriorgrams, automatic-speech-recognition hypotheses, word posteriors, or other audio-derived evidence. Text-entry interval. A "text-entry interval" is a time window of image frames, and optionally audio frames, associated with entry, correction, or replacement of a typed string, current typed token, candidate text string, or editable text segment.

A text-entry interval is one non-limiting way of associating visual or audio evidence with typed input. Plausible misspelling and orthographic proxy string. A "plausible misspelling" or "orthographic proxy string" is a generated spelling-like string derived from lip-movement evidence, whisper-level audio evidence, phoneme information, viseme information, syllable information, or pronunciation-derived evidence and submitted to a spell-correction or autocorrect engine to recover one or more candidate text strings.

Core Architecture Overview

FIG. 1 illustrates a high-level example in which a computing device 102 presents a keyboard-based text-entry interface 104, receives a typed string 106 containing a misspelled or garbled token, receives lip-movement evidence 114 and optional whisper-level audio evidence 126, and outputs a correction result 136. FIG. 12 illustrates a representative system architecture for a text-entry correction system 100.

The system 100 may include a computing device 102, keyboard-based text-entry interface 104, autocorrect or spell-correction engine 108, text-origin candidate list 110, imaging sensor 112, visual feature extractor 116, visual speech cues 118, reference visual representation or template source 120, lip-alignment scorer 122, optional microphone 124, whisper-level audio evidence 126, audio scorer 128, candidate-set merging module 130, fusion controller 132, commit controller 134, correction result 136, and on-device privacy boundary 138.

In several embodiments, a typed string is processed by an autocorrect or spell-correction engine, lip-movement evidence captured while or in association with entry of the typed string provides visual speech cues, and the system uses those cues to rerank, retrieve, add, inject, prune, score, suggest, or commit candidate text strings. Optional whisper-level audio evidence may also be used. In some embodiments, lip-movement evidence augments typed input and is not required to operate as a standalone visual speech recognizer. Instead, lip-movement evidence may provide candidate-specific evidence used in an autocorrect or spell-correction pipeline to improve candidate generation, candidate scoring, candidate ordering, suggestion, or commitment.

The embodiments described herein may be implemented as an operating-system keyboard service, input method editor, mobile keyboard extension, application-level text-entry service, desktop input method, wearable-device text-entry system, extended-reality text-entry system, or another keyboard-based text-entry technology. The imaging sensor may be a front-facing camera, external webcam, depth camera, infrared sensor, wearable camera, smart-glasses camera, headset camera, or another sensor configured to capture mouth-region motion.

Core Operating Modes

Figure 4:
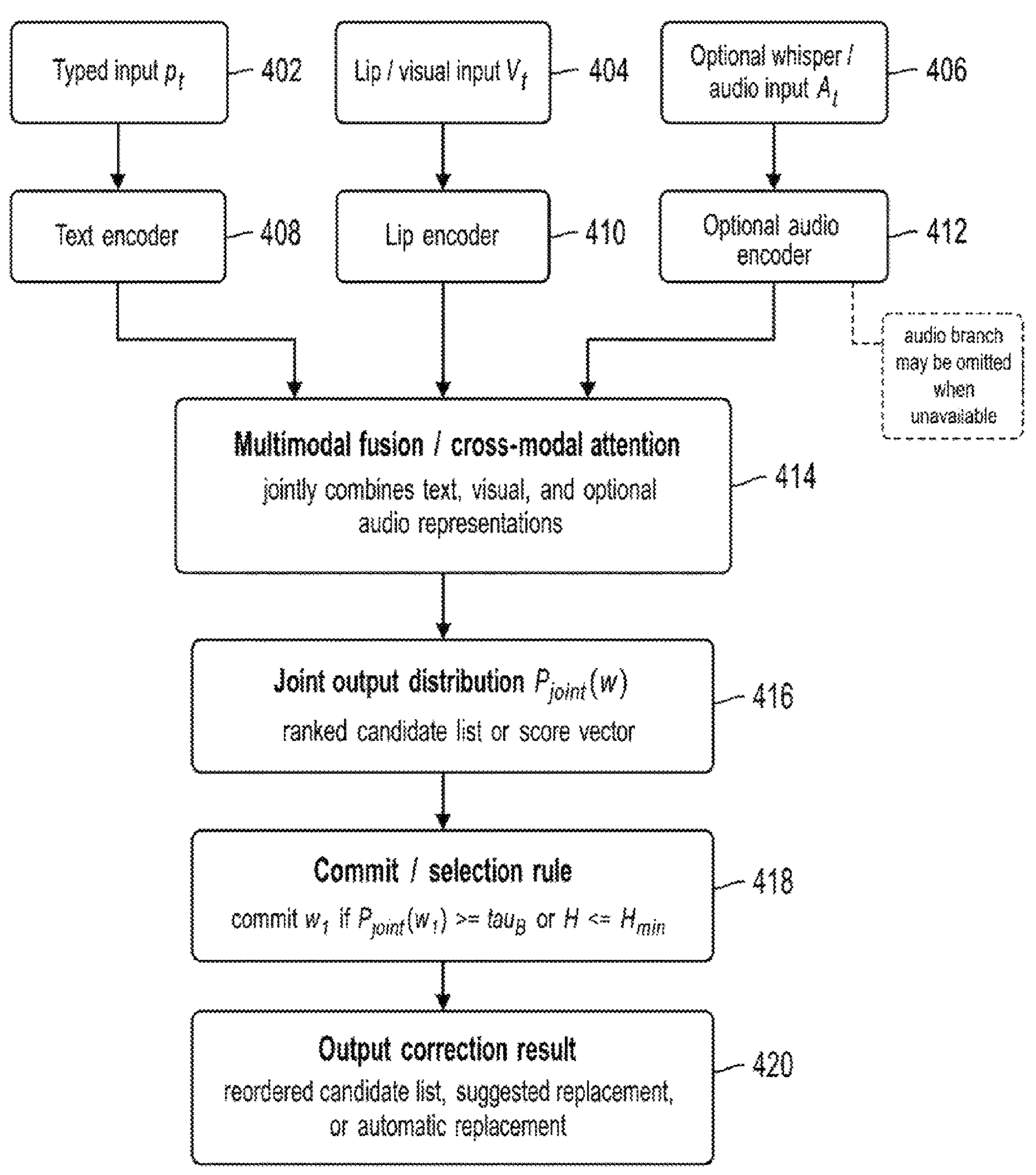
FIG. 4 is a block diagram illustrating a Mode B-2 neural early-fusion process using typed input, lip or visual input, optional audio input, modality-specific encoders, multimodal fusion, a joint output distribution, and a selection rule.

FIGS. 2-6 illustrate non-limiting flow embodiments corresponding to the principal operating modes. FIG. 2 illustrates Mode A late-fusion reranking, FIG. 3 illustrates Mode B-1 heuristic early fusion, FIG. 4 illustrates Mode B-2 neural early fusion, FIG. 5 illustrates Mode C any-subset operation, and FIG. 6 illustrates Mode D orthographic proxy-string injection, or reverse-garbled injection. FIG. 14 illustrates a common candidate-set merging and commit-controller architecture that may be shared by any of Modes A-D. The invention supports several non-limiting operating modes. These modes share common building blocks but differ in where multimodal evidence enters the correction pipeline and how strongly the system relies on text-derived, lip-derived, and optional audio-derived evidence.

The modes are illustrative and may be combined, sequenced, selected dynamically, or implemented as alternative paths within a shared autocorrect or spell-correction pipeline. For clarity, the four principal modes are described using the labels Mode A, Mode B, Mode C, and Mode D. Those labels are explanatory only. A commercial implementation may expose none of the labels to a user and may instead present a conventional keyboard, suggestion bar, correction interface, input method editor, or application text field. Any named algorithms, models, libraries, dictionaries, datasets, or commercial technologies mentioned herein are illustrative examples only. Equivalent spell-correction, visual-speech, audio, language-model, neural, template-based, or hybrid technologies may be substituted without departing from the disclosed architecture.

(i) Mode A is a text-first, late-fusion mode in which text generates the candidate list and lip and optional whisper evidence rerank that list.

(ii) Mode B is an early-fusion mode in which text, lip, and optional whisper evidence may influence candidate generation, candidate pruning, and candidate scoring before final commitment.

(iii) Mode C is a seamless runtime operating mode in which any subset of modalities may be active without explicit user mode switching.

(iv) Mode D is an orthographic proxy-string injection mode, also referred to as reverse-garbled injection, in which lip- and/or whisper-derived speech information is converted into orthographic variants that are passed through an existing spell-correction engine.

Mode A—Text-First Confirmation (Late Fusion)

Mode A keeps the user's ordinary typing workflow intact. A standard autocorrect or spell-correction module first produces a text-origin candidate list from the typed string alone, without using lip-movement evidence or mouth-region image data. Real-time lip-movement evidence and, when active, whisper-level audio evidence are captured while or in association with entry of the typed string. In Mode A, these auxiliary cues do not create new candidates; they provide candidate-specific evidence used to rerank, suggest, or commit candidates that are already present in the text-origin candidate list.

In a non-limiting Mode A embodiment, the system identifies a current typed string, current typed token, or current text-entry state for correction or replacement. Visual speech cues may be associated with that typed string by a text-entry interval, rolling window, token boundary, cursor state, candidate-selection event, or another text-entry context. Mode A remains a text-first mode because the candidate list is generated from the typed string alone and the lip-alignment score is applied only to candidates already in that list.

Mode A Pipeline

FIG. 2 illustrates a non-limiting Mode A late-fusion reranking process. A typed string 206 is received and provided to an autocorrect or spell-correction engine 208, which generates a text-origin candidate list 210 and may provide or enable a text score $S_{text}(w_i)$ for each candidate. Lip-movement evidence 214 is processed by visual feature extraction 216 and lip-alignment scorer 222 to produce $S_{lip}(w_i)$. Optional whisper-level audio evidence 224 may be processed by audio scorer 228 to produce $S_{audio}(w_i)$. Candidate-specific score components 220 are weighted by confidence estimation and active-modality weighting 230 and combined by late-fusion scoring/reranking 232 to output correction result 236. A non-limiting late-fusion pipeline is:

(i) Receive a typed string $p_t$ entered through a keyboard-based text-entry interface.

(ii) Pass $p_t$ to an autocorrect or spell-correction engine to obtain a text-origin candidate list generated from the typed string alone:

$$W_{text}=\{w_1,w_2,\ldots,w_N\}$$

(iii) For each candidate $w_i$, compute a text score $S_{text}(w_i)$.

(iv) Capture lip-movement evidence or mouth-region visual evidence while or in association with entry of the typed string and compute a lip-alignment score $S_{lip}(w_i)$, also referred to as a candidate-specific visual compatibility score, by comparing visual speech cues with a reference viseme, syllable, phoneme, pronunciation-derived, or visual speech representation associated with candidate $w_i$.

(v) Optionally compute an audio score $S_{audio}(W_i)$.

(vi) Fuse the scores, for example:

$$Score(w_i) \leq \alpha_{text} S_{text}(w_i) + \alpha_{lip} S_{lip}(w_i) + \alpha_{audio} S_{audio}(w_i)$$

(vii) Commit a correction only if the top fused candidate satisfies a confidence rule. In some embodiments, the weights are confidence normalized:

$$\alpha_m = \frac{C_m}{C_{text} + C_{lip} + C_{audio}},\ m \in \{\text{text, lip, audio}\}$$

where unused channels may be omitted.

Text Scoring

The text score may derive from edit distance, keyboard-adjacency cost, language-model probability, prior frequency, prior context, or combinations thereof. Some embodiments use a standard autocorrect engine score directly. Other embodiments rescale or normalize the engine's native score to a common range. If a module outputs log-probabilities, the system may convert them to linear form or keep all modalities in log space so long as scoring remains consistent. In some embodiments, the text-origin candidate list $W_{text}$ is the ordinary suggestion list produced by a spell-correction or autocorrect engine from the typed string $p_t$ without using image data. In Mode A, this text-origin list defines the universe of candidate text strings to be reranked.

Thus, the lip and optional audio channels do not inject new words in this mode, but instead provide additional candidate-specific evidence for candidates already present in $W_{text}$.

Visual Scoring

FIG. 13 illustrates candidate-specific visual compatibility scoring. Observed lip-movement evidence 114 and visual speech cues 118 may be compared with candidate-specific reference visual representations 120A-120C by lip-alignment scorer 122 to produce separate candidate-specific lip scores 122A-122C. Those scores may be provided to fusion controller 132 to generate correction result 136. In some embodiments, a candidate-specific lip-alignment score $S_{lip}(w_i)$, also referred to as a candidate-specific visual compatibility score, is computed by comparing observed visual speech cues corresponding to the current typed string with one or more reference viseme, syllable, phoneme, pronunciation-derived, or visual speech representations associated with candidate text string $w_i$. The observed visual speech evidence may include one or more of:

(i) a viseme sequence;
(ii) a syllable count or syllable-peak sequence;
(iii) mouth landmark trajectories;
(iv) waveform-derived visual features;
(v) peak timing information;
(vi) expanded visual speech states; or
(vii) other visual articulatory representations derived from image data of the mouth region.

For each candidate text string $w_i$, the system may obtain one or more reference representations associated with that candidate, such as:

(i) a reference viseme sequence;
(ii) an expected syllable count;
(iii) one or more viseme templates;
(iv) one or more expanded-state templates;
(v) a learned visual embedding; or
(vi) another pronunciation-derived visual representation.

The reference visual representation may be obtained from a pronunciation lexicon, a grapheme-to-phoneme module, a stored template library, a learned model, or another source. In some embodiments, multiple alternative reference templates are stored for a given word to reflect pronunciation variation, co-articulation variation, dialectal variation, or multiple plausible visual realizations. In some embodiments, the comparison used to compute $S_{lip}(w_i)$ may use one or more of:

(i) dynamic time warping;
(ii) edit distance;
(iii) confusion-weighted viseme edit distance;
(iv) template matching;
(v) neural matching;
(vi) transition-likelihood scoring over expanded visual speech states; or
(vii) combinations thereof.

In one class of embodiments, the comparison produces an intermediate visual distance or alignment cost for candidate $w_i$, which is then converted into $S_{lip}(w_i)$ such that lower distance yields higher compatibility. In another class of embodiments, the comparison produces a likelihood or similarity score directly. In some embodiments, the visual score incorporates multiple visual subcomponents, such as a viseme-sequence alignment term, a syllable-consistency term, a peak-alignment term, a transition-likelihood term over expanded visual speech states, or a learned visual-matching term. Non-limiting detailed embodiments for candidate-specific visual scoring are described in later sections. Accordingly, for a given text-origin candidate list $W_{text}$, the system may compute a set of candidate-specific lip scores:

$$S_{lip}(w_1), S_{lip}(w_2), \ldots, S_{lip}(w_N)$$

Each candidate therefore receives its own visual compatibility score based on how well that candidate's expected visual realization matches the user's observed mouth motion during entry of the current typed string. In some embodiments, the lip-movement evidence is used together with the typed string and the text-origin candidate list to disambiguate among candidate text strings, without requiring the lip-movement evidence by itself to uniquely identify the selected candidate text string. When a microphone is active, the system may also compute a candidate-specific audio score $S_{audio}(w_i)$, for example from posterior probabilities emitted by a compact ASR model, whisper-oriented ASR, phoneme posteriorgrams, CTC-derived phoneme sequences, or another acoustic representation.

In some embodiments, each of $S_{lip}(w_i)$ and $S_{audio}(w_i)$ may lie in the range [0, 1], and scores across words need not sum to 1.

Confidence Estimation and Normalization

A confidence value $C_m$ may be derived for each active modality. Non-limiting examples include:

(i) Text: inverse edit distance; gap between the top two suggestions; prefix consistency; language-model certainty.
(ii) Lip: lighting quality; landmark-tracking stability; viseme certainty; syllable confidence; template-match certainty.
(iii) Audio: SNR; posterior concentration; ASR posterior entropy; whisper-detection confidence.

The modality weights may then be normalized as:

$$\alpha_m = \frac{C_m}{C_{text} + C_{lip} + C_{audio}},\ m \in \{\text{text, lip, audio}\}$$

with omitted or inactive modalities excluded as appropriate. In some embodiments, modality confidence reflects overall trust in a channel at the current time, while candidate-specific scores $S_{text}(w_i)$, $S_{lip}(w_i)$, and $S_{audio}(w_{Wi})$ reflect how well each individual candidate fits the corresponding modality. Thus, the confidence-estimation process governs how strongly each modality influences fusion, while the candidate-specific scores govern which candidate is favored within that modality.

Late-Fusion Scoring

A non-limiting fused score is:

$$\mathrm{Score}(w_i)=\alpha_{text}S_{text}(w_i)+\alpha_{lip}S_{lip}(w_i)+\alpha_{audio}S_{audio}(w_i)$$

Learned or nonlinear combinations may replace the weighted sum. In some embodiments, the candidate having the strongest visual compatibility score may be identified for diagnostic, ranking, or explanatory purposes. However, in Mode A the final output need not be chosen using $S_{lip}(w_i)$ alone. Rather, the visual score is used together with the text-origin score and, when available, an audio-derived score to produce the fused value used for reranking and commitment.

Selection Rule

The candidate list $W_{text}$ may be reordered by the fused score. If the top candidate exceeds a threshold τ and beats the runner-up by at least 4, the system may commit that candidate automatically. If no candidate exceeds τ, the system may retain the spell-checker's original top suggestion or leave the typed string unchanged. In some embodiments, the selection rule may also incorporate entropy, stability over successive updates, or application-specific replacement policies. Mode A is therefore compatible with either immediate commitment or suggestion-only reranking, depending on the needs of the host application.

Illustrative Example—Mistyped "Resperation"

A non-limiting example is:

(i) desperation: Stext=0.59, Slip=0.05, Saudio=0.10, combined score=0.382.

(ii) reparation: Stext=0.25, Slip=0.04, Saudio=0.05, combined score=0.175.

(iii) respiration: Stext=0.16, Slip=0.88, Saudio=0.81, combined score=0.438.

If $C_{text}$=0.60, $C_{lip}$=0.25, and $C_{audio}$=0.15, then alphatext=0.60, alphalip=0.25, and alphaaudio=0.15. Since 0.438 exceeds the threshold t, "respiration" is promoted to first place and committed automatically.

Implementation Notes (i) Low latency: rescoring a handful of words may require on the order of one millisecond on a mobile CPU.

(ii) On-device privacy: lip frames may be processed locally and discarded.

(iii) Resource footprint: the implementation can be lightweight in memory and compute.

(iv) Personalized thresholds: τ, Δ, $C_{low}$, and $C_{high}$ may be user- or app-tuned.

In some embodiments, the visual scoring process may be performed after sufficient visual evidence for the current typed string has been captured. In other embodiments, provisional scores may be refreshed incrementally during typing or mouthing, with later refinement as additional evidence arrives. Thus, Mode A is compatible both with stable token-level scoring and with incremental partial scoring, while remaining a text-first reranking mode.

Strengths and Limitations

Mode A excels when typing accuracy is moderate and the auxiliary channels merely disambiguate among text-generated candidates. Because the text-origin candidate list is generated first and the lip and optional audio channels are applied only to that list, Mode A is computationally lightweight and compatible with existing autocorrect stacks. A limitation is that the intended word generally must already appear in $W_{text}$. If it does not—for example, in a case like conrfmatipn intended as confirmation—the controller may escalate to Mode B, whose early-fusion logic can inject new candidates at higher compute cost.

Confidence-Based Escalation

Mode A may be used as the default low-compute path. If text confidence is low, if the text-origin list appears unreliable, or if the auxiliary channels are highly confident that the intended word is absent from the current list, a controller may escalate to Mode B. In this way, Mode A can serve as the fast default reranking mode while Mode B provides stronger candidate-recovery capability for more difficult cases.

Mode B—Joint Candidate Generation (Early Fusion)

FIG. 3 illustrates a non-limiting Mode B-1 heuristic early-fusion process in which visual speech cues 308 and optional audio-derived cues 310 may be used before final scoring to retrieve, add, or inject candidate text strings 312, including candidates absent from the standard autocorrect candidate list $W_{text}$ 304. Mode B fuses typed characters, lip-movement evidence, and, when available, whisper-level audio evidence before or during candidate generation. By combining the modalities earlier than in Mode A, the system can recover the intended candidate text string even when the typed string is severely corrupted, when the intended candidate is absent from an ordinary text-only suggestion list, when the typed prefix is sparse, or when the user provides little or no useful typed input but does provide lip or whisper evidence.

In one non-limiting Mode B embodiment, a standard autocorrect candidate list is first identified as the ordinary list that would be produced from the typed string alone. Visual speech cues derived from lip-movement evidence may then be used before or during candidate generation to retrieve, add, or inject one or more candidate text strings, including at least one candidate text string that was not present in the standard autocorrect candidate list generated from the typed string alone. Whereas Mode A begins with a text-origin candidate list and uses auxiliary channels only to rerank that list, Mode B allows visual speech information and optional whisper evidence to influence candidate retrieval, candidate pruning, and candidate scoring earlier. As a result, Mode B can consider words that would not survive strict text-only gating.

Mode B is particularly useful for a "not-even-on-the-list" correction failure, in which a text-only autocorrect engine does not surface the intended candidate at all. In such cases, visual descriptors such as syllable count, partial viseme sequence, first or last visual category, or a learned visual embedding may retrieve a visually compatible candidate family even when ordinary character edit distance or prefix matching is insufficient.

Confidence Layers Used in Mode B

In some embodiments, Mode B uses multiple layers of confidence rather than a single undifferentiated score. This improves robustness because some evidence may be strong enough to act as a hard constraint, while weaker evidence may still be used in a softer scoring role. A non-limiting implementation uses the following confidence layers:

(i) Cue-confidence $q_i$: confidence in a specific pruning cue, such as a syllable count, first viseme class, last viseme class, salient mouth-shape class, likely final nasal-like pattern, strong word-level posterior $P_{ASR}(w)$, phoneme posterior $P_{CTC}(\varphi)$, likely onset class, likely ending class, or another compact derived abstraction.

If $q_i \geq q_{hard}$, the cue may act as a hard filter during pruning.

(i) Candidate-specific scores $S_{text}(w)$, $S_{lip}(w)$, and $S_{audio}(w)$: scores that measure how well candidate text string w fits the text, lip, and optional audio evidence.

(ii) Modality-level confidence $C_{text}$, $C_{lip}$, and $C_{audio}$: overall trust weights for the modalities, which may be normalized into fusion coefficients.

(iii) Final fused score Score(w): value used to reorder or commit candidates.

In plain terms, $q_i$ measures confidence in a specific pruning cue, while $S_{text}(w)$, $S_{lip}(w)$, and $S_{audio}(w)$ are candidate-specific scores, and $C_{text}$, $C_{lip}$, and $C_{audio}$ represent the system's overall trust in each modality at the current time.

Mode B Inputs, Features, Visual Descriptors, Pruning Cues, and Candidate Sets

For clarity, the following non-limiting symbols are used in the Mode B description:

(i) pr: current typed prefix, typed string, or other text input state.

(ii) Vt: current visual evidence stream, which may include raw lip frames, mouth landmarks, viseme probabilities, syllable peaks, waveform-derived visual features, expanded-state representations, or other derived visual features.

(iii) At: current optional audio evidence stream, which may include raw audio features, whisper-acoustic features, ASR n-best hypotheses, word posteriors, phoneme posteriors, CTC-derived outputs, or other derived audio evidence.

(iv) $W_{text}$: the text-origin candidate list produced by an ordinary spell-correction or autocorrect engine from the typed string alone, without using image data.

(v) $L_0$: a broader relaxed-gate text pool used inside the heuristic early-fusion path.

(vi) $W_{vis}$: a candidate set injected from visual descriptors, including visemes.

(vii) $L_1$: the combination of $L_0$ and $W_{vis}$.

(viii) $L_2$: $L_1$ plus optional audio-injected candidates.

(ix) $W_{aux}$: the surviving candidates after pruning.

(x) $W_{fused}$: the final candidate set subjected to multimodal scoring.

In plain terms, $W_{text}$ is the ordinary autocorrect list from the typed string alone, $L_0$ is a broader relaxed text pool, $W_{vis}$ contains candidates retrieved or injected from visual speech cues, $L_1$ and $L_2$ are working pools after visual and optional audio injection, $W_{aux}$ contains candidates surviving optional pruning, and $W_{fused}$ is the final multimodal candidate set subjected to scoring. In some embodiments, the system first extracts features from the visual and optional audio streams. Features are generally lower-level measured or computed quantities, such as mouth landmarks, mouth-height waveforms, framewise viseme probabilities, log-Mel audio features, or phoneme-posterior vectors. From these features, the system may derive more compact summaries that are more useful for early retrieval or pruning.

As used herein, a visual descriptor is a compact summary derived from the visual stream and usable for candidate retrieval, candidate scoring, or both. Non-limiting examples include:

(i) estimated syllable count;

(ii) a viseme sequence or partial viseme sequence;

(iii) likely first viseme;

(iv) likely last viseme;

(v) salient mouth-shape class;

(vi) likely ending class; and (vii) related pronunciation-relevant abstractions. Likewise, the audio stream may yield compact audio descriptors, such as:

(viii) a likely phoneme sequence;

(ix) strong whisper support for a word;

(x) likely onset class;

(xi) likely ending class; or (xii) other compact audio summaries. Not every extracted feature is elevated into a higher-level decision variable.

In some embodiments, a derived descriptor is selected for early use when it satisfies one or more of the following criteria:

(i) sufficient stability over a short interval;

(ii) sufficient discriminative value for narrowing the candidate set;

(iii) sufficiently low computational cost for early retrieval or pruning;

(iv) sufficient compatibility with candidate metadata such as syllable count, onset class, ending class, viseme template, or pronunciation-derived representation; and/or (v) sufficient confidence estimability so that a confidence value can be meaningfully assigned.

As used herein, a pruning cue is a selected derived descriptor, or a compact candidate-relevant abstraction derived from one or more descriptors, that is used in the pruning stage together with an associated cue-confidence value $q_i$. Thus:

Stated more compactly, a descriptor may be used for retrieval, scoring, pruning, or combinations thereof; a pruning cue is a descriptor or derived abstraction used specifically for hard or soft pruning with an associated confidence value.

(i) features are lower-level evidence;

(ii) visual or audio descriptors are compact derived summaries; and (iii) a pruning cue is a descriptor or cue abstraction that is specifically used for pruning because it is stable enough, useful enough, and sufficiently confidence-estimable.

For example, frame-level viseme probabilities and mouth-opening peaks over a short interval may be processed to derive an estimated four-syllable structure and a likely final nasal-like visual class. Those derived values may first be used as visual descriptors to retrieve candidates from a viseme-syllable index. If confidence in those same derived values later exceeds a pruning threshold, they may also be used as pruning cues to eliminate candidates having clearly inconsistent syllable counts or incompatible endings. By contrast, a noisy per-frame fluctuation that lacks sufficient confidence or usefulness may remain only a lower-level feature and need not be used either for retrieval or pruning. In some embodiments, cue-based pruning is optional.

If no derived descriptor is sufficiently reliable or useful, the system may omit pruning and proceed directly to candidate-specific multimodal scoring.

Sub-Modes

Mode B may be implemented in at least two non-limiting sub-modes:

(i) B-1 Heuristic Fusion: relaxed edit-distance gating widens the text pool; visual descriptors, including visemes, then inject new candidates, and selected pruning cues may later prune mismatches. Optional whisper-audio evidence may further add candidates or influence scores.

(ii) B-2 Neural Fusion: a learned multimodal model ingests ($\langle p_t, V_t, A_t \rangle$) and produces a joint output distribution or score vector over candidate text strings, tokens, or vocabulary items.

The B-1 embodiment is staged, interpretable, and light-weight. The B-2 embodiment is more end-to-end and learns multimodal interactions more directly from data.

Mode B-1 Heuristic Early Fusion

As shown in FIG. 3, typed string 302 may produce a standard autocorrect candidate list $W_{text}$ 304 and a broader relaxed text-derived candidate pool $L_0$ 306. Visual cues 308 and optional audio-derived cues 310 may be used to form an early-fusion working pool 314, optionally prune or down-rank candidates to produce $W_{aux}$ 316, form fused candidate set $W_{fused}$ 318, compute candidate-specific score components 320, perform early-fusion multimodal scoring/selection 322, and output correction result 324. A non-limiting heuristic early-fusion implementation proceeds as follows.

Incremental Feature Capture

Maintain typed prefix or typed string $p_t$, current visual evidence stream Vt, and optional audio evidence stream $A_t$. In some embodiments, these streams correspond to the current typed string, current prefix, or current input interval. In some embodiments, the visual and audio evidence may be associated with a corresponding text-entry interval, although Mode B is not limited to any particular segmentation method.

Relaxed Text Gate

Keep each lexicon word whose edit distance from $p_t$ satisfies:

$$ED(p_t, w) \leq d_{max}$$

For example, $d_{max}$ may be 3, and the result may be $L_0$. This relaxed gate is intentionally broader than a strict ordinary autocorrect threshold. Its purpose is to prevent the intended word from being discarded too early when the typed string is badly corrupted. In some embodiments, $W_{text}$ is the ordinary text-origin candidate list produced by a conventional autocorrect engine, while $L_0$ is a broader early-fusion working pool formed using relaxed thresholds. Thus, $L_0$ may contain additional words beyond the ordinary text-only list.

Derive Visual Descriptors and Optional Audio Descriptors

From the visual and optional audio feature streams, derive compact candidate-relevant descriptors, such as:

(i) estimated syllable count;
(ii) a viseme sequence or partial viseme sequence;
(iii) likely first viseme;
(iv) likely last viseme;
(v) salient mouth-shape class;
(vi) probable onset class;
(vii) probable ending class; or
(viii) strong audio support for a phoneme or word.

In some embodiments, only a subset of such descriptors is selected for early retrieval use, based on stability, discriminative value, or computational usefulness.

Visual-Descriptor Candidate Injection

Use the selected visual descriptors, including visemes, to retrieve additional candidates from a viseme-syllable hash or similar index. These descriptors may include, by way of example, syllable count, first viseme, last viseme, salient mouth-shape class, or partial viseme sequence. This retrieval returns a set $W_{vis}$. Set:

$$L_1 = L_0 \cup W_{vis}$$

This step allows visual evidence to introduce candidates that were absent from the strict text-origin list, including candidates absent from the standard autocorrect candidate list generated from the typed string alone. Such retrieval may be based on expected visual speech characteristics rather than based solely on edit distance from the typed string.

Audio Injection

If a microphone is active, add an ASR n-best list NASR or another audio-derived candidate set and set:

$$L_2 = L_1 \cup N_{ASR}$$

Otherwise, set:

$$L_2 = L_1$$

Thus, whisper-level audio is optional and additive.

Cue-Confidence Pruning

In some embodiments, one or more of the derived visual or audio descriptors used earlier for candidate retrieval may also be used as pruning cues if their associated confidence values are sufficiently high. For each selected pruning cue i, compute a cue-confidence value $q_i$ from the underlying supporting evidence. In some embodiments, this may be done by max-pooling or mean-pooling frame-level or short-window posteriors over an interval such as approximately 200 ms. For visual pruning cues, these posteriors may be viseme probabilities, syllable-peak confidences, or related visual-speech confidences. For audio pruning cues, they may be word-level posterior $P_{ASR}(w)$, phoneme posterior $P_{CTC}(\varphi)$, or another acoustic-confidence measure. If:

$$q_i \geq q_{hard}$$

If the cue-confidence value satisfies the hard-pruning threshold, the pruning cue may be used as a hard filter to prune candidates in $L_2$ that clearly contradict the cue. Otherwise, the cue need not eliminate candidates and may instead influence later scoring only. The surviving candidates form $W_{aux}$.

$$W_{aux}$$

In plain terms, strong pruning cues can act as hard filters, while weaker cues remain soft evidence. For example, the same derived values that were earlier used as visual descriptors for retrieval—such as an estimated four-syllable structure and a likely final nasal-like class—may later be reused as pruning cues. If the resulting cue confidence exceeds $q_{hard}$, candidates with clearly inconsistent syllable counts or incompatible endings may be pruned. If the cue confidence does not exceed $q_{hard}$, the same information may still influence candidate scoring without eliminating candidates. As used herein, a candidate "contradicts" a pruning cue when the candidate's expected metadata, pronunciation-derived representation, or candidate-specific reference pattern is clearly inconsistent with the cue under the implementation's comparison rules.

Non-limiting examples include a strong four-syllable pruning cue contradicting a clearly two-syllable candidate, or a strong final nasal-like pruning cue contradicting a candidate whose expected ending lacks that class of visual pattern.

Multimodal Union and Candidate-Specific Scoring Form:

$$W_{fused} = W_{text} \cup W_{aux}$$

For each candidate text string $w \in W_{fused}$, compute candidate-specific scores. For a candidate not present in the ordinary text-origin list, the text-derived score may be set to zero, assigned a neutral or fallback value, estimated from relaxed edit distance, inferred from a language model, inherited from a related candidate, or otherwise normalized for fusion with a visual-derived or audio-derived score. A non-limiting set of score components is:

(i) $S_{text}(w)$: spell-checker or text-derived score;

(ii) $S_{lip}(w)$: candidate-specific visual compatibility score;

(iii) $S_{audio}(w)$: whisper posterior, phoneme posterior, or another audio-derived score, or 0 if no audio is available.

In some embodiments, $S_{lip}(w)$ is computed by obtaining one or more candidate-specific reference visual representations for candidate text string w and comparing the observed visual evidence against those reference representations. The observed visual evidence may include one or more of:

(i) viseme sequence;

(ii) syllable count;

(iii) syllable-peak sequence;

(iv) landmark-derived features;

(v) peak timing;

(vi) expanded-state sequence; or (vii) another visual articulatory representation.

The candidate-specific reference visual representation may include one or more of:

(i) a reference viseme sequence;

(ii) an expected syllable count;

(iii) one or more viseme templates;

(iv) one or more expanded-state templates;

(v) a learned visual embedding; or (vi) another pronunciation-derived representation.

The comparison used to generate $S_{lip}(w)$ may use one or more of:

(i) dynamic time warping;

(ii) edit distance;

(iii) confusion-weighted viseme edit distance;

(iv) syllable mismatch penalty;

(v) template matching;

(vi) transition-likelihood scoring over expanded visual speech states;

(vii) neural matching; or (viii) combinations thereof.

In some embodiments, the visual comparison produces an intermediate distance or alignment cost, which is then normalized and inverted so that lower cost yields higher $S_{lip}(w)$. In other embodiments, it produces a likelihood or similarity score directly. In some embodiments, syllable information is incorporated as a separate visual term or penalty. Thus, $S_{lip}(w)$ is a candidate-specific score reflecting how well candidate w matches the observed visual evidence for the current input. In some embodiments, the modality weights are confidence normalized:

$$\alpha_m = \frac{C_m}{C_{text} + C_{lip} + C_{audio}},\ m \in \{\text{text, lip, audio}\}$$

A non-limiting fused score is:

$$\text{Score}(w)=\alpha_{text}S_{text}(w)+\alpha_{lip}S_{lip}(w)+\alpha_{audio}\,S_{audio}(w)$$

Commitment

Commit when:

$$\max_{w}\ \text{Score}(w) \geq \tau_B$$

For example, the threshold may be in a range of about 0.35 to 0.50, or the system may commit when entropy satisfies the following condition.

$$H \leq H_{min}$$

For example, $H_{min}$ may be about 0.7 nat. In some embodiments, the preceding steps may refresh on each keystroke or approximately every 50 ms of updated visual and/or audio input, permitting the system to adapt incrementally as the evidence changes.

Mode B-2 Neural Early Fusion

FIG. 4 illustrates a high-level neural early-fusion embodiment in which typed input 402, lip/visual input 404, and optional audio input 406 are processed by text encoder 408, lip encoder 410, and optional audio encoder 412. Multimodal fusion or cross-modal attention 414 produces joint output distribution 416, which may be evaluated by commit/selection rule 418 to produce output correction result 420. This subsection provides the high-level architecture for neural early fusion. Additional non-limiting implementation, training, augmentation, and deployment details are provided below under SUPPLEMENTAL NEURAL EARLY-FUSION IMPLEMENTATION.

In a neural embodiment, Mode B may be implemented using a learned multimodal model that receives typed input, visual speech evidence, and optional whisper audio and directly produces a joint output distribution or score vector for candidate correction. Unlike B-1, which explicitly widens, injects, prunes, and scores candidate pools in stages, B-2 learns multimodal interactions more directly from training data.

Inputs to the Neural Model

A non-limiting neural embodiment may receive one or more of the following:

(i) Text input: current typed prefix, current typed string, recent typed characters, tokenized character sequence, word-piece sequence, or another text representation derived from keystrokes.

(ii) Visual input: cropped lip frames, mouth landmarks, viseme probabilities, syllable-peak sequence, mouth-opening waveform, expanded-state sequence, learned visual embeddings, or another representation derived from image data of the mouth region.

(iii) Audio input: raw audio frames, log-Mel spectrogram, whisper-acoustic features, phoneme posteriorgrams, ASR n-best hypotheses, word posteriors, CTC outputs, or another representation derived from low-amplitude audio.

In some embodiments, the neural model operates on a current typed prefix or string together with corresponding visual and optional audio evidence from a current input interval.

Modality-Specific Encoders and Fusion

In a non-limiting example, the model includes:

(i) a text branch configured to encode typed input;

(ii) a lip branch configured to encode visual speech information;

(iii) an audio branch configured to encode optional whisper-level audio; and (iv) a fusion stage configured to combine information from the modality-specific branches into a joint representation.

The text branch may use embeddings together with recurrent layers, convolutional layers, attention-based layers, transformer layers, or other text encoders. The lip branch may use convolutional, recurrent, temporal-convolution, attention-based, or transformer-based encoders. The audio branch may use acoustic encoders, recurrent layers, temporal convolution, attention-based layers, transformer blocks, or other audio encoders. By way of one non-limiting example, the lip branch may include a CNN-GRU encoder, the audio branch may include an LSTM-based encoder, and the fusion stage may use one or more attention layers. In another embodiment, the same functional roles may be implemented by different neural components.

The fusion stage may receive encoded representations from the text, lip, and audio branches and combine them using attention, concatenation, gating, cross-attention, learned weighted fusion, or another learned fusion mechanism. In some embodiments, the fusion stage produces a joint latent representation used to score output candidates.

Joint Output Distribution and Decoding

In some embodiments, the neural model produces:

(i) a joint probability distribution over candidate text strings;
(ii) a score vector over vocabulary items;
(iii) a ranked candidate list; or
(iv) another correction-oriented output derived jointly from the text, visual, and optional audio inputs.

A non-limiting output is:

$$P_{joint}(w)$$

which represents the model's estimated probability that the intended word is w, conditioned jointly on the typed input, visual speech evidence, and optional audio evidence. In some embodiments, the model may operate as a direct decoder, meaning that it directly outputs the intended corrected word distribution. In other embodiments, the model may operate as a neural reranker or auxiliary scorer, meaning that the neural output is used together with another candidate source.

Soft-Max and Commit

In a non-limiting embodiment, a soft-max layer converts the model's raw output scores into probabilities over candidate text strings or vocabulary items. Let the top output word be $w_1$, and let entropy be:

$$H = -\sum_{w} P_{joint}(w) \log P_{joint}(w)$$

Commit $w_1$ when:

$$P_{joint}(w_1) \geq \tau_B$$

$$H \leq H_{min}$$

Thus, the neural embodiment may commit when either the top candidate is sufficiently strong or the overall output distribution is sufficiently concentrated.

Training and Inference Embodiments

In some embodiments, the neural model may be trained on examples containing:

(i) typed input;
(ii) corresponding visual speech evidence;
(iii) optional whisper audio; and
(iv) a ground-truth intended word or intended output token. Training may use one or more losses, such as:
(v) cross-entropy loss;
(vi) ranking loss;
(vii) auxiliary viseme-prediction loss;
(viii) auxiliary syllable-prediction loss;
(ix) CTC-style loss; or
(x) combinations thereof. Training may also include augmentation of:
(xi) typed errors;
(xii) adjacent-key substitutions;
(xiii) omissions;
(xiv) transpositions;
(xv) mouthing speed;
(xvi) lighting conditions;
(xvii) head pose;
(xviii) acoustic noise;
(xix) pronunciation variation; or
(xx) other sources of multimodal variability. At inference time, the neural model may run entirely on-device, partially on-device, or in another deployment configuration.

In some embodiments, the model updates incrementally as the typed prefix, visual evidence, and optional audio evidence evolve. In some embodiments, the neural model directly outputs $P_{joint}(w)$ without separately exposing an explicit $S_{lip}(w)$. In other embodiments, branch-specific or auxiliary scores may still be exposed for interpretability, calibration, distillation, reranking, or diagnostic purposes.

Representative Non-Limiting Neural Implementation

By way of one representative non-limiting on-device embodiment, the B-2 neural model may be implemented as follows:

(i) 10-layer transformer or multimodal sequence model with approximately 18 million parameters and approximately 9 MB INT8 footprint.
(ii) Text branch: last 32 characters, 50 k word-piece vocabulary.
(iii) Lip branch: 24-frame (approximately 800 ms) stack of 68-point mouth landmarks, compressed to a lower-dimensional representation by a CNN-GRU encoder.
(iv) Audio branch: 40-bin log-Mel spectrogram processed by a two-layer bidirectional LSTM or another audio encoder.
(v) Fusion stage: two cross-modal attention layers producing a joint latent representation, followed by a vocabulary soft-max.
(vi) Runtime: approximately 22 ms per inference on a mobile NPU and less than approximately 45 ms on CPU fallback.
(vii) Privacy: raw camera and microphone data may remain on-device, and no cloud connectivity is required.

These values are illustrative only and may vary by device class, vocabulary size, compression level, architecture choice, and implementation.

ILLUSTRATIVE EXAMPLES

The following non-limiting examples illustrate the kinds of situations Mode B is designed to address:

(i) Typed "conrfmatipn" intended as confirmation may follow the B-1 path using four-syllable and final-nasal-like visual descriptors, later used as strong pruning cues, for example q>0.90, to produce confirmation.
(ii) Mouth-only "algorithm" may follow the B-2 path when $P_{joint}=0.82 \geq \tau_B$, producing algorithm.
(iii) Typed "recei-" intended as receive may follow the B-2 path when $P_{joint}=0.38 \leq \tau_B$ but $H=0.58<H_{min}$, producing receive.
(iv) Typed "definatly" intended as definitely may follow the B-1 path using a three-syllable visual pattern, missing/f/, and strong pruning-cue confidence, for example q≥0.85, to produce definitely.
(v) Typed "tmrw" intended as tomorrow may follow the B-2 path when whisper evidence lifts $P_{joint}=0.78>\tau_B$, producing tomorrow.
(vi) Typed "cmnctn" intended as communication may follow the B-2 path using a five-syllable lip pattern plus initial/k/and final "shun," with $P_{joint}=0.74 \geq \tau_B$, producing communication.

Implementation Notes (i) Compute management: load the deeper neural embodiment only when text confidence is low or when the expected gain justifies the compute.

(ii) Dictionary partitioning: viseme-hash, syllable-hash, phonetic-hash, or related descriptor-based indexing may let the heuristic early-fusion path scan only a small fraction of the lexicon.

(iii) Privacy: raw camera and microphone data may remain on-device in a secure enclave or another protected local environment.

(iv) Battery fallback: if power is low, the system may revert to Mode A or another lower-compute path.

(v) Non-transitory medium: instructions may reside on a non-transitory computer-readable medium and execute on a mobile SoC or another computing platform.

In this way, Mode B can remain privacy-aware and power-aware while still providing a stronger candidate-recovery pathway than ordinary text-only autocorrect.

Mode C—Seamless Multimodal Entry ("Any-Subset" Operation)

FIG. 5 illustrates an any-subset operation in which typed-input channel 502, lip-movement/visual channel 504, and optional whisper/audio channel 506 feed active-modality or presence-state detection 508 and a shared multimodal correction pipeline 510 without requiring explicit user toggling. Confidence and active-modality weighting 512, any-subset multimodal scoring/fusion 514, and commit/preview/suggestion rule 516 may produce correction result 518. Mode C emphasizes runtime flexibility. The same shared autocorrect or spell-correction pipeline may operate using one, two, or all of the typed-input channel, lip-movement input channel, and whisper-level audio input channel without requiring explicit user toggling between a typing mode, mouthing mode, whispering mode, or mixed-input mode.

Mode C exposes the multimodal correction architecture directly to the user as a seamless runtime operating mode in which any subset of the available modalities may be active at a given time. The user need not toggle between typing-only, mouthing-only, whispering-only, or mixed modes. Instead, the same visible suggestion and commit pipeline may remain active whether the user is typing only, typing while mouthing, typing while whispering, mouthing only, whispering only, or using all three together. Mode C differs from Mode A in an important respect. Mode A is text-first: it assumes that typed input is the anchor and that auxiliary channels are used only to rerank text-origin candidates.

Mode C, by contrast, is a modality-orchestration mode that supervises which channels are currently active and allows the system to operate continuously even when typing is sparse, intermittent, or absent. In many embodiments, Mode C reuses the underlying early-fusion technology of Mode B. In some embodiments, however, when only text is active, the controller may effectively behave like Mode A or like an ordinary text-only autocorrect engine. Thus, Mode C is best understood as a seamless any-subset operating framework built on top of the multimodal correction architecture.

Purpose and User Experience

The purpose of Mode C is to expose multimodal entry directly to the end user in a friction-free manner. The user need not switch among typing, mouthing, and whispering modes. Instead, the same suggestion bar, correction mechanism, and commit behavior remain available across changing modality combinations.

This is useful in scenarios where:

(i) the user starts typing a word and then silently mouths the rest;

(ii) the user types an abbreviation and softly whispers the intended completion;

(iii) the user enters little or no text but provides strong visual or whisper evidence;

(iv) camera or microphone availability changes dynamically; or (v) the user alternates among modalities due to fatigue, privacy, noise constraints, or convenience.

Thus, Mode C provides a unified multimodal text-entry experience in which the user may move fluidly among available input channels without explicit mode switching.

Stream Presence Detection

In some embodiments, the system maintains presence or activity indicators for the available streams, for example:

(i) $text_{on} \in \{0, 1\}$ (ii) $lip_{on} \in \{0, 1\}$ (iii) $audio_{on} \in \{0, 1\}$ These indicators are non-limiting examples of whether the corresponding stream is sufficiently available for use.

For example:

(i) $text_{on}$ may indicate recent text-entry activity, keyboard focus, or another indication that typed input is presently active.

(ii) $lip_{on}$ may indicate that the camera is enabled and that usable visual speech tracking is available.

(iii) $audio_{on}$ may indicate that the microphone is enabled and that usable low-amplitude audio activity is present.

In some embodiments, presence is determined using timing windows, amplitude thresholds, tracking-quality thresholds, permission status, or combinations thereof. Specific timing values or amplitude values are illustrative only and may vary by implementation. If a stream is absent or unusable, the corresponding modality contribution may be reduced or omitted. In some embodiments, if a flag is 0, the associated channel confidence $C_m$ and/or per-word score $S_m(w)$ may be set to zero, allowing the remaining active modalities to continue automatically.

Shared Fusion Path Reuse

In some embodiments, Mode C reuses the Mode B early-fusion path directly. In other embodiments, Mode C reuses the same multimodal scoring framework while dynamically selecting an available processing path depending on:

(i) which modalities are active;

(ii) current confidence values;

(iii) device resources;

(iv) privacy constraints; and/or (v) power constraints.

Thus, in one non-limiting embodiment:

(i) the heuristic Mode B-1 path remains resident and available as a lightweight always-on path;

(ii) the neural Mode B-2 path is available on sufficiently capable devices and may be loaded or unloaded dynamically; and (iii) when only text is active, the controller may behave as a reduced path equivalent to Mode A or to ordinary text-only correction.

Mode C therefore need not require a wholly separate scoring algorithm. Rather, it may serve as a runtime controller that exposes the underlying multimodal correction engine in a seamless and modality-agnostic way.

Any-Subset Operation

For active-modality fusion, unavailable or inactive channels may be omitted from multimodal scoring or assigned a zero contribution. If no auxiliary channel has sufficient confidence, if all confidence values are zero, or if no active modality produces reliable evidence, the system may refrain from automatic commitment, retain the typed string, present no correction, present only text-origin suggestions, or wait for additional evidence. Mode C supports continuous operation with any subset of modalities active. In a non-limiting embodiment, the system feeds the currently available inputs into a shared fusion path:

(i) typed input $p_t$, which may be empty if no useful text is present;
(ii) live visual evidence $V_t$, if ($lip_{on}=1$); and
(iii) optional audio evidence $A_t$, if ($audio_{on}=1$).

In embodiments using a heuristic or explicitly scored fusion path, a non-limiting fused score may be:

$$Score(w)=\alpha_{text}S_{text}(w)+C_{lip}S_{lip}(w)+\alpha_{audio}S_{audio}(w)$$

where the normalized modality weights may be:

$$\alpha_m = \frac{C_m}{C_{text}+C_{lip}+C_{audio}},\ m \in \{\text{text, lip, audio}\}$$

Thus:

(i) if a modality is absent, its contribution may be zero;
(ii) if only one modality is active, the score may collapse to that modality's contribution; and
(iii) if multiple modalities are active, the system blends them automatically.

In embodiments using a neural early-fusion path such as Mode B-2, the system may instead compute a joint neural output distribution, for example:

$$P_{joint}(w)$$

representing the probability that the intended word is w conditioned jointly on the currently active inputs. In such embodiments, commitment may be based on $P_{joint}(w)$, entropy, or another neural confidence measure rather than on separately exposed component scores. Accordingly, Mode C does not require a single fixed internal scoring representation. Rather, it allows the same seamless user-facing behavior to be preserved while the underlying active engine may use either an explicit fused score Score(w), a neural joint distribution $P_{joint}(w)$, or another multimodal confidence representation.

Text-Present and Text-Absent Embodiments

In some embodiments, text is present and serves as a partial anchor. For example, the user may type the beginning of a word and mouth or whisper the remainder. In such cases, the system may use the typed input to narrow the candidate set while using visual or audio evidence to disambiguate, complete, or correct the word. In other embodiments, little or no useful text is present. For example:

(i) the user may mouth a word without typing;
(ii) the user may whisper a word without typing; or
(iii) the typed prefix may be too weak to be useful.

In such cases, a null-text or sparse-text embodiment may be used. For example:

(i) in a heuristic embodiment, the system may begin from a full lexicon, a context-limited lexicon, or another broader candidate source and rely more heavily on visual and/or audio evidence for candidate retrieval and scoring; and
(ii) in a neural embodiment, the text branch may receive a null-text token, a zero-valued text embedding, an empty prefix representation, or another placeholder indicating the absence of meaningful text input.

Thus, Mode C is capable of both text-assisted multimodal entry and non-text or weak-text multimodal entry.

Text-absent or weak-text operation need not require unrestricted general lip reading. In some embodiments, the candidate source may be constrained by recent textual context, application context, a user dictionary, a domain dictionary, a command vocabulary, a contacts list, a proper-name list, a language-model prior, or another vocabulary or policy constraint. When only lip-movement evidence is active, the system may present suggestion-only output or require a higher confidence, margin, entropy, stability, or user-confirmation threshold before automatic commitment.

Commit and Preview Rule

In some embodiments, Mode C uses the same commit and preview logic as the underlying active fusion engine. For example, in an explicitly scored embodiment, the system may:

(i) commit the top candidate when maxw Score(w)≥τ, or when entropy is below a threshold $H_{min}$; and
(ii) otherwise display the top-k suggestions in the same suggestion interface.

In a neural embodiment, the system may:

(i) commit the top candidate $w_1$ when $P_{joint}(w_1)\geq\tau$, or when the entropy of the joint output distribution is below a threshold; and
(ii) otherwise display the top-k neural suggestions.

In some embodiments, the same visible suggestion bar is reused regardless of which modality subset is active. Accordingly, a word that originates primarily from lip evidence, whisper evidence, or a combination of channels may still appear in the same suggestion region ordinarily used for typing-based autocorrect. This provides a consistent user experience across modality combinations.

Illustrative Flow Snapshots

The following non-limiting examples illustrate any-subset operation:

(i) If the user types "algor" and then mouths "algorithm" with text and lip active and audio inactive, Slip or a corresponding neural multimodal score may support completion and commitment of "algorithm."
(ii) If the user types garbled "conrf" and mouths "confirmation" with text and lip active and audio inactive, visual evidence may inject or elevate the missing word and correct the text to "confirmation."
(iii) If the user types "Szcz" and mouths "Szczęsny" with text and lip active and audio inactive, fusion may supply diacritics and commit the surname.
(iv) If the user types the abbreviation "tmrw" and softly whispers "tomorrow" with text and audio active and lip inactive, whisper evidence may lift the full word and insert "tomorrow."
(v) If the user mouths "glycolysis" without typing and only lip evidence is active, visual evidence alone may be sufficient to insert the word. These examples illustrate that the user may move among modality combinations without explicit switching and still receive suggestions and corrections through the same visible interface.

Implementation Notes (i) Built on shared fusion logic: in many embodiments, Mode C adds presence detection, orchestration logic, and runtime routing while reusing the same underlying fusion mathematics and commit controller used elsewhere herein.

(ii) Power scaling: camera and microphone pipelines may idle when their corresponding streams are absent; typing-only moments may therefore consume little or no more power than ordinary text correction.

(iii) Optional UI cues: small icons, highlights, or annotations may indicate the dominant modality that contributed to an auto-committed word, but such cues are optional.

(iv) Privacy-aware degradation: if camera or microphone permission is unavailable, the corresponding stream may simply remain inactive and the system may rely automatically on the remaining modalities.

(v) Resource-aware selection: the controller may dynamically choose among heuristic, neural, reduced, or text-only processing depending on available compute and memory.

Advantages of Mode C

Mode C provides several practical advantages:

(i) Friction-free modality switching: the user may alternate among typing, mouthing, and whispering without explicit mode changes.

(ii) Unified suggestion pipeline: all available streams feed the same visible suggestion and correction mechanism, yielding consistent feedback.

(iii) Graceful degradation: if camera or microphone input is unavailable, the system falls back automatically to the remaining active streams.

(iv) Support for quiet and hands-free interaction: the same framework supports text-assisted entry, quiet whisper-assisted entry, mouth-only entry, and mixed entry.

(v) Compatibility with multiple underlying engines: Mode C can reuse heuristic, explicitly scored, neural, or hybrid multimodal correction paths while exposing them as a seamless user-facing operating mode.

Accordingly, Mode C extends the benefits of Modes A and B to hands-free, quiet-speech, intermittent-input, and fatigue-relief scenarios while preserving a unified text-entry experience.

Mode D—Orthographic Proxy-String Injection (Reverse-Garbled Injection)

Mode D may be described using implementation-neutral terminology such as orthographic proxy-string injection, and may also be referred to herein as reverse-garbled injection. In this mode, lip-movement evidence, whisper-level audio evidence, or both may be converted into a bounded set of plausible misspellings or orthographic proxy strings, which are then submitted with the current typed string to an existing spell-correction engine. The phrase "plausible misspellings or orthographic proxy strings" includes spelling-like strings that are phonetically, visually, or pronunciation-wise suggestive of the intended text string even if they are imperfect or non-words.

Mode D provides a low-overhead path for leveraging lip-derived and/or whisper-derived speech evidence without requiring deep modification of the core keyboard or native auto-correct engine. In this mode, the system derives a phoneme-like, phoneme-likelihood, or other coarse speech-symbol representation from the user's visual speech and/or whisper-level audio, converts that representation into a bounded set of plausible orthographic variants, and injects those variants into an existing spell-correction engine. The spell-correction engine then applies its ordinary edit-distance, language-model, ranking, and correction logic to recover the intended word.

As used herein, the terms orthographic proxy-string injection and reverse-garbled injection refer to the deliberate generation of imperfect but phonetically useful orthographic strings from visual and/or audio speech evidence so that an existing spell-correction engine can rescue the intended word. In ordinary autocorrect, a user provides one garbled typed string and the engine attempts to infer the intended word. In Mode D, the system intentionally creates additional garbled-but-helpful strings derived from multimodal speech evidence and allows the existing spell-correction engine to repair them. In this way, the present invention can benefit from lip and whisper information while remaining compatible with shipped keyboard infrastructure.

Mode D is especially attractive in deployments where a manufacturer or software provider wishes to reuse an existing spell-checker, autocorrect trie, language model, or operating-system text service, rather than integrating a fully native multimodal decoder into the keyboard core.

Overview of the Mode D Pipeline

FIG. 6 illustrates a non-limiting Mode D process in which current typed string 602 and lip-movement and/or whisper-level evidence 604 are processed to derive speech-symbol representation 606. A bounded set of plausible misspellings or orthographic proxy strings 608 is generated, bundled with the typed string 610, and submitted to existing spell-correction engine 612. Recovered candidate text strings and associated scores 614 may then be committed, suggested, merged, or passed to another controller to produce correction result 616. FIG. 6 also shows illustrative example 618 and commit/fallback logic 620. A non-limiting Mode D pipeline may proceed as follows:

(i) Capture the current typed string $p_t$, which may be accurate, partially garbled, severely garbled, sparse, or absent.

(ii) Derive from the live lip-viseme stream, whisper-audio stream, or both, a speech-symbol representation such as a phoneme sequence, phoneme-likelihood representation, viseme-to-phoneme approximation, or another coarse articulatory sequence.

(iii) Generate a bounded set of orthographic variants from that representation. The variants may be plausible misspellings, phonetic spellings, reverse-garbled strings, or other imperfect orthographic strings that are sufficiently close for the existing spell-correction engine to repair.

(iv) Bundle the typed string and generated variants into an input set for the spell-correction engine.

(v) Feed the bundled strings through the existing spell-correction engine and collect the recovered candidate text strings and associated scores.

(vi) Select, merge, rank, preview, or commit the recovered candidates according to a commit controller. In some embodiments, Mode D operates alongside Mode B. Mode B may provide earlier or more probabilistic correction, while Mode D provides a lower-integration-cost path that leverages the existing spell-checker as a recovery engine.

Speech-Symbol Extraction

In some embodiments, the system converts the live lip-viseme stream and/or whisper-audio stream into a symbolic or quasi-symbolic speech representation suitable for orthographic variant generation. The extracted representation may include, by way of non-limiting example:

(i) a phoneme sequence;

(ii) a phoneme-likelihood sequence;

(iii) a phoneme posterior representation;

(iv) a viseme-to-phoneme approximation;

(v) a coarse consonant-vowel pattern;

(vi) a syllable-linked phoneme representation; or (vii) another speech-derived symbolic or semi-symbolic representation.

If both visual and audio channels are present, the system may align, merge, or reconcile them before variant generation. In some embodiments, time-aligned positions are compared and the higher-confidence symbol is selected at each slot. In other embodiments, the two channels contribute weighted alternatives, posterior mixtures, or confidence-ranked candidates at each position. In still other embodiments, one channel may be primary and the other may serve as a refinement channel. Thus, this step does not require a single exact phoneme string in all embodiments. Rather, it may use any sufficiently compact speech-symbol representation from which plausible orthographic variants can be generated.

Orthographic Variant Generation

The set of generated variants may be bounded by a maximum number of strings, beam width, probability threshold, edit-distance threshold, visual-distance threshold, or compute budget. Duplicate strings, near-duplicate strings, and strings that are incompatible with the current typed context may be removed or downranked before submission to the spell-correction engine. In some embodiments, the system converts the speech-symbol representation into a bounded set of orthographic variants. These variants are intentionally not required to be perfectly spelled. Instead, they are designed to be phonetically suggestive enough that an existing spell-correction engine can repair them. As used herein, such generated strings may be referred to as:

(i) orthographic variants;
(ii) reverse-garbled variants;
(iii) phoneme-derived misspellings;
(iv) plausible noisy spellings; or
(v) phonetic proxy strings.

A non-limiting generator may operate by mapping each phoneme-like symbol to one or more plausible grapheme groups. For example:

(i)/k/may map to “c” or “k”;
(ii)/f/may map to “f” or “ph”;
(iii)/shun/may map to “shun,” “tion,” or “sion”; and
(iv) vowel-like symbols may map to one or more common vowel groups.

In some embodiments, each symbol contributes one or more grapheme alternatives, and a beam search, bounded search, weighted expansion, stochastic mapping, or other controlled generation method is used to emit a limited number of candidate strings. In some embodiments, the generator emits on the order of 10-20 orthographic variants, although other limits may be used. The grapheme generator may be implemented using:

(i) a rules table;
(ii) a weighted phoneme-to-grapheme mapping;
(iii) a stochastic grapheme-to-phoneme or phoneme-to-grapheme model;
(iv) a compact sequence-to-sequence network;
(v) a finite-state transducer; or
(vi) another generator balancing speed and coverage.

In some embodiments, generated variants are ranked before injection according to internal plausibility, pronunciation fit, frequency, language constraints, or confidence inherited from the speech-symbol representation.

Bundling with the Typed String

In some embodiments, the generated orthographic variants are bundled with the typed input string. A non-limiting bundle may be:

$$B=\{p_t\}\cup G_1$$

where $p_t$ is the current typed string and Gt is the set of generated orthographic variants. The typed string $p_t$ may be:

(i) reasonably accurate;
(ii) mildly garbled;
(iii) severely garbled;
(iv) abbreviated; or
(v) absent.

If $p_t$ is absent or not useful, the bundle may consist primarily or entirely of generated variants. If $p_t$ is present, the system may preserve it as one of the bundle elements so that the existing spell-correction engine can consider both the user's raw text and the multimodally generated proxy strings. In some embodiments, duplicate strings are removed before spell-check recovery. In other embodiments, duplicate recovery candidates are merged after spell-check recovery.

Spell-Checker Recovery

In some embodiments, each bundled string is provided to an existing spell-correction engine. The spell-correction engine may be:

(i) an operating-system text service;
(ii) a keyboard-level spell-checker;
(iii) a trie-based autocorrect engine;
(iv) a deterministic edit-distance engine;
(v) a statistical language-model-based engine;
(vi) a hybrid autocorrect engine; or
(vii) another correction service already present in the device software stack.

The spell-correction engine may return one or more of:

(i) a corrected word;
(ii) a ranked candidate list;
(iii) a language-model score;
(iv) an edit-distance score;
(v) a spell-check confidence; or
(vi) another recovery-related score.

In some embodiments, multiple bundled variants recover to the same intended word. In such cases, the recovered candidates may be merged, de-duplicated, and ranked using one or more of:

(i) the native spell-checker score;
(ii) a language-model score;
(iii) a variant-origin confidence;
(iv) a lip-derived confidence;
(v) a whisper-derived confidence; or
(vi) another combined confidence measure.

Thus, the existing spell-correction engine performs the final repair work, while the present invention provides it with additional phonetically suggestive orthographic inputs that it would not otherwise receive.

Commit and Fallback Logic

In some embodiments, the recovered candidates are passed to a commit controller. A non-limiting rule is:

(i) automatically commit the top recovered candidate when its recovery confidence exceeds a threshold TD; otherwise
(ii) retain the candidate in the suggestion list or pass the result into another multimodal ranking pathway.

The recovery confidence may be based on:

(i) a native language-model score;
(ii) a native spell-checker confidence;
(iii) a corrected-candidate rank;
(iv) a merged or fused score; or
(v) another recovery-related metric.

For example, if the top recovered candidate's score is sufficiently high, the system may auto-insert that word. If not, the recovered word may still be surfaced in the suggestion bar. In some embodiments, Mode B's early-fusion logic may still rerank or validate the result, so that Mode D acts as a low-overhead recovery layer while richer multi-modal fusion remains available when needed.

Worked Example

A non-limiting worked example is shown below. Suppose the user provides:

(i) typed string: conrfmatipn
(ii) lip and/or whisper-derived speech-symbol representation approximating:/knfmen/The grapheme generator may produce orthographic variants such as:
(i) konfermation
(ii) confermayshun
(iii) konfirmashun
(iv) confermaytion The bundle may then be:

$$B=\{\text{conrfmatipn},\text{konfermation},\text{confermayshun},\text{konfirmashun},\ldots\}$$

When the strings in (B) are fed into the existing spell-correction engine, several may recover to:

(i) confirmation

If the top recovered candidate confirmation receives a native recovery score of, for example, 0.82, and if:

$$0.82\geq\tau_D$$

the word may be auto-inserted. This example illustrates that Mode D can recover an intended word even when the typed string alone is badly corrupted, by using lip and/or whisper evidence to manufacture orthographic proxies that the native spell-correction engine can successfully repair.

Advantages of Mode D

Mode D offers several important advantages:

(i) Low integration cost: it reuses the shipped spell-checker or autocorrect engine and may require only a lightweight speech-symbol extractor and orthographic variant generator.
(ii) Compatibility with existing keyboards: no deep modification of the native correction core is required.
(iii) Robust recovery: it can work even when the typed prefix is blank, sparse, abbreviated, or badly wrong.
(iv) Complementary deployment option: it can operate alongside Mode B, providing a lower-overhead safety net while richer multimodal fusion remains available elsewhere.
(v) Practical licensing value: it offers keyboard vendors and device manufacturers a retrofit path for adopting multimodal correction without replacing the native correction stack.

Implementation Notes

In some embodiments:

(i) the orthographic variant generator is capped to a bounded number of variants per cycle to avoid overloading the native spell-checker;
(ii) variants may be pre-ranked before injection;
(iii) language-specific grapheme mappings may be used;
(iv) diacritics, transliterations, surname spellings, or proper-name spellings may be supported;
(v) user-specific pronunciation tendencies may be learned or calibrated; and
(vi) the system may fall back to a smaller variant set under low-power or low-latency conditions.

The present invention is not limited to any particular grapheme generator implementation, variant count, or native spell-checker interface.

Relationship to Mode B

Mode D is distinct from Mode B. In Mode B, multimodal evidence is fused earlier and more directly during candidate generation and scoring. In Mode D, the multimodal evidence is instead converted into orthographic proxy strings that are handed to an existing spell-correction engine for recovery. Accordingly:

(i) Mode B may provide earlier, more native, or more probabilistic multimodal correction; while
(ii) Mode D may provide a lower-integration-cost deployment path that leverages existing keyboard infrastructure.

These modes are complementary rather than mutually exclusive. A device manufacturer may deploy either mode alone or both modes together within the same multimodal text-entry framework.

Common Candidate-Set Merging and Commit Controller

FIG. 14 illustrates a common candidate-set merging and commit-controller architecture. Candidate-set merging module 130 may receive candidate sources including text-origin candidate list 110, relaxed text-derived pool 1402, visual-injected candidates 1404, audio-injected candidates 1406, reverse-garbled recovered candidates 1408, and neural candidate list 1410. De-duplication/canonicalization 1412 and score normalization/active-modality weighting 1414 may feed fusion controller 132 and commit controller 134. Outputs may include no-change output 1416, suggestion/reordered list 1418, preview or ghost text 1420, automatic replacement 1422, or correction result 136. Modes A through D may share a common candidate-set merging and commit controller.

The controller may operate internally within an input method, keyboard service, application text-entry field, or other text-entry system, and the user need not see separate lists or mode labels.

Candidate Sources

Candidate sources may include a standard autocorrect candidate list, a text-origin candidate list, a relaxed text-derived candidate pool, visual-injected candidates, whisper-injected candidates, candidates recovered by reverse-garbled injection, user-dictionary candidates, context-specific candidates, or candidates produced by a neural model.

Candidate Merging, De-Duplication, and Canonicalization

The controller may form a union, weighted union, top-k merge, intersection, filtered union, or other merged candidate set. The controller may de-duplicate candidates, canonicalize capitalization or diacritics, normalize spelling variants, merge candidates representing the same token or phrase, and preserve metadata indicating which source or sources produced each candidate.

Score Normalization Across Candidate Sources

Because different candidate sources may produce different score types, the controller may normalize edit-distance costs, language-model probabilities, native autocorrect scores, visual distances, lip-alignment scores, audio posteriors, neural scores, and recovered-candidate scores into comparable values. Scores may be probabilities, normalized similarities, log scores, costs converted into similarities, ranks converted into scores, or other comparable values. For candidates introduced by visual or audio evidence and absent from the ordinary text-origin candidate list, a text-derived score may be set to zero, assigned a neutral value, estimated from relaxed edit distance, inferred from a language model, inherited from a related candidate, or otherwise normalized for fusion.

Confidence Rules, Commitment, and Fallback

The controller may output a reordered candidate list, suggestion, automatic replacement, preview, confirmation request, no-change result, or other correction result. Automatic replacement may require a confidence rule, such as a fused-score threshold, top-two margin, entropy threshold, stability over successive updates, agreement among modalities, application policy, or user-specific threshold. If confidence is insufficient, the controller may leave the typed string unchanged, present only suggestions, preserve the native autocorrect top candidate, wait for additional keystrokes or visual evidence, request user confirmation, or suppress correction. If no active modality produces reliable evidence, inactive channels may be omitted from fusion and the controller may fall back to text-origin correction or no correction.

Special Terms and Non-Dictionary Candidates

Candidate text strings may include proper names, jargon, abbreviations, part numbers, URLs, hashtags, transliterations, diacritic-bearing strings, multilingual terms, emoji-associated strings, application-specific tokens, or other non-dictionary strings. The controller may adjust thresholds for such candidates, avoid automatic replacement when ambiguity is high, or present suggestion-only output for safety.

Internal Operation Without a Displayed Fusion Window

Any candidate-list generation, visual ranking, fusion, de-duplication, injection, pruning, scoring, suggestion, and commitment operation described herein may be performed internally without displaying separate lists to the user. A displayed fusion window is optional and may be used for demonstration, debugging, calibration, education, or specialized interfaces.

The scoring, calibration, expanded-state, neural, interface, and diagnostic embodiments that follow are non-limiting refinements of the core correction architecture. The core architecture may be practiced using simpler visual descriptors, including syllable count, partial viseme sequence, mouth-shape class, visual-vowel pattern, landmark trajectory, or learned visual embedding, and does not require any particular substitution matrix, dynamic-programming recurrence, transition model, neural architecture, calibration workflow, displayed fusion window, or diagnostic graph unless expressly stated for a particular embodiment.

Confusion-Weighted Viseme Edit Distance

FIG. 18 illustrates one non-limiting process for computing a candidate-specific visual compatibility score. Observed visual speech sequence 1802 and candidate reference sequence 1804 are evaluated using visual-confusability substitution cost matrix 1806, insertion and deletion costs 1808, dynamic-programming alignment grid 1810, and alignment recurrence 1812. The process may produce final weighted alignment cost 1814, optional syllable-consistency penalty 1816, conversion to lip-alignment score 1818, and candidate-specific visual compatibility output 1820.

The methods in this section are optional examples of computing a lip-alignment score or candidate-specific visual compatibility score. Observed sequences and reference sequences used in this section may be obtained using the visual-extraction, calibration, template-generation, text-entry interval, temporal-association, and candidate-scoring embodiments described herein. The invention is not limited to confusion-weighted edit distance, and other scoring methods may be used. In some embodiments, the visual compatibility score $S_{lip}(w)$ for a candidate text string w is computed, or refined, by aligning an observed sequence of visual speech categories derived from the user's mouth motion with a reference sequence of visual speech categories associated with the candidate text string.

This section provides one non-limiting embodiment for computing or refining the candidate-specific visual compatibility score referenced in the operating modes described above. This embodiment is useful where the system represents the lip signal as a discrete viseme sequence, a syllable-linked viseme sequence, or another symbolic visual-speech sequence. The resulting alignment cost may be used directly as a visual distance measure or may be transformed into the candidate-specific lip score $S_{lip}(w)$ used elsewhere in the fusion framework. In some embodiments, viseme substitution costs are weighted analogously to keyboard-weighted edit distance, such that substitutions between visually similar viseme categories incur lower penalties than substitutions between visually dissimilar viseme categories.

By way of analogy, some text-entry systems penalize substitution of a typed letter with a nearby keyboard letter less than substitution with a distant keyboard letter because the nearby-key error is more plausible. Likewise, in the present invention, substitution of one viseme with a visually similar viseme may receive a relatively small penalty, while substitution with a visually dissimilar viseme may receive a larger penalty. Thus, this embodiment may be viewed as a viseme-domain analogue of weighted edit distance, but using visual confusability of mouth shapes rather than keyboard proximity. Let an observed viseme sequence for the current input interval be denoted:

$$O=[o_1,o_2, \ldots ,o_M]$$

and let a reference viseme sequence associated with candidate text string w be denoted as follows.

$$R_w=[r_1,r_2, \ldots ,r_N]$$

The reference sequence may be obtained from a pronunciation lexicon, grapheme-to-phoneme conversion, a stored template library, a learned model, or another source described elsewhere herein. Here, M denotes the number of viseme symbols in the observed sequence and N denotes the number of viseme symbols in the reference sequence for candidate text string w. Let V denote the set of visual speech categories used in the implementation.

$$V=\{v_1, \ldots ,v_K\}$$

$$c(v_a,v_b)$$

assigns a penalty to substituting one viseme category for another, with lower penalties for more visually confusable categories and higher penalties for less visually confusable categories. By way of non-limiting example, for a six-category viseme set, an illustrative substitution-cost matrix C may be:

| | v1 | v2 | v3 | v4 | v5 | v6 |
|---|---|---|---|---|---|---|
| v1 | 0 | 1 | 2 | 3 | 3 | 4 |
| v2 | 1 | 0 | 1 | 3 | 3 | 4 |
| v3 | 2 | 1 | 0 | 2 | 3 | 4 |
| v4 | 3 | 3 | 2 | 0 | 1 | 2 |
| v5 | 3 | 3 | 3 | 1 | 0 | 1 |
| v6 | 4 | 4 | 4 | 2 | 1 | 0 |

In this example, a substitution cost of 0 indicates identity, a low positive value indicates a relatively mild visual mismatch, and a higher value indicates a more severe visual mismatch. The specific values are illustrative only and may be fixed, empirically estimated from confusion statistics, learned from training data, or personalized to an individual user based on calibration data. Insertion and deletion costs may also be used. In some embodiments, insertion and deletion costs are constants. In other embodiments, insertion and/or deletion costs are weighted and may vary according to the identity, salience, duration, confidence, temporal position, syllabic role, or visual distinctiveness of the viseme being inserted or deleted.

For example, deleting a weak transitional viseme may incur a smaller penalty than deleting a highly distinctive viseme associated with a syllable nucleus. Likewise, inserting a visually minor transition may incur a smaller penalty than inserting a prominent viseme that should have been clearly observable. Thus, in addition to weighted substitution costs, the present invention may also employ weighted insertion costs and weighted deletion costs. In some embodiments, the alignment cost between the observed sequence O and the reference sequence Rw is computed using dynamic programming. Let:

$$D(i,j)$$

denote the minimum cumulative alignment cost, or alignment penalty, for aligning the first i observed visemes of the observed sequence with the first j reference visemes of the candidate text string's reference sequence. A non-limiting recurrence is:

$$D(i,j)=\min\{$$

$$D(i-1,j)+c_{del}(o_i),D(i,j-1)+C_{ins}(r_j);$$

$$D(i-1,j-1)+c(o_i,r_j)\}$$

In this recurrence:

(i) the term D(i−1, j)+cdel (oi) corresponds to treating the current observed viseme $o_i$ as deleted relative to the reference sequence;

(ii) the term D(i, j−1)+cins (rj) corresponds to treating the current reference viseme $r_j$ as inserted relative to the observed sequence; and (iii) the term D(i−1, j−1)+c (oi, rj) corresponds to aligning the current observed viseme $o_i$ with the current reference viseme $r_j$, with zero or low cost for a close match and higher cost for a less plausible visual substitution.

A non-limiting initialization is:

$$D(0,0)=0$$

$$D(i,0)=\sum_{k=1}^{i} c_{del}(o_k)$$

$$D(0,j)=\sum_{k=1}^{j} c_{ins}(r_k)$$

although other initialization conventions may be used. In embodiments using constant insertion and deletion costs, these may simplify to:

$$D(i,0)=i\,c_{del}$$

and:

$$D(0,j)=j\,c_{ins}$$

and:

The final alignment cost for candidate text string w may then be taken as:

$$D_w=D(M,N)$$

that is, the minimum cumulative alignment penalty for aligning the full observed viseme sequence with the full reference viseme sequence for candidate text string w. In plain terms, Dw reflects how well the user's observed viseme sequence matches the candidate text string's expected viseme sequence after accounting for substitutions, insertions, and deletions, including weighted penalties where applicable. In some embodiments, syllable information is also incorporated into the visual compatibility score. For example, a detected syllable count from the observed visual evidence may be compared against an expected syllable count associated with the candidate text string, and a syllable mismatch penalty may be added to the viseme alignment cost. A non-limiting example is:

$$\mathrm{LipCost}(w)=D_w+\lambda|S_{obs}-s_{ref}|$$

where sobs is the detected syllable count, sref is the expected syllable count for the candidate text string, and λ is a weighting factor. Thus, in some embodiments, the weighted viseme alignment cost Dw captures sequence similarity, while a separate syllable-related term captures syllable consistency. In some embodiments, the resulting alignment cost Dw, or the combined cost including a syllable term, is converted into the visual compatibility score $S_{lip}$(w). Because lower alignment cost indicates a better visual match, the conversion is preferably monotonic such that lower cost yields higher compatibility. Non-limiting examples include:

$$S_{lip}(w)=\frac{1}{1+D_w}$$

$$S_{lip}(w)=e^{-\beta D_w}$$

$$S_{lip}(w)=\frac{1}{1+LipCost(w)}$$

Other normalization-and-inversion mappings may be used. Thus, the confusion-weighted alignment is not a separate decision process disconnected from the rest of the system; rather, it is one concrete embodiment for computing or refining the lip score $S_{lip}$(w) that is later used in the overall multimodal fusion and commitment logic described elsewhere herein.

For example, the weighted edit-distance score may be used as one component of $S_{lip}$(w), while a transition-likelihood model separately rewards temporally plausible expanded-state transitions. In this way, sequence similarity and transition plausibility may be used together, while remaining conceptually distinct. The foregoing matrix, recurrence, weighting functions, and mapping functions are illustrative rather than limiting. Other weighted alignment formulations may be used so long as the system distinguishes among substitution types based on visual confusability, and in some embodiments also uses weighted insertion and/or weighted deletion penalties, with the resulting alignment information being used to compute or refine candidate-specific lip compatibility.

Lip-Feature Extraction and Syllable Estimation

FIG. 16 illustrates a non-limiting visual feature extraction pipeline 1600 in which imaging sensor 112 captures mouth-region image frames 1602, mouth crop and landmark detection 1604 produces geometric mouth features 1606, and those features may be normalized into mouth-opening waveform 1608. Waveform smoothing and filtering 1610 may be followed by syllable-peak detection 1612, syllable outputs 1614, viseme or mouth-shape classifier 1616, visual descriptors 1618, confidence values 1620, and observed visual evidence output 1622. In some embodiments, the system extracts visual speech evidence from image data of the user's mouth region for use in computing candidate-specific visual compatibility scores, including $S_{lip}(w)$.

The extracted visual evidence may include low-level geometric features, frame-level viseme probabilities, syllable estimates, visual speech embeddings, expanded visual speech states, or other visual articulatory representations. The resulting visual evidence may be used by the operating modes described above, including Mode A late-fusion reranking, Mode B early-fusion candidate generation and scoring, and Mode C any-subset operation.

Visual Backbones

In some embodiments, the visual evidence is generated using one or more visual speech recognition backbones. Such backbones may include convolutional neural networks, recurrent neural networks, transformer networks, temporal convolutional models, attention-based models, or hybrid models trained to extract visual speech features from lip or mouth-region video. A visual backbone may output one or more of:

(i) frame-level viseme probabilities;
(ii) frame-level mouth-shape classifications;
(iii) syllable-related probabilities;
(iv) word-level or subword-level visual embeddings;
(v) temporal visual-speech features;
(vi) expanded viseme-state probabilities; or
(vii) another representation suitable for comparison with candidate text strings.

In some embodiments, the visual backbone is trained on public or private visual speech datasets. Non-limiting examples of public visual speech datasets include LRW, LRS3, or similar datasets. The invention is not limited to any particular dataset, architecture, or training source.

Landmark-Only Visual Processing

In some embodiments, the system uses a landmark-only or primarily landmark-based pipeline. Real-time facial-landmark pipelines, such as MediaPipe Face Mesh or similar facial-landmark trackers, may track facial landmarks at video frame rates, for example about 30-60 frames per second. In one non-limiting implementation, such a pipeline tracks hundreds of facial landmarks, such as 468 facial landmarks, and the mouth-region landmarks are used to compute lip and mouth features. Mouth-region landmarks may be used to derive one or more of:

(i) lip aperture;
(ii) mouth height;
(iii) mouth width;
(iv) mouth aspect ratio;
(v) contour shape;
(vi) inner-lip and outer-lip geometry;
(vii) motion vectors;
(viii) normalized mouth opening;
(ix) temporal changes in mouth shape;
(x) mouth-opening peaks;
(xi) mouth-closing events; and
(xii) other geometric or temporal features of the mouth region.

This landmark-only approach can provide a lightweight, real-time implementation that avoids requiring a full visual speech recognition model in every embodiment. It can also be combined with visual backbones or other models. For example, landmark features may be supplied to a classifier that emits viseme probabilities, syllable-peak probabilities, or compact visual descriptors.

Syllable Estimation from Mouth Motion

In some embodiments, syllable count is estimated from mouth motion. For example, a normalized mouth-opening trajectory may be computed from mouth-height values, lip-aperture values, or related landmark-derived measurements. Peaks in the mouth-opening trajectory may correspond to syllable nuclei or vowel-like articulatory events. A non-limiting syllable-estimation process may include:

(i) extracting mouth-region landmarks from a sequence of image frames;
(ii) computing a mouth-opening or lip-aperture waveform over time;
(iii) smoothing or normalizing the waveform;
(iv) detecting peaks or peak regions in the waveform;
(v) filtering peaks based on duration, amplitude, timing, confidence, or separation; and
(vi) estimating a syllable count, syllable-peak sequence, or syllable timing pattern. The resulting syllable estimate may be used to filter, retrieve, rerank, or score candidate text strings. For example, if the visual evidence indicates a likely four-syllable input, candidate text strings having a clearly inconsistent syllable count may receive a lower visual score or, in an early-fusion mode, may be deprioritized or pruned when confidence is sufficiently high.

Viseme Classification and Visual Speech Categories

In some embodiments, the visual evidence includes a sequence of visual speech categories, also referred to as visemes. A viseme classifier may operate on cropped mouth images, facial landmarks, waveform features, or combinations thereof. The classifier may emit a most-likely viseme label, a probability distribution over viseme classes, or an embedding from which viseme classes may be inferred. The visual speech category set may be small for robustness, such as a simplified set of coarse visemes, or larger for greater expressiveness. In some embodiments, visual speech categories may correspond to:

(i) mouth-open shapes;
(ii) closed-mouth shapes;
(iii) rounded shapes;
(iv) spread shapes;
(v) labiodental-like shapes;
(vi) nasal-like or closure-related shapes;
(vii) vowel-nucleus shapes;
(viii) consonant-transition shapes; or
(ix) other visually distinguishable articulatory groupings.

The invention is not limited to any particular number or identity of viseme categories. A given embodiment may use six categories, a larger set, or a learned representation that does not require hard assignment to a single viseme label at each frame.

Open-Source and Alternative Visual-Speech Models

In some embodiments, open-source or published visual speech systems may be used or adapted to provide visual features. Non-limiting examples include LipNet, Auto-AVSR, AV-HuBERT, or similar visual speech networks. These models, or models of similar type, may be used to provide visual speech embeddings, viseme probabilities, phoneme-like visual outputs, word-level visual predictions, or intermediate features. The invention does not require any particular open-source model. Such models are examples of available visual-speech backbones that may be substituted for, or combined with, landmark-only processing. In some embodiments, a lightweight landmark pipeline is used for low-power operation, while a deeper visual-speech backbone is used when higher accuracy is needed or when device resources permit.

Viseme and Phoneme Alignment

In some embodiments, an observed viseme sequence or visual-speech representation is aligned to a candidate text string's reference sequence. The reference sequence may be obtained from a pronunciation lexicon, a grapheme-to-phoneme model, a stored template, or another source. The alignment may compare:

(i) an observed viseme sequence against a reference viseme sequence;
(ii) an observed syllable-peak sequence against an expected syllable count or syllable template;
(iii) an observed visual embedding against a reference embedding;
(iv) an observed expanded-state sequence against a reference expanded-state template; or
(v) a combination of such representations.

Non-limiting alignment techniques include dynamic time warping, edit distance, weighted edit distance, template matching, neural matching, transition-likelihood scoring, or combinations thereof. In some embodiments, the confusion-weighted viseme edit-distance method described herein under CONFUSION-WEIGHTED VISEME EDIT DISTANCE is used to compute or refine the candidate-specific visual compatibility score $S_{lip}(w)$.

Output of the Visual Extraction Pipeline

The visual extraction pipeline may output one or more representations for later scoring or fusion, including:

(i) a discrete observed viseme sequence (O=[o_1, o_2, . . . , o_M]);
(ii) a framewise viseme-probability sequence;
(iii) a syllable count;
(iv) a syllable-peak sequence;
(v) a mouth-opening waveform;
(vi) mouth landmark trajectories;
(vii) expanded visual speech states;
(viii) a visual speech embedding;
(ix) confidence values associated with any of the foregoing; or
(x) compact visual descriptors used for candidate retrieval or pruning.

These outputs may be used differently by different operating modes. In Mode A, the outputs may be used to compute $S_{lip}(w_i)$ for each candidate in the text-origin list $W_{text}$. In Mode B, the outputs may be used for visual-descriptor candidate injection, cue-confidence pruning, and candidate-specific scoring. In Mode C, the outputs may be used when the lip channel is active. In Mode D, the outputs may be converted into a phoneme-like, viseme-like, or other speech-symbol representation for orthographic variant generation.

Relationship to Candidate-Specific Visual Scoring

The visual extraction process described in this section supplies the observed visual evidence that is compared against candidate-specific reference representations. For a candidate text string w, the system may compare the observed visual evidence to one or more reference visual representations associated with w and compute a visual compatibility score $S_{lip}(w)$. That score may then be used in the fusion logic described in the operating modes above. For example, a sequence of observed viseme labels or probabilities may be aligned with a candidate text string's expected viseme sequence. A detected syllable count may be compared with the candidate's expected syllable count. A mouth-opening waveform may be compared with a stored or learned template. An expanded-state sequence may be evaluated for transition plausibility.

These visual comparisons may be used individually or combined to compute or refine $S_{lip}(w)$. The foregoing visual extraction methods are illustrative rather than limiting. The invention may use any sensor, model, or feature extractor capable of deriving visual speech evidence from mouth-region image data for use in multimodal correction.

Optional Whisper-Feature Extraction

As illustrated in FIG. 12, optional microphone 124 may capture whisper-level audio evidence 126, and audio scorer 128 may compute candidate-specific audio scores. FIG. 5 shows optional whisper/audio channel 506 in any-subset operation, FIG. 19 shows optional audio channel 1906 in active-modality weighting, and FIG. 21 shows optional microphone 2112 under privacy and sensor-gating control. In some embodiments, the system uses low-amplitude or whisper-level audio as an optional auxiliary modality. The audio channel may be used when the user softly speaks, whispers, mouths with slight acoustic output, or otherwise provides low-volume speech evidence during text entry. A low-energy automatic speech recognition model, whisper-oriented ASR model, CTC model, sequence-to-sequence model, or other on-device acoustic model may process the low-amplitude audio and output one or more of:

(i) word-level token posteriors;
(ii) phoneme posteriors;
(iii) CTC-derived phoneme or subword sequences;
(iv) acoustic embeddings;
(v) ASR n-best hypotheses; or
(vi) confidence values associated with any of the foregoing.

In some embodiments, low-amplitude audio may be at or around whisper-level intensity, for example approximately 45 dB SPL, although no particular sound-pressure level is required. The audio output may be used to compute a candidate-specific audio score $S_{audio}(w)$. For example, a soft-max confidence or posterior probability associated with candidate text string w may supply $S_{audio}(w)$. In some embodiments, optional phoneme alignment may boost candidates whose expected phoneme sequence matches the whisper-derived evidence and penalize candidates whose expected phoneme sequence is inconsistent with that evidence. The system may operate without audio. If audio is muted, unavailable, noisy, or low-confidence, the audio channel may be omitted or assigned reduced weight, and the system may rely on text and visual evidence.

Modality Confidence, Fallback, and Weight Updating

FIG. 19 illustrates a non-limiting active-modality weighting and fallback process 1900. Typed-input channel 1902, lip-movement channel 1904, and optional audio channel 1906 feed activity and reliability detector 1908, which identifies active modality set 1910. Branch condition 1911 determines whether active evidence exists 1912 and can be normalized over active modalities 1914 for candidate scoring 1916, or whether no reliable active evidence 1920 should route processing to fallback controller 1922. Commit/suggestion controller 1934 may correspond to, include, or operate with commit controller 134 to produce correction result 1936. This section also provides common fallback behavior for zero-confidence or no-active-modality cases.

If no auxiliary modality has sufficient confidence, if all confidence values are zero, or if the denominator for confidence normalization would otherwise be zero, the system may omit unavailable channels, retain the typed string, present no automatic correction, present only text-origin suggestions, or wait for additional evidence. In some embodiments, the system dynamically adjusts the relative contribution of text, lip-derived visual evidence, and optional audio evidence based on current modality confidence. This section provides shared confidence and fallback logic that may be used by Mode A, Mode B, Mode C, or another operating mode described herein. A confidence value may be estimated for each active modality, for example:

(i) $C_{text}$, representing text-channel confidence;

(ii) $C_{lip}$, representing visual/lip-channel confidence; and (iii) $C_{audio}$, representing optional audio-channel confidence.

The system may then compute normalized modality weights, for example:

$$\alpha_m = \frac{C_m}{C_{text} + C_{lip} + C_{audio}},\ m \in \{\text{text, lip, audio}\}$$

with inactive modalities omitted or assigned a zero contribution. If lip confidence $C_{lip}$ drops due to poor lighting, face occlusion, unstable landmark tracking, motion blur, or another visual-quality problem, the system may shift weight toward text and/or audio channels. If audio is muted, unavailable, or noisy, the system may set $C_{audio}$ to zero or reduce its contribution. If text confidence is strong, the text channel may dominate; if text confidence is weak and auxiliary evidence is strong, lip or audio channels may receive greater weight. In some embodiments, channel weights are updated periodically, for example every 50 ms, or upon events such as keystrokes, camera-frame updates, audio-frame updates, candidate-list changes, or confidence-threshold crossings.

This dynamic fallback logic allows the correction system to degrade gracefully when one or more channels are unavailable or unreliable. In some embodiments, privacy and power policies also influence modality confidence and activation. Camera and microphone pipelines may sleep when unused, activate only during text entry or user-authorized contexts, process frames locally on the user device, discard raw image or audio frames after feature extraction or scoring, or load deeper models only when expected accuracy benefits justify the additional compute.

Optional Calibration

In some embodiments, the system supports optional user calibration. Calibration is not required in all embodiments, but it may improve performance by adapting visual and/or audio scoring to a particular user. In one non-limiting lip-calibration embodiment, the user mouths a set of phonetically diverse words or phrases, for example 10-20 words over a short calibration interval. The system records mouth-region landmarks, visual features, viseme probabilities, syllable peaks, or other derived visual representations. These calibration examples may be encoded into user-specific reference embeddings, user-specific viseme templates, or other personalized visual parameters. In some embodiments, a visual speech model or open-source lip-reading backbone may be fine-tuned using the calibration clips.

Such fine-tuning may run on-device, offline, locally, or in another privacy-preserving configuration. In some embodiments, whisper calibration is also supported. The user may whisper several words or phrases in a relatively quiet setting, and the system may estimate a user-specific gain profile, noise profile, acoustic baseline, or whisper-recognition adjustment. Calibration may personalize $S_{lip}(w)$, $S_{audio}(w)$, visual confidence estimates, audio confidence estimates, syllable-peak thresholds, and modality weights. Calibration may be especially useful in lip-only, whisper-only, low-light, or user-specific pronunciation scenarios. Additional non-limiting interface, live-preview, and baseline-estimation embodiments for calibration are described below in the supplemental calibration-interface section.

Optional User-Experience Features

In some embodiments, the system includes optional user-experience features that use the same lip, whisper, and text-entry infrastructure described above. In one embodiment, gesture-based acceptance may allow the user to silently accept a current suggestion by mouthing a confirmation gesture or word, such as "yes." The system may treat the detected gesture or visual speech pattern as an acceptance signal. In another embodiment, pause-and-mouth correction may allow the user to pause typing and mouth a word to correct or replace a recent token. The system may associate the mouthed word with the previous string or token and use the visual evidence to replace, rerank, or suggest a correction. In another embodiment, low-latency text-to-speech feedback may provide quiet confirmation of an auto-inserted word.

For example, the device may speak the inserted word once, at increased speed and reduced volume, so that the user can verify the correction without intrusive feedback.

The same fusion layer may be applied across mobile, desktop, tablet, wearable, and XR keyboards. The underlying correction logic may remain substantially similar while sensor APIs, camera placement, microphone configuration, and user interface presentation vary by platform.

Supplemental Viseme Calibration Interface and User-Specific Baselines

Figure 7:
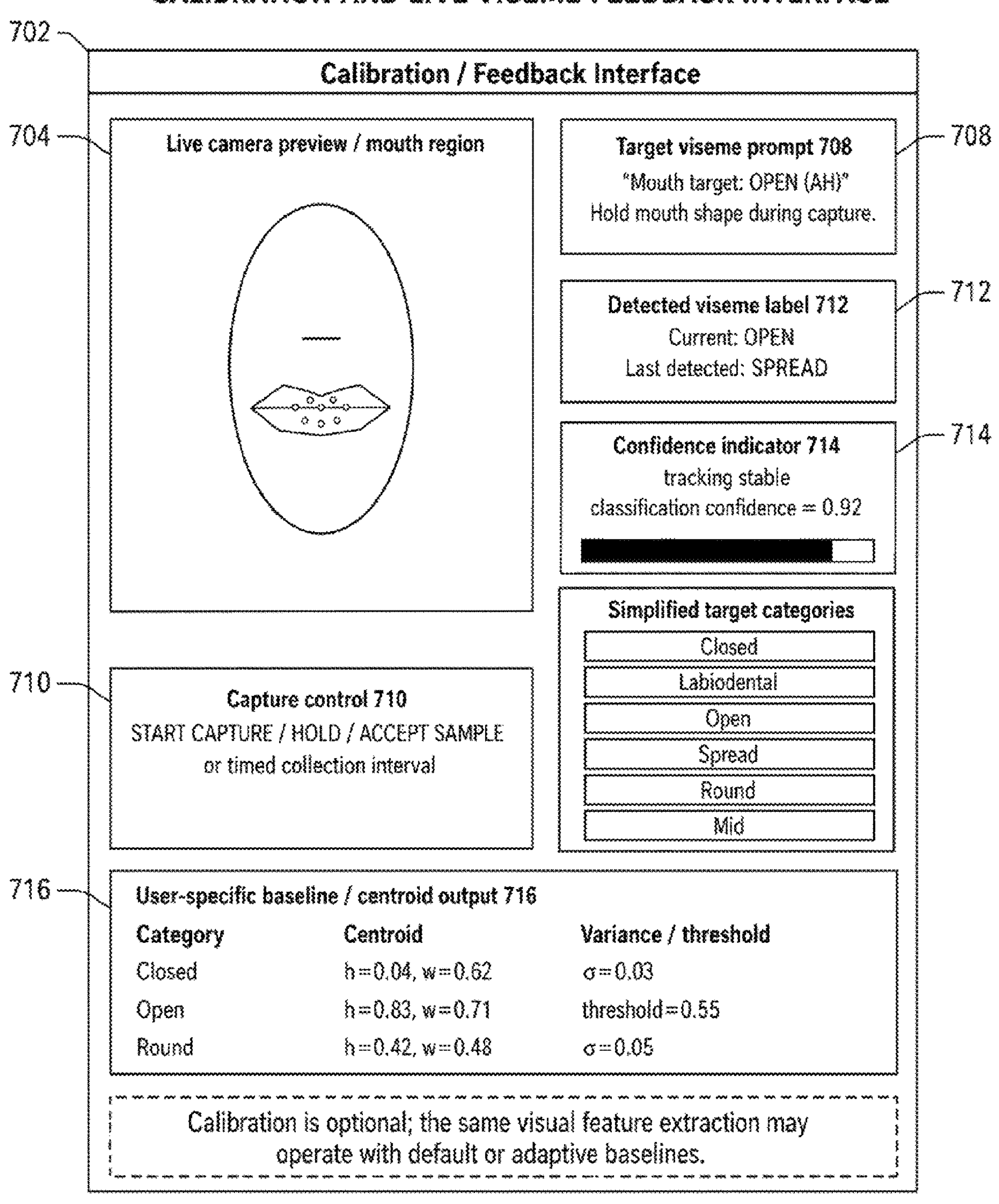
FIG. 7 is a schematic interface diagram illustrating a calibration and live viseme feedback interface.

FIG. 7 illustrates a non-limiting calibration and live viseme feedback interface 702. The interface 702 may include live camera preview 704, target viseme prompt 708, capture control 710, detected viseme label 712, confidence indicator 714, and user-specific baseline or centroid output 716. This section provides supplemental interface and baseline embodiments for the optional calibration concepts introduced above. The calibration interface embodiments are optional and are not required in all implementations. In some embodiments, the system includes a calibration interface for initializing or personalizing visual speech recognition before, during, or after ordinary text-entry use.

The calibration interface may be implemented as a standalone desktop application, an embedded pane within a mobile keyboard extension, a setup screen on a smartphone or tablet, an XR interface, or another software component capable of displaying a camera preview and receiving calibration input. The calibration interface may be used to capture representative examples of selected visual speech categories, establish user-specific baseline measurements, initialize thresholds, and improve later computation of candidate-specific visual compatibility scores such as $S_{lip}(w)$. Calibration is optional, and the system may also operate using default thresholds, population-level models, pretrained visual-speech models, or non-calibrated landmark features.

Viseme Calibration Window

In one non-limiting embodiment, a viseme calibration window is displayed to the user. The window may include:

(i) a live camera preview showing the user's mouth region;
(ii) a prompt instructing the user to form a target mouth shape;
(iii) a label identifying a target viseme category;
(iv) a visual detection indicator that changes when the target viseme is detected with sufficient confidence;
(v) a button, timer, countdown, or collection prompt instructing the user to hold the target shape during data capture;
(vi) optional numerical displays of mouth geometry, confidence, or landmark values; and
(vii) optional feedback indicating whether the calibration sample was accepted.

For example, the interface may display a prompt such as "Please mouth 'AH'" while the system monitors the live mouth-region image data. When the system detects that the target mouth shape is sufficiently stable, the interface may show a checkmark, highlight, border change, color change, or another confirmation indicator.

Simplified Calibration Viseme Set

In some embodiments, the calibration process uses a simplified set of visual speech categories. A non-limiting six-category set may include:

(i) Closed
(ii) Labiodental
(iii) Open
(iv) Spread
(v) Round
(vi) Mid This simplified set may be useful for real-time operation because the categories are coarse enough to be robust under ordinary camera conditions while still providing useful information for autocorrect disambiguation.

Other embodiments may use fewer categories, more categories, language-specific categories, user-specific clusters, or learned visual speech representations rather than a fixed hand-labeled viseme set.

Feature Extraction During Calibration

During each calibration capture interval, the system may record one or more frames of mouth-region data while the user holds or repeats the target mouth shape. In some embodiments, the system records a sequence of several consecutive frames, for example about 10 to 60 frames, although other frame counts may be used. The system may extract and store one or more features from the captured frames, including:

(i) mouth-height values;
(ii) mouth-width values;
(iii) mouth aspect ratio;
(iv) lip aperture;
(v) inner-lip or outer-lip contour features;
(vi) landmark displacement values;
(vii) motion vectors;
(viii) normalized mouth-opening values;
(ix) classifier confidence values;
(x) viseme probabilities; and
(xi) other derived geometric or visual-speech features.

These features may be computed from facial landmarks, cropped mouth images, visual-speech model outputs, or combinations thereof. For example, a landmark-based embodiment may compute mouth height, mouth width, and aspect ratio from mouth-region landmarks, while a neural embodiment may additionally compute viseme probabilities or learned visual embeddings.

User-Specific Centroids, Variance, and Thresholds

In some embodiments, the system uses the calibration samples to compute user-specific statistical representations for one or more viseme categories. For each calibrated viseme category, the system may compute:

(i) a centroid, such as a mean or median feature vector;
(ii) variance or spread values;
(iii) confidence ranges;
(iv) outlier rejection thresholds;
(v) category-separation thresholds;
(vi) user-specific mouth-shape templates; and
(vii) other personalization parameters.

For example, the system may compute a centroid for the Open category using captured mouth-height, mouth-width, and aspect-ratio values. It may compute a separate centroid for the Round category using the user's rounded-mouth geometry. During later text entry, incoming mouth-region features may be compared to these user-specific centroids to classify visual speech categories or to estimate confidence values. In some embodiments, the calibration process also computes baseline values, including:

(i) a closed-mouth baseline used as a reference for minimal mouth height;
(ii) a neutral-mouth baseline;
(iii) an open-mouth threshold;
(iv) viseme shape centroids for distinguishing Open, Spread, Round, Mid, Labiodental, Closed, or other categories;
(v) landmark-stability thresholds; and
(vi) syllable-peak detection thresholds.

These user-specific baselines may improve robustness across different users, face shapes, camera positions, lighting conditions, speaking styles, and mouth-movement amplitudes.

Use of Calibration in Later Scoring

Calibration data may be used in later stages of the system in several ways. In some embodiments, calibration data improves frame-level viseme classification. In some embodiments, calibration data adjusts the confidence values assigned to visual evidence. In some embodiments, calibration data personalizes syllable-peak detection by setting thresholds relative to the user's own closed-mouth and open-mouth baselines.

Calibration may also be used to personalize candidate-specific visual scoring. For example, calibration-derived centroids or thresholds may affect:

(i) the observed viseme sequence used to compute $S_{lip}(w)$;
(ii) the detected syllable count used in a syllable-consistency penalty;
(iii) visual confidence $C_{lip}$;
(iv) cue-confidence $q_i$ for visual pruning cues;
(v) visual descriptor selection for Mode B candidate injection;
(vi) confusion-weighted substitution costs;
(vii) weighted insertion or deletion penalties;
(viii) transition-likelihood scoring over expanded visual speech states; and
(ix) rejection of noisy or unstable visual evidence.

Thus, calibration may improve both hard classification and softer scoring operations.

Optional Whisper Calibration

In some embodiments, the system also provides optional whisper calibration. During whisper calibration, the user may softly speak or whisper several words or phrases in a relatively quiet environment. The system may use these samples to estimate:

(i) microphone gain;
(ii) background noise level;
(iii) user-specific low-volume speech intensity;
(iv) whisper-specific acoustic features;
(v) acoustic confidence thresholds;
(vi) ASR posterior calibration;
(vii) phoneme posterior reliability; or
(viii) another low-amplitude audio profile. Whisper calibration may improve optional audio scoring $S_{audio}(w)$, audio confidence $C_{audio}$, or audio-derived descriptors used in early-fusion candidate generation and pruning.

Optional and Non-Limiting Nature of Calibration

Calibration is not required in all embodiments. A system may use default thresholds, pretrained models, population-level centroids, adaptive online learning, or calibration-free visual extraction. In some embodiments, calibration is offered only when the user enables lip-only entry, whisper-assisted entry, or high-accuracy personalization. In other embodiments, calibration may occur implicitly during ordinary use by accumulating high-confidence examples.

The calibration interface and parameters described in this section are illustrative rather than limiting. Other user-interface arrangements, viseme sets, feature vectors, statistical measures, thresholds, prompts, or calibration workflows may be used so long as the system derives user-specific or context-specific information that improves visual speech processing, audio processing, or multimodal correction.

Real-Time Viseme Feedback, Scrolling Graph, and Peak Detection

FIG. 8 illustrates a real-time visual speech graph 802. The graph 802 may display normalized mouth-opening waveform 804, detected syllable peaks 806, peak labels 808, expanded-state windows 810, and confidence markers 812. In some embodiments, the system provides a real-time feedback interface for displaying current visual speech recognition results while the user mouths, whispers, or types a word. The feedback interface may be used during calibration, ordinary text entry, debugging, demonstration, or user training. The interface may be implemented as a desktop window, a mobile interface, an embedded keyboard pane, an XR overlay, or another visual user interface. This section discloses non-limiting embodiments for real-time viseme detection, continuous peak tracking, scrolling visual-speech graphs, and syllable-peak estimation.

These embodiments may supply observed visual evidence used in the operating modes described above, including visual descriptors, syllable counts, viseme labels, confidence values, and candidate-specific lip scores $S_{lip}(w)$.

Real-Time Viseme Feedback Window

In one non-limiting embodiment, the system displays a viseme feedback window showing live camera-based detection of the user's mouth motion. The feedback window may include:

(i) a live camera preview of the mouth region;
(ii) a current viseme classification;
(iii) a current visual-speech confidence value;
(iv) a visual indicator showing when the detected viseme changes;
(v) an optional numerical display of mouth-height and mouth-width values;
(vi) an optional display of normalized mouth opening;
(vii) an optional syllable-peak counter; and
(viii) an optional status indicator showing whether visual tracking is stable.

For example, the interface may display a live preview of the user's lips and a label such as "Open," "Round," "Spread," "Closed," "Mid," or another current visual speech category. When the detected viseme changes, the interface may show an animated border, highlight, color change, icon, checkmark, or other visual indication. This gives the user or developer real-time confirmation that the system is observing and classifying mouth motion.

In some embodiments, the feedback window is used during example-word demonstrations in which a typed string is paired with a live or simulated viseme sequence. In other embodiments, the feedback window is hidden from the user and used only internally for feature extraction and confidence estimation.

Real-Time Mouth-Feature Measurements

In some embodiments, the real-time feedback system computes geometric mouth measurements from camera frames or facial landmarks. Such measurements may include:

(i) mouth height;
(ii) mouth width;
(iii) lip aperture;
(iv) mouth aspect ratio;
(v) normalized mouth opening;
(vi) inner-lip or outer-lip contour shape;
(vii) frame-to-frame mouth-motion vectors;
(viii) landmark-stability metrics; and
(ix) confidence values for the foregoing measurements.

These measurements may be computed from landmark positions, cropped mouth-region images, visual-speech model outputs, or combinations thereof. The measured values may be displayed numerically, plotted graphically, or used internally without being displayed. In some embodiments, mouth-height and mouth-width values are computed at each video frame or at selected frame intervals. In some embodiments, the system smooths, normalizes, or filters these values before using them for viseme detection, syllable estimation, or scoring.

Scrolling Viseme Graph

In some embodiments, the system displays a scrolling visual graph representing mouth motion over time. The graph may be a horizontally scrolling waveform in which the horizontal axis represents time and the vertical axis represents mouth height, normalized mouth opening, lip aperture, or another visual feature. A non-limiting scrolling graph may show a rolling time window, such as a two-second, three-second, five-second, or other recent interval of visual activity. As new frames arrive, the waveform advances, giving a continuous visual representation of the user's mouth opening and closing patterns. The scrolling graph may be used to identify:

(i) syllable peaks;
(ii) vowel-nucleus events;
(iii) mouth-opening cycles;
(iv) mouth-closing events;
(v) viseme transitions;
(vi) pauses;
(vii) repeated articulatory patterns; and
(viii) timing relationships between mouth motion and typed input.

In some embodiments, detected peaks, viseme labels, or confidence markers are overlaid on the scrolling graph. In other embodiments, the graph is used internally and need not be displayed to the user.

Normalized Mouth-Opening Signal

In some embodiments, the system computes a normalized mouth-opening value so that syllable detection and viseme classification are less sensitive to user-specific face shape, camera distance, or scale. A non-limiting normalized deviation value may be computed as:

$$\mathrm{dev}_{norm} = \frac{h_{current} - h_{closed}}{h_{open} - h_{closed}}$$

where $h_{current}$ is the current measured mouth height, $h_{closed}$ is a closed-mouth baseline, and $h_{open}$ is an open-mouth baseline. The closed and open centroids may be obtained from calibration, default values, adaptive estimation, or another baseline process. The normalized mouth-opening value may be used to support syllable detection, viseme classification, and candidate-specific scoring.

(i) detect syllable peaks;
(ii) distinguish open-mouth from closed-mouth visemes;
(iii) estimate vowel nuclei;
(iv) normalize scoring across users;
(v) reject noisy visual frames;
(vi) derive visual descriptors for Mode B; and
(vii) improve candidate-specific visual scoring.

The foregoing formula is illustrative only. Other normalization functions, scale factors, baselines, ratios, or learned normalization methods may be used.

Peak Detection and Syllable Counting

In some embodiments, syllable peaks are detected from the mouth-opening waveform or from another visual feature trajectory. A peak may correspond to a syllable nucleus, vowel-like event, or other visually salient articulatory event. A non-limiting peak-detection rule may identify a peak when:

(i) local maximum amplitude exceeds a threshold;
(ii) peak prominence exceeds a minimum value;
(iii) spacing between peaks exceeds a time threshold;
(iv) duration falls within an expected range;
(v) visual tracking confidence is sufficient; and
(vi) noise-wiggle suppression rules reject small false oscillations.

The resulting peaks may be counted to estimate the number of syllables in the current visual input. In some embodiments, each peak is associated with a local viseme classification, a local confidence value, and timing information. For example, if the graph shows four sufficiently prominent mouth-opening peaks during a current input interval, the system may estimate that the user mouthed a four-syllable word. That syllable estimate may then be used to retrieve candidates, prune candidates, or compute a syllable-consistency term in $S_{lip}(w)$.

Basic Viseme Labels at Peak Regions

In some embodiments, the system assigns a basic viseme label to each detected peak or peak region. The label may represent:

(i) the highest-confidence viseme at the peak;
(ii) an average viseme classification across a short peak window;
(iii) a nucleus estimate based on timing and mouth-opening amplitude;
(iv) a label derived from mouth-shape geometry; or
(v) a label derived from a neural visual-speech classifier.

Non-limiting basic vowel-like labels may include labels such as AH, EE, IH, OO, or other implementation-specific visual speech categories. In other embodiments, the labels may correspond to categories such as Open, Spread, Round, Mid, Closed, Labiodental, or another viseme set. The labeled peak sequence may form a compact observed viseme sequence used for candidate scoring. For example, the system may produce a sequence of labels corresponding to detected syllable peaks and compare that sequence to candidate reference templates. The resulting comparison may be used in Mode A reranking, Mode B candidate injection and scoring, or Mode C any-subset operation.

Relationship to Candidate Scoring and Fusion

The real-time feedback, graph, and peak-detection embodiments described in this section may provide observed visual evidence for later candidate scoring. For example:

(i) the current viseme classification may contribute to an observed viseme sequence;
(ii) the scrolling mouth-opening graph may provide a waveform for detecting syllable peaks;
(iii) peak counts may provide a detected syllable count;
(iv) peak-region labels may provide a compact visual sequence;
(v) confidence values may influence $C_{lip}$ or $q_i$, and
(vi) timing information may help align visual evidence with the current typed string.

In some embodiments, the outputs of this section are used to compute or refine the candidate-specific visual compatibility score $S_{lip}(w)$. In some embodiments, they are used to derive visual descriptors for candidate injection. In some embodiments, they are used to produce pruning cues when confidence is sufficiently high. In some embodiments, they are used only for user feedback or diagnostic display. The feedback and graph embodiments are illustrative rather than limiting. The invention may use any real-time visual display, waveform, peak-detection method, viseme-labeling method, or internal feature-tracking method that assists in deriving visual speech evidence for multimodal autocorrect.

Expanded Viseme States and Transition-Likelihood Scoring

In some embodiments, the system represents visual speech evidence using expanded viseme states rather than only a single coarse viseme label per syllable or per peak. An expanded viseme state captures temporal mouth-shape information around a syllable peak, such as the visual state before the peak, at the peak, and after the peak. This provides richer information about the trajectory of mouth motion and may improve visual scoring for long, complex, or co-articulated words. The expanded-state and transition-likelihood embodiments described in this section are optional. They may be used to improve or refine the candidate-specific visual compatibility score $S_{lip}(w)$, but the invention does not require a Markov model, transition matrix, or expanded-state representation in every implementation.

Expanded States Around Syllable Peaks

As illustrated by expanded-state windows 810 in FIG. 8, a detected syllable peak may be represented by multiple nearby visual states before, at, and after the peak. In one non-limiting embodiment, a detected syllable peak is represented by multiple nearby visual states. For example, the system may sample, classify, or otherwise characterize frames:

(i) before the peak, such as at offsets (−4) and (−2);
(ii) at the peak, such as at offset (0); and
(iii) after the peak, such as at offsets (+2) and (+4).

These offsets are illustrative only. Other frame offsets, time offsets, variable-length windows, learned attention windows, or peak-centered frame groups may be used. For example, instead of representing a syllable only as:

Open the system may represent the same syllable as a short expanded sequence such as:

Mid→Open→Round

Spread→Open→Round depending on how the mouth shape evolves before, during, and after the syllable nucleus. This expanded representation can preserve information that a single peak label would discard. For example, a rounded visual state may appear slightly after the main mouth-opening peak, or a spread state may precede an open vowel-like nucleus. Such timing patterns may help distinguish candidate text strings having similar coarse viseme or syllable counts.

Co-Articulation and Temporal Mouth-Shape Patterns

Expanded viseme states may capture co-articulation patterns arising from neighboring sounds, syllables, or mouth-shape transitions. Non-limiting examples include:

(i) Open→Round transitions;

(ii) Mid→Open transitions;

(iii) Spread→Open→Round transitions;

(iv) Closed→Open transitions;

(v) Open→Closed transitions; and (vi) late-appearing rounded or spread visual states after a syllable peak.

These patterns may be useful because visual speech is not merely a sequence of independent static mouth shapes. The order and timing of the states may carry information about the intended word. A candidate text string whose static viseme labels appear plausible may nevertheless be less likely if the observed mouth-shape transitions are temporally implausible.

Expanded-State Templates

In some embodiments, candidate text strings are associated with one or more expanded-state templates. A template may represent expected visual state transitions around one or more syllable peaks. A candidate-specific expanded-state template may be derived from one or more of:

(i) a pronunciation dictionary;

(ii) a grapheme-to-phoneme model;

(iii) a phoneme-to-viseme mapping table;

(iv) a stored visual template library;

(v) user-specific calibration examples;

(vi) population-level visual speech data;

(vii) manually curated examples; or (viii) a learned visual speech model.

A candidate text string may have multiple expanded-state templates to account for speaking rate, accent, co-articulation, dialectal variation, user-specific articulation, or alternative pronunciations. During scoring, the observed expanded-state sequence may be compared with one or more candidate templates, and the best-matching or highest-likelihood template may be used to compute or refine $S_{lip}(w)$.

Transition-Likelihood Model

In some embodiments, expanded viseme states are evaluated using a transition-likelihood model. A transition model evaluates how plausible it is for one visual state to follow another. Let each expanded viseme state be represented as a state $s_i$. Let:

$$P(s_i \rightarrow s_j)$$

represent the probability of transitioning from state $s_i$ to state $s_j$. Given an observed expanded-state sequence:

$$S=[s_1, s_2, \ldots ; s_T]$$

a non-limiting transition likelihood may be computed as:

$$L(S) = \prod_{t=1}^{T-1} P(s_t \rightarrow s_{t+1})$$

or, equivalently, in log space:

$$\log L(S) = \sum_{t=1}^{T-1} \log P(s_t \rightarrow s_{t+1})$$

The log-space formulation may be used for numerical stability and for combining the transition score with other visual scores. In a first-order Markov embodiment, the probability of the next state depends on the current state. In other embodiments, higher-order transition models may be used so that the next state depends on more than one prior state. For example, a second-order model may evaluate:

$$P(s_{t+1} | s_t, s_{t-1})$$

or another higher-order dependency. Thus, the invention is not limited to a first-order Markov chain.

Transition Modeling for Detection Smoothing

In some embodiments, transition likelihoods are used to smooth or refine noisy visual-state detection. For example, if frame-level classification briefly produces an unlikely visual state between two otherwise stable states, the transition model may reduce confidence in the unlikely state or favor a more plausible adjacent-state sequence. This smoothing may be useful when:

(i) landmark tracking is unstable;

(ii) lighting is poor;

(iii) the user articulates quickly;

(iv) a mouth shape is partially occluded;

(v) adjacent visual categories are visually confusable; or (vi) a single frame or short window produces a low-confidence classification.

In this use case, the transition model helps improve the observed expanded-state sequence before or during candidate-specific scoring.

Transition Modeling for Candidate-Specific Scoring

In other embodiments, transition likelihoods are used to score candidate text strings. For a candidate text string w, the system may obtain one or more expected expanded-state templates or transition patterns. The observed expanded-state sequence may then be evaluated against the candidate's expected transitions. A transition penalty may be defined, for example, as:

$$\text{TransitionPenalty}(S) = -\log L(S)$$

or another monotonic transformation of transition likelihood may be used. Lower transition penalty may indicate a more plausible visual articulation pattern. The transition penalty may be used to compute or refine the candidate-specific visual compatibility score $S_{lip}(w)$. A non-limiting combined lip cost is:

$$\text{LipCost}(w) = D_w + \mu \text{TransitionPenalty}_w + \lambda |s_{obs} - s_{ref}|$$

where Dw is an alignment cost, TransitionPenalty w is a transition-based penalty associated with candidate w, sobs is a detected syllable count, sref is an expected syllable count, and μ and λ are weighting factors. In another non-limiting formulation, a distance-derived score and a transition likelihood may be combined directly:

$$S_{lip}(w) = g(D_w) + \mu \log L_w$$

where $g(D_w)$ maps an alignment distance into a score and $L_w$ is a transition likelihood associated with candidate w.

The foregoing formulas are illustrative only. Other additive, multiplicative, log-linear, learned, neural, or rule-based combinations may be used.

Relation to Confusion-Weighted Viseme Edit Distance

The transition-likelihood method described in this section is different from the confusion-weighted viseme edit-distance method described herein under CONFUSION-WEIGHTED VISEME EDIT DISTANCE.

The confusion-weighted viseme edit-distance method evaluates how closely an observed visual sequence matches a candidate reference sequence while accounting for visually confusable substitutions, insertions, and deletions. It answers, in substance: How costly is it to align the observed visual sequence to the candidate's expected visual sequence? The transition-likelihood method evaluates whether the order and timing of visual speech states are temporally plausible. It answers, in substance: How plausible is the sequence of visual-state transitions for this candidate or class of candidates? These methods may be used separately or together.

For example, a candidate may receive a good edit-distance score because its coarse viseme sequence matches the observed sequence, but may still be penalized if the observed expanded-state transitions are physically or statistically implausible for that candidate. Conversely, a candidate with a mild substitution mismatch may remain plausible if its expanded-state transition pattern strongly matches the observed mouth motion.

Training, Calibration, and Adaptation of Transition Probabilities

Transition probabilities may be obtained in several ways. In some embodiments, transition probabilities are fixed or hand-designed. In other embodiments, they are estimated from observed training sequences by counting transitions and applying smoothing. In other embodiments, the transition probabilities are learned by a neural model or another statistical model. Transition probabilities may be:

(i) global across all users and words;
(ii) class-conditional;
(iii) candidate-specific;
(iv) syllable-position-specific;
(v) language-specific;
(vi) user-specific;
(vii) learned from calibration samples;
(viii) updated during ordinary use; or
(ix) adapted based on device, camera, or environmental conditions.

In some embodiments, calibration data may adjust transition probabilities or transition penalties for a particular user. For example, if a user tends to produce a rounded state later than expected, user-specific transition adaptation may reduce penalties for that user's typical timing pattern.

Use in Operating Modes

The expanded-state and transition-likelihood embodiments may be used in multiple operating modes. In Mode A, transition-likelihood scoring may refine $S_{lip}(w_i)$ for candidates already present in the text-origin list. In Mode B, expanded-state descriptors may assist visual-descriptor candidate injection, cue-confidence pruning, or candidate-specific scoring. In Mode C, transition modeling may be used whenever the lip channel is active and the selected backend exposes visual scoring or a visual branch representation. In Mode D, expanded-state evidence may optionally contribute to the speech-symbol representation used to generate orthographic variants. The expanded-state and transition-likelihood embodiments are illustrative rather than limiting.

The invention may use any method that represents mouth-motion timing around syllable peaks and uses that temporal information to improve visual speech detection, smoothing, candidate retrieval, pruning, reranking, scoring, or commitment.

Fusion Window and Three-List Ranking

FIG. 9 illustrates a non-limiting three-list fusion interface 900 including typed string display 901, native autocorrect rank list 902, LipConfirm visual rank list 904, fused rank list 906, visual sequence display 908, and score display or transparency values 910. The displayed interface 900 is optional. The same candidate generation, scoring, merging, de-duplication, injection, pruning, suggestion, and commitment operations may occur internally without showing the separate lists to the user. In some embodiments, the system provides a fusion-window interface for demonstrating, debugging, visualizing, or operating the multimodal correction process. The fusion window may display a text-origin candidate list, a lip-derived candidate list, and a fused candidate list side by side.

This interface may be used in a desktop demonstration application, a mobile keyboard extension, a development tool, an embedded keyboard pane, an XR interface, or another user interface. The fusion-window embodiments described in this section are illustrative and non-limiting. The same underlying ranking and fusion operations may be performed without displaying the lists to the user. In some embodiments, the lists are used only internally by the correction engine. The displayed columns are not required. Candidate generation, visual ranking, fusion, deduplication, injection, pruning, scoring, suggestion, and commitment may be performed entirely internally without displaying separate lists to the user.

A user-facing implementation may show only a conventional suggestion bar, inline replacement, confirmation prompt, or no special visual indication.

Three-List Fusion Window

In one non-limiting embodiment, the fusion window includes three candidate columns or rank lists:

(i) Column A—Native Autocorrect Rank List A text-origin candidate list generated by a spell-checker, autocorrect engine, language model, edit-distance engine, or other text-based correction system.
(ii) Column B—LipConfirm Rank List A visual-evidence candidate list generated from lip-derived evidence, including viseme sequences, syllable estimates, peak-region labels, expanded viseme states, or other visual speech information.
(iii) Column C—Fused Rank List A final list generated by combining the text-origin ranking with the lip-derived ranking, and optionally with whisper-derived audio evidence. The fusion window may also display one or more of:

(i) a grid of example buttons;
(ii) an example-word label;
(iii) the current typed string or current typed word;
(iv) the captured or simulated viseme sequence;
(v) the detected syllable count;
(vi) a native autocorrect candidate list;
(vii) a LipConfirm candidate list;
(viii) a fused candidate list;
(ix) score values, distance values, or rank values;
(x) and optional controls for triggering or revealing the fused result.

In some embodiments, the current typed string is animated or updated over time, and the displayed viseme sequence may be live, captured, simulated, or selected from a demonstration set.

Native Autocorrect Rank List

Column A may show the candidates generated by a native or conventional text correction engine. In one non-limiting embodiment, the text correction engine is a SymSpell-like engine, an edit-distance trie, a statistical language model, a neural language model, an operating-system spell-checker, a keyboard-level autocorrect engine, or another text-origin correction source.

The native list may be sorted according to one or more of:

(i) edit distance from the typed string;

(ii) keyboard-distance weighted edit distance;

(iii) word frequency;

(iv) language-model probability;

(v) contextual probability;

(vi) prior user history;

(vii) application-specific vocabulary; or (viii) another text-derived score.

In one demonstration embodiment, the native list is generated using a maximum edit distance of 3 and is sorted first by edit distance and then by word frequency. Other maximum edit distances, ranking functions, or native text engines may be used. If no native text candidates are found, Column A may show an empty result, a "None" indicator, or another indication that the typed string did not produce a useful text-origin candidate list.

LipConfirm Rank List

Column B may show candidates generated or ranked from visual evidence. In some embodiments, the LipConfirm list is generated by comparing an observed viseme sequence, syllable count, syllable-peak sequence, expanded-state sequence, or other visual representation against candidate text string templates. A non-limiting visual distance function is:

$$vdist(w) = \min_T [editDistance(V_{seq}, T) + syllablePenalty]$$

where T is a reference visual template associated with candidate text string w. The reference template may be derived from a pronunciation dictionary, a grapheme-to-phoneme model, a manually specified visual template, a learned model, user calibration, or another source. A non-limiting syllable penalty is:

$$\text{syllablePenalty}=|s_{detected}-s_{template}|\lambda$$

where detected_syllables is the number of syllables estimated from the observed visual evidence, template_syllables is the expected syllable count for template T, and λ is a weighting factor. In one demonstration embodiment, λ may be approximately 0.5. Other weighting factors may be used. In one demonstration embodiment, only words satisfying:

$$\text{vdist}(w)\leq 3$$

may appear in Column B. Other thresholds may be used. A value of:

$$\text{vdist}(w)=0$$

may indicate a perfect match between the observed visual sequence and a candidate template, under the scoring rules of the implementation. Larger values may indicate increasing mismatch due to viseme substitutions, insertions, deletions, syllable-count mismatch, peak mismatch, or other visual disagreement. The vdist(w) formulation is illustrative. In other embodiments, the LipConfirm list may be generated using the confusion-weighted viseme edit-distance method described herein under CONFUSION-WEIGHTED VISEME EDIT DISTANCE, the expanded-state transition-likelihood method described herein under EXPANDED VISEME STATES AND TRANSITION-LIKELIHOOD SCORING, dynamic time warping, neural matching, template matching, or another visual-scoring method.

Fused Rank List

Column C may show a fused candidate list derived from Column A, Column B, and optionally audio-derived candidates or scores. The fused list may be generated by rank-based fusion, score-based fusion, weighted fusion, neural fusion, or another combination method. In one non-limiting rank-based embodiment:

$$\text{fusedRank}(w)=\text{autocorrectRank}(w)+\alpha\,\text{lipRank}(w)$$

where autocorrectRank(w) is the candidate's rank in the native autocorrect list, lipRank(w) is the candidate's rank in the LipConfirm list, and α is a weighting factor. In one demonstration embodiment, α=3, although other values may be used. In one non-limiting score-based embodiment:

$$fusionScore(w) = w_{text}\frac{1}{1+autocorrectRank(w)} + w_{lip}\frac{1}{1+vdist(w)}$$

where $w_{text}$ and $w_{lip}$ are modality weights. Higher fusionScore(w) values indicate better candidates. Optional audio terms may also be included, for example:

$$\text{fusionScore}(w)=w_{text}S_{text}(w)+w_{lip}S_{lip}(w)+w_{audio}S_{audio}(w)$$

or another weighted, nonlinear, log-linear, multiplicative, or learned combination. In some embodiments, Column C displays diagnostic values such as:

(i) vd, representing a visual distance;

(ii) f, representing a fused score or fused rank value;

(iii) text rank;

(iv) lip rank;

(v) audio confidence;

(vi) modality weights; or (vii) another transparency value.

Such displayed values are optional and may be hidden in consumer deployments.

Candidate Injection When the Native List Is Empty

In some embodiments, Column A may be empty because the typed string is too severely corrupted for the native autocorrect engine to produce useful candidates. In that case, the system may still produce candidates in Column B from visual evidence. In a non-limiting embodiment, if Column A has no useful candidates, the fused list may be formed from the LipConfirm list alone:

$$\text{Fused List}=\text{LipConfirm List}$$

or, in set notation:

$$W_{fused}=W_{lip}$$

where $W_{lip}$ is the candidate set derived from visual evidence. This special case illustrates that lip-derived evidence may inject candidates absent from the text-origin list. The embodiment is useful for severe misspellings, missing vowels, omitted letters, adjacent-key errors, phonetic distortions, or situations where the typed string is blank or nearly blank. In other embodiments, the empty-list case may still use contextual vocabulary, recent user history, application context, optional whisper-derived candidates, or a broader lexicon to constrain the candidate set.

Candidate Overlap and De-Duplication

In some embodiments, a candidate may appear in both the native autocorrect list and the LipConfirm list. The system may merge such duplicates by canonical spelling, lowercase form, lemma, normalized diacritic form, or another canonical representation. When the same candidate appears in multiple lists, the fusion engine may reward agreement among modalities. For example, a candidate that appears high in both Column A and Column B may receive a higher fused score than a candidate that appears in only one list. In some embodiments, candidates appearing only in Column B may be retained if their visual score is sufficiently strong. Candidates appearing only in Column A may also be retained if their text score is sufficiently strong. The fused list may therefore include text-only candidates, visual-only candidates, and candidates supported by multiple modalities.

Use in Mode A, Mode B, and Mode C

The three-list ranking embodiment can correspond to different operating modes. In Mode A, Column A may define the candidate universe, and Column B may provide visual scores used to rerank or confirm candidates already present in the text-origin list. In Mode B, Column B may introduce new candidates into the fused set, including candidates absent from the ordinary text-origin list. This supports early-fusion candidate recovery. In Mode C, the same fusion-window logic may operate with any subset of modalities active. For example, the system may show only text-origin candidates when only text is active, lip-origin candidates when only lip evidence is active, or a fused list when multiple modalities are active.

In Mode D, orthographic variants generated from visual or whisper evidence may be passed through a native spell-checker, and recovered candidates may optionally be displayed or merged into a fused list.

Demonstration and Diagnostic Use

In some embodiments, the fusion window is primarily a demonstration, diagnostic, or developer-facing interface. It may show how candidate rankings change when viseme evidence is supplied. For example, the interface may show a native autocorrect list before visual evidence is provided, then show a LipConfirm list and a fused list after a viseme sequence is captured or selected. In other embodiments, the same ranking logic operates internally without exposing all three columns to the user. A consumer-facing interface may display only the final suggestion bar, the top candidate, or a simplified set of correction suggestions. The fusion-window embodiments are illustrative rather than limiting. The invention may use any interface or internal data structure that generates, compares, merges, reranks, or commits candidates from text-origin and visual-origin evidence.

Demonstration Examples and Autocorrect Failure Cases

FIG. 10 summarizes representative fusion examples, including contextual ambiguity panel 1002, severe distortion panel 1004, candidate injection panel 1006, and multiple-interpretation panel 1008. Non-limiting examples note 1010 emphasizes that the same principles may apply to proper names, technical terms, abbreviations, diacritic-bearing strings, and multilingual candidates. This section provides non-limiting examples illustrating how lip-derived visual evidence may improve correction of ambiguous, severely distorted, or textually underdetermined input strings. The examples correspond to demonstration scenarios shown in the fusion-window embodiments, as summarized in FIG. 10, in which a native autocorrect list, a LipConfirm visual-evidence list, and a fused list may be compared.

The examples are illustrative rather than limiting. They may be implemented using the fusion-window approach described with reference to FIG. 9, the visual scoring techniques described in the confusion-weighted viseme edit-distance, real-time visual speech graph, and expanded-state embodiments, the late-fusion Mode A architecture, the early-fusion Mode B architecture, or another multimodal correction architecture disclosed herein.

Categories of Autocorrect Failure

In some embodiments, the system is especially useful in at least four recurring categories of text-entry failure. First, two-plausible-word failures may occur when the typed input is compatible with two or more different words or phrases that are each grammatically plausible. Examples include if/of, bear/near, latte/latter, and bother/mother.

In such cases, textual context or language-model probability may not reliably identify the user's intended word because both alternatives may be valid in ordinary language. Second, severe-distortion failures may occur when the typed input is so far from the intended word that a text-only spell-correction engine either returns the wrong candidate or returns no useful candidate. Examples include hpsdy for howdy, drkuver for deliver or driver, abcado for avocado, and glavorybg for flavoring. Third, morphological or phonetic-collision failures may occur when several candidate text strings share overlapping character patterns, prefixes, or phonetic structure but have different meanings. Examples include confirmation, conflation, and conflagration. Fourth, prefix-dominant correction errors may occur when a text-only correction engine favors a more frequent or more common word based on a prefix or approximate spelling, even though the user intended a different word.

In such cases, visual speech evidence may supply additional information about syllable count, vowel nuclei, or mouth-shape pattern that is not present in the typed string alone.

Contextual Ambiguity Examples

In some embodiments, lip-derived visual evidence resolves textual ambiguity by distinguishing words whose typed forms or contextual uses are similar but whose visual speech patterns differ.

(i) IF/OF: typed input "if" may be textually ambiguous because "what if . . . " and "what of . . . " may both be plausible.

An IH-like visual pattern may support "if," while an AH-like visual pattern may support "of," allowing fusion to select the visually supported candidate.

(i) BEAR/NEAR: typed input "bear" may be ambiguous because "bear" and "near" may both appear in plausible phrases. Different vowel-nucleus or mouth-shape patterns may distinguish the intended word and shift the fused ranking.

(ii) LATTE/LATTER: typed input "latte" may be ambiguous because "latte" and "latter" may both be plausible in context. Different peak-viseme sequences may help the visual score disambiguate.

(iii) BOTHER/MOTHER: typed input "bother" may be ambiguous because "bother" and "mother" may both form grammatical phrases. Different first-syllable or vowel-nucleus evidence may favor the visually supported candidate.

These examples illustrate that text-only correction may be uncertain when several candidates remain grammatically or contextually possible. Lip-derived evidence can provide a separate source of user-intent information, such as vowel-nucleus shape, syllable pattern, or viseme sequence.

Severe Distortion Examples

In some embodiments, visual evidence helps recover words when the typed input is severely corrupted.

(i) Hpsdy->Howdy: when the typed input is "hpsdy," the user may mouth a visual sequence corresponding to "howdy," and the fused list may promote "howdy" over text-only candidates.

(ii) Drkuver->Deliver/Driver: when the typed input is "drkuver," different viseme or syllable patterns may distinguish possible intended candidates such as "deliver" and "driver."

(iii) Glavorybg-22 Flavoring: when the typed input is "glavorybg," a visual template for "flavoring" may be detected, and the LipConfirm list may inject "flavoring" even when native autocorrect has no useful candidate.

(iv) Abcado-22 Avocado: when the typed input is "abcado," visual sequence and syllable evidence matching "avocado" may cause the fused list to promote "avocado" despite the text distortion.

In one illustrative example, when the typed input is glavorybg, a native autocorrect engine may fail to return useful candidates. The LipConfirm visual list may nevertheless identify a visual template corresponding to flavoring, and the fused list may therefore include or select flavoring. This demonstrates candidate injection based on visual evidence when the text-origin list is empty or inadequate.

Multiple Valid Interpretations: Confirmation, Conflation, and Conflagration

In some embodiments, a typed string may be compatible with multiple valid words having related spelling, prefix structure, or phonetic structure. For example, the typed input: "conflrgation" may be compatible with several possible intended words, including:

(i) confirmation;

(ii) conflagration; and (iii) conflation.

A text-only correction engine or language model may favor one candidate based on frequency, spelling proximity, or prefix structure. However, visual evidence may distinguish among these candidates using syllable count, vowel-nucleus sequence, or viseme pattern. Non-limiting examples include:

(i) conflagration: IH-AH-EE-IH.

(ii) confirmation: IH-OO-EE-IH.

(iii) conflation: IH-EE-IH.

Thus, even when multiple candidate text strings are linguistically valid, the user's mouth motion may provide candidate-specific evidence that shifts the fused ranking toward the intended word.

Use of Visual Distance in the Demonstrations

In some embodiments, the demonstration examples use a visual distance measure such as:

$$\text{vdist}(w)=\text{editDist}(V_{seq},T)+|s_{detected}-s_{word}|\lambda$$

or the related template-minimized formulation described elsewhere herein. Lower visual distance indicates stronger visual compatibility. A perfect or near-perfect visual match may have a visual distance such as vd=0, while larger values may indicate substitution, insertion, deletion, syllable-count, or template mismatch. The visual distance may be used to generate a LipConfirm rank list, to rerank a native text-origin list, to inject candidates absent from the native list, or to form a fused score together with text and optional audio evidence.

Demonstration Table

The following table summarizes non-limiting demonstration examples.

(i) IF/OF: viseme evidence may distinguish IH-like and AH-like alternatives and resolve ambiguity.

(ii) BEAR/NEAR: vowel-nucleus evidence may differentiate candidates and raise the visually supported word.

(iii) Hpsdy/Howdy: when the user mouths "howdy," the fused list may select "howdy."

(iv) LATTE/LATTER: different syllable or viseme patterns may support one candidate and resolve the ambiguity.

(v) BOTHER/MOTHER: first-syllable or vowel-pattern evidence may distinguish the words and favor the matched candidate.

(vi) Deliver/Driver: visual sequence evidence may differentiate possible intended words and select the appropriate candidate by fusion.

(vii) Flavoring: when native text candidates may be empty, a LipConfirm visual template may match "flavoring" and inject the candidate.

(viii) Avocado: syllable and viseme-template evidence may match "avocado" and cause the fused list to promote it.

(ix) Conflagration/Confirmation/Conflation: different candidate visual patterns may distinguish valid alternatives and select the intended word by visual match.

Non-Limiting Nature of Examples

The examples in this section are illustrative only. The same principles may apply to proper names, technical vocabulary, slang, abbreviations, domain-specific terminology, foreign words, diacritics, transliterations, or user-specific vocabulary. The typed input may be accurate, mildly corrupted, severely garbled, sparse, or absent. The visual evidence may be live, captured, simulated, calibrated, or derived from a learned model. The system may use text-only candidates, visual-only candidates, audio-derived candidates, or any fused combination thereof.

These examples demonstrate that visual speech evidence can contribute information that is unavailable from typed characters alone, including syllable count, vowel-nucleus pattern, mouth-shape sequence, and candidate-specific visual compatibility. The invention is not limited to the examples, words, viseme labels, scores, thresholds, or display formats described in this section.

Temporal Fusion while Typing

FIG. 11 illustrates concurrent typing and visual evidence capture. Typed-input timeline 1102, visual-frame timeline 1104, and optional audio timeline 1106 may be processed within rolling window 1108 to generate provisional candidate updates 1110 before final scoring or commit point 1112. In some embodiments, the system performs temporal fusion while the user is actively typing. Rather than waiting for a fully completed word in all cases, the system may capture and process typed input, lip-derived visual evidence, and optional whisper-derived audio evidence as partially overlapping time streams. This permits the system to update correction candidates while a word is being entered and to refine those candidates as additional visual or textual evidence becomes available.

Concurrent Typing and Viseme Capture

In one non-limiting embodiment, the user enters a typed string while the camera simultaneously captures mouth-region image data. The typed string may be incomplete, partially garbled, or still evolving. At the same time, the user may mouth, silently articulate, or partially articulate the intended word. The system may therefore receive:

(i) a current typed prefix or typed string $p_t$,
(ii) a current visual evidence stream $V_t$;
(iii) optional audio evidence $A_t$; and
(iv) timing information associated with each stream.

For example, the user may begin typing a word, pause, continue typing, or correct characters while lip evidence is being captured. The visual evidence need not be perfectly synchronized with individual keystrokes. A syllable peak or viseme transition may occur before, during, or after the corresponding characters are typed.

Rolling Window or Text-Entry Interval

A rolling window or text-entry interval may be used to associate lip-movement evidence and optional whisper-level audio evidence with the current typed string. The dedicated text-entry interval embodiments below provide additional non-limiting examples of start events, end events, backspace handling, pre-roll, post-roll, association confidence, and privacy-preserving frame discard. In some embodiments, the system uses a rolling temporal window to associate typed input and visual evidence. The rolling window may cover a recent interval of activity, for example a window of about one to three seconds, although other durations may be used. Within the window, the system may maintain recent keystrokes, recent visual frames, extracted mouth-motion features, detected syllable peaks, viseme probabilities, and optional audio evidence.

In other embodiments, the system uses a text-entry interval associated with a current string or token. The interval may begin upon a start event, such as the first keystroke of a string, and may end upon a delimiter, inactivity timeout, candidate commitment, or another event. A rolling window and a text-entry interval may also be used together. For example, a rolling window may provide provisional updates during typing, while the final text-entry interval may be used for final scoring or commitment.

Provisional Scoring During Entry

In some embodiments, the system computes provisional candidate scores while a word is still being entered. For example, as the user types a partial string, the text engine may generate provisional text-origin candidates. As the user's mouth motion is captured, the visual subsystem may generate provisional viseme labels, syllable estimates, peak detections, or expanded visual speech states. The system may then compute provisional visual scores, such as provisional $S_{lip}(w)$, for current candidate text strings. These scores may be updated as more frames and keystrokes arrive. A candidate that is weakly supported early in the word may become strongly supported after additional mouth-motion or typed-character evidence is captured.

Refinement After Additional Evidence Arrives

In some embodiments, the system refines provisional scores after the current string becomes more complete. For example, after a delimiter, pause, or commitment event, the system may recompute or finalize the visual score using the full observed visual evidence associated with the current input interval. This final or refined computation may use one or more of:

(i) the complete observed viseme sequence for the interval;
(ii) detected syllable count;
(iii) peak timing;
(iv) expanded visual speech states;
(v) optional audio evidence;
(vi) a reference viseme template for each candidate;
(vii) confusion-weighted viseme edit distance;
(viii) transition-likelihood scoring; or
(ix) another visual or multimodal scoring method.

Thus, the system may support both incremental partial scoring and more stable interval-complete scoring.

Handling Timing Offset Between Modalities

In practice, mouth motion and keystrokes may not align exactly. A user may begin mouthing a word before typing the first character, may continue mouthing after the typed string is completed, or may mouth only the difficult portion of a word. The system may accommodate these timing offsets using one or more of:

(i) a pre-roll interval before the first keystroke;
(ii) a post-roll interval after the last keystroke;
(iii) rolling-window buffering;
(iv) dynamic time warping;
(v) peak-to-character or peak-to-syllable alignment;
(vi) confidence-based association of visual evidence to the current typed string;
(vii) or another temporal association method.

This temporal flexibility allows the system to use natural user behavior rather than requiring precise synchronization between lips and fingers.

Continuous Candidate-List Updating

In some embodiments, candidate lists are updated continuously as new evidence arrives. For example:

(i) the native text-origin list may update after each keystroke;
(ii) the visual candidate list may update after new viseme or syllable evidence is detected;
(iii) the fused list may update after either text or visual scores change; and
(iv) the commit controller may wait until confidence, margin, entropy, or stability conditions are satisfied.

In a demonstration interface, the typed word and viseme sequence may be shown evolving over time. In a consumer deployment, the same process may occur internally while only the final suggestion bar or committed result is shown.

Use in Operating Modes

Temporal fusion while typing may be used in multiple operating modes. In Mode A, provisional $S_{lip}(w_i)$ values may be updated for candidates already present in the text-origin list, and then refined after the current string is complete. In Mode B, partial visual evidence may help inject candidates, prune candidates, or score candidates before the typed string is complete. In Mode C, the same temporal process may operate with any subset of modalities active, including text plus lip, text plus audio, lip-only, audio-only, or all three.

In Mode D, partial lip or whisper evidence may contribute to a speech-symbol representation used to generate orthographic variants for injection into an existing spell-correction engine.

Non-Limiting Nature The temporal-fusion embodiments described in this section are illustrative rather than limiting. The system may update after every keystroke, every video frame, every audio frame, every detected peak, every fixed time interval, or upon another event. The system may commit early when confidence is high, delay commitment until a delimiter or pause occurs, or merely present suggestions without automatic replacement. The invention therefore supports real-time, incremental fusion while typing, while also supporting final interval-based scoring when a more stable visual sequence is available.

Text-Entry Interval and Segmentation Logic

FIG. 15 illustrates non-limiting text-entry interval and segmentation logic. Evidence-to-text association window 1500 may include typed-input timeline 1502, visual-frame timeline 1504, optional-audio timeline 1506, start event 1508, end event 1510, backspace event 1512, re-association or boundary recomputation 1514, association confidence 1516, feature extraction 1518, and raw-frame discard 1520. Text-entry interval 140 may include pre-roll 142 and post-roll 144. In some embodiments, visual evidence is associated with a particular typed string, current typed token, candidate text string, or editable text segment using a text-entry interval. The text-entry interval identifies a time window of image frames, and optionally audio frames, corresponding to entry, correction, or replacement of the string to be corrected.

A text-entry interval is one non-limiting association mechanism; other rolling window, cursor-state, token-boundary, or context-based association methods may also be used.

In one non-limiting implementation, the interval begins upon a start event and ends upon an end event. Start events may include a first keystroke after a delimiter event, a cursor entering an editable region, focus entering a text-entry field, explicit initiation of text composition, resumption of typing after a pause, or beginning of an input-method composition event. End events may include entry of a delimiter such as space, punctuation, or enter; expiration of an inactivity timer; selection or commitment of a candidate correction; cursor movement leaving the current composition region; focus leaving the editable field; application context change; explicit cancellation or confirmation of composition; or another event indicating that the current string or editable segment has ended.

In some embodiments, if backspace removes characters within the current string, the interval remains open and the visual evidence is re-associated with the edited string. If backspace crosses a delimiter boundary, the system may merge intervals, split intervals, extend a prior interval, or recompute boundaries based on the updated composition state. In some embodiments, a short pre-roll and post-roll are included to capture co-articulation, anticipation, delayed mouth closure, or other visual speech effects adjacent to the typed string. The pre-roll and post-roll may be fixed, adaptive, confidence-based, or dependent on typing speed, mouthing speed, camera frame rate, or application context.

In some embodiments, provisional intervals are maintained during typing and updated incrementally as additional keystrokes, visual frames, or audio frames arrive. A final interval may be determined after a delimiter, correction event, timeout, candidate selection, cursor movement, or other end event. Provisional scoring may be updated during the interval and refined after the interval is finalized. In some embodiments, the system computes an association confidence indicating how likely the visual or audio evidence belongs to the typed string or current text-entry state. Low association confidence may reduce lip or audio weights, prevent automatic commit-ment, cause the system to present suggestions only, or cause the controller to wait for additional evidence.

In some embodiments, raw image frames and raw audio frames are discarded after feature extraction, after candidate scoring, after interval finalization, after correction processing for the typed string, or according to a user privacy policy. Derived features may be retained for a shorter or longer period depending on calibration, personalization, debugging, or user-authorized storage settings.

Simplified Six-Viseme Set, Template Variants, and Full-Lexicon Scaling

In some embodiments, the system uses a simplified set of visual speech categories to support real-time visual classification, low-latency scoring, and practical autocorrect fusion. A simplified viseme set may be useful where the system is intended to operate on ordinary consumer devices using a front-facing camera, webcam, or other camera source under non-ideal lighting, pose, or motion conditions. The simplified viseme embodiment described in this section is non-limiting. Other embodiments may use fewer categories, more categories, continuous visual embeddings, learned visual speech representations, phoneme posteriorgrams, expanded viseme states, or other visual articulatory representations.

Simplified Six-Viseme Set

In one non-limiting embodiment, the system uses a six-category viseme set. The six categories may include:

(i) Closed (ii) Labiodental (iii) Open (iv) Spread (v) Round (vi) Mid These categories may be selected because they correspond to visually distinguishable mouth-shape groupings that can be detected with relatively low compute. For example, a landmark-based implementation may classify mouth shapes by using mouth height, mouth width, aspect ratio, lip aperture, contour shape, and related geometric features. A neural implementation may instead classify or embed the same categories using cropped mouth images, visual speech features, or learned representations. The six categories are illustrative. In some embodiments, the category labels may be changed, merged, split, learned, language-specific, user-specific, or mapped to a different set of visual speech states.

Word-Level Viseme Templates

In some embodiments, each candidate text string has one or more associated viseme templates. A template may represent an expected sequence of visual speech categories, expected vowel nuclei, expected syllable peaks, or major visual transitions for that word. For example, a word template may encode the visually salient vowel-like portions of a word rather than every phoneme. This can improve robustness because many consonants are visually ambiguous, while vowel nuclei and major mouth-shape transitions may be more stable and useful for correction. A non-limiting template may include:

(i) a sequence of basic viseme labels;

(ii) a sequence of vowel-nucleus labels;

(iii) an expected syllable count;

(iv) first or last visually salient categories;

(v) expanded-state transitions around one or more syllable peaks;

(vi) timing or spacing information between peaks;

(vii) or a confidence-weighted collection of such features.

Such templates may be used to compute a visual compatibility score $S_{lip}(w)$, derive a visual descriptor for candidate retrieval, or compare a detected sequence against candidate text strings in a LipConfirm rank list.

Example Template Variants

The AH, EE, IH, and OO labels used in examples are illustrative vowel-nucleus or visual-vowel labels. In some embodiments, such labels may be mapped to simplified visual categories such as Open, Spread, Round, Mid, or another implementation-specific visual speech category set.

In some embodiments, a candidate text string may have multiple visual templates to account for pronunciation variation, co-articulation, accent, dialect, or user-specific mouth movement. Non-limiting examples include:

(i) latte: (AH, EE) or (IH, EE).

(ii) latter: (EE, IH).

(iii) conflagration: (IH, AH, EE, IH).

(iv) confirmation: (IH, OO, EE, IH).

(v) conflation: (IH, EE, IH).

(vi) avocado: (AH, AH, AH, OO) or dialectal variants.

These examples are illustrative only. The actual template assigned to a word may depend on the viseme set, the pronunciation dictionary, the user's dialect, the language, the camera view, calibration data, and the scoring model used by the system. In some embodiments, multiple templates are retained for a single word, and the system uses the best-matching template during scoring. For example, a visual distance may be computed against each template T for a candidate text string w, and the minimum distance may be used:

$$vdist(w) = \min_T p[editDistance(V_{seq}, T) + syllablePenalty]$$

The distance term may be edit distance, confusion-weighted viseme edit distance, dynamic time warping, template distance, neural distance, transition-likelihood cost, or another compatibility measure.

Template Generation from Pronunciation Resources

FIG. 17 illustrates a non-limiting template-generation and full-lexicon visual-indexing process 1700. Candidate text strings 1702 may be processed using pronunciation resources 1704 to obtain pronunciation representation 1706, which may be mapped by phoneme-to-viseme mapping 1708 and syllable/visual-nucleus extractor 1710 into templates generated by visual-template generator 1712. Optional user calibration or dialect variants 1730 may influence the resulting templates. In some embodiments, visual templates are generated automatically from pronunciation resources. For example, the system may:

(i) obtain a word or candidate string w;

(ii) derive a pronunciation representation for w;

(iii) map phonemes or phoneme groups to visual speech categories;

(iv) identify visually salient vowel nuclei, syllable peaks, or mouth-shape transitions;

(v) generate one or more candidate visual templates; and (vi) store those templates for scoring, retrieval, or fusion. Pronunciation representations may be derived from one or more of:

(i) a pronunciation dictionary, such as CMU Pronouncing Dictionary;

(ii) a grapheme-to-phoneme model;

(iii) a phoneme-to-viseme mapping table;

(iv) a rule-based vowel-syllable mapping;

(v) a neural lipreading model;

(vi) a visual speech model;

(vii) user-specific calibration examples; or (viii) another pronunciation or visual-speech source.

In some embodiments, the template generator creates several possible templates for a word, rather than a single fixed template. This supports accent diversity, co-articulation, alternate pronunciations, and pronunciation uncertainty.

Full-Lexicon Embodiment

As further shown in FIG. 17, template variants 1714 may be stored in reference visual template library 1716. Index builder 1718 may construct visual descriptor index 1720. During runtime, observed visual descriptors 1722 may be supplied to descriptor query/retrieval module 1724, which may retrieve visual-derived candidate set 1726. Retrieved candidates and templates 1728 may be used in Mode A scoring, Mode B candidate injection, Mode C active-lip operation, and Mode D speech-symbol or proxy-string generation. Although a demonstration implementation may use a small selected lexicon, the invention is not limited to a demonstration vocabulary. In production embodiments, the system may support:

(i) a full English vocabulary;

(ii) tens of thousands of common words;

(iii) user-specific vocabulary;

(iv) proper names;

(v) technical terms;

(vi) domain-specific dictionaries;

(vii) multi-language vocabularies;

(viii) transliterations;

(ix) diacritic-bearing words; or (x) application-specific candidate sets.

A production system may generate and cache templates for all words in a lexicon, generate templates on demand, or dynamically generate templates only for candidates produced by a text engine, visual index, phonetic index, or language model. In some embodiments, a large vocabulary is partitioned or indexed using visual descriptors, such as syllable count, first viseme, last viseme, vowel-nucleus sequence, partial viseme sequence, or related features. Such indexing may reduce search cost by allowing the system to compare the observed visual evidence only against a relevant subset of candidate text strings.

Multi-Language and Cross-Platform Scaling

The template-generation approach may be applied to multiple languages. In some embodiments, a language-specific pronunciation dictionary or grapheme-to-phoneme model is used. In other embodiments, a universal or multilingual visual speech model provides visual categories or embeddings that can be compared across languages. For example, a production embodiment may support English, Spanish, Mandarin Pinyin, or other languages by generating language-specific phoneme or syllable representations and mapping them into visual speech categories. The system may also support proper names, surnames, borrowed words, slang, and user-created vocabulary. The same template-generation and scoring principles may be applied across smartphones, tablets, laptops, desktop computers, wearables, and XR devices, although camera placement, frame rate, sensor quality, and UI presentation may vary.

Relationship to Scoring and Fusion

The simplified viseme set and template-generation methods described in this section may be used with the scoring and fusion methods disclosed elsewhere herein. For example:

(i) in Mode A, templates may be used to compute $S_{lip}(w_i)$ for candidates in $W_{text}$, (ii) in Mode B, templates may be used for visual-descriptor candidate injection, pruning, or candidate-specific scoring;

(iii) in Mode C, templates may be used whenever the lip channel is active;

(iv) in Mode D, templates or viseme sequences may contribute to the speech-symbol representation used to generate orthographic variants;

(v) in Confusion-Weighted Viseme Edit Distance, templates may provide the reference sequence Rw used for confusion-weighted viseme edit distance;

(vi) in Expanded Viseme States and Transition-Likelihood Scoring, templates may include expanded-state or transition patterns; and (vii) in Fusion Window and Three-List Ranking, templates may be used to build the Lip-Confirm rank list.

The simplified six-viseme set is therefore one practical implementation path for obtaining real-time visual evidence, while the full-lexicon and template-generation embodiments allow the same system architecture to scale beyond a small demonstration vocabulary.

Supplemental Neural Early-Fusion Implementation

Figure 20:
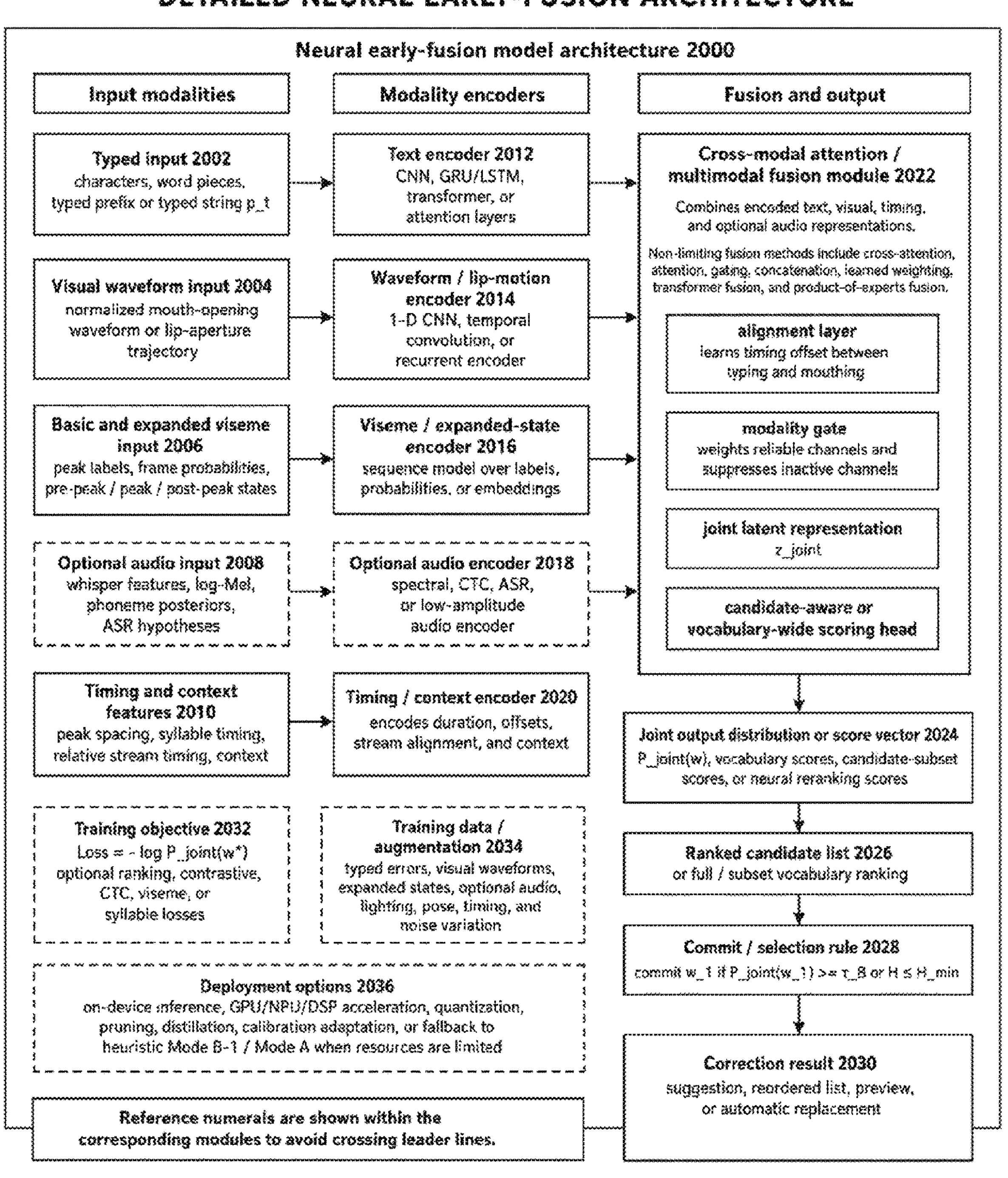
FIG. 20 is a block diagram illustrating a detailed neural early-fusion architecture.

FIG. 20 illustrates a detailed neural early-fusion model architecture 2000. The architecture 2000 may receive typed input 2002, visual waveform input 2004, basic or expanded viseme input 2006, optional audio input 2008, and timing/context features 2010. Text encoder 2012, waveform/lip-motion encoder 2014, viseme/expanded-state encoder 2016, optional audio encoder 2018, and timing/context encoder 2020 may feed cross-modal attention or multimodal fusion module 2022. The model may output joint output distribution or score vector 2024, ranked candidate list 2026, commit/selection rule 2028, and correction result 2030. Training objective 2032, training data/augmentation 2034, and deployment options 2036 are non-limiting supplemental embodiments.

This section provides additional non-limiting implementation details for the neural early-fusion embodiments introduced in the corresponding embodiments. The neural implementation is optional and may be used as a primary decoder, reranker, auxiliary scorer, validation module, or training/distillation source. In some embodiments, the system includes a supplemental neural early-fusion implementation that learns relationships among typed input, lip-derived visual evidence, optional whisper-derived audio evidence, and timing features. This section provides additional non-limiting implementation detail for neural embodiments such as Mode B-2. The neural embodiment may be used as a direct decoder, a candidate generator, a reranker, an auxiliary scorer, or a fallback path when heuristic fusion is insufficient.

The neural implementation described in this section is optional. The invention does not require a neural model in all embodiments, and heuristic, rules-based, template-based, or hybrid approaches may be used instead.

Neural Input Modalities

In some embodiments, the neural model receives multiple input modalities as separate streams. Non-limiting input streams include:

(i) Typed input, including a typed prefix, typed string, tokenized character sequence, word-piece sequence, or other representation of the user's keystrokes. The typed input may be correct, slightly misspelled, severely garbled, sparse, or absent.

(ii) Visual waveform input, including a normalized mouth-opening waveform such as $dev_{norm}$, a lip-aperture waveform, a mouth-height trajectory, or another continuous visual feature sequence.

(iii) Basic viseme input, including a sequence of detected viseme categories, peak-region labels, syllable-nucleus labels, or frame-level viseme probabilities.

(iv) Expanded viseme input, including pre-peak, peak, and post-peak visual states around syllable nuclei, as described in the expanded-state embodiments.

(v) Timing features, including peak timing intervals, syllable spacing, duration features, mouth-opening timing, typing timing, or other prosodic or temporal cues.

(vi) Optional audio input, including whisper-level acoustic features, log-Mel spectrograms, phoneme posteriorgrams, ASR n-best hypotheses, CTC outputs, or other low-amplitude audio representations. Any subset of these inputs may be used. For example, a text-plus-lip embodiment may omit audio, while a mouth-only embodiment may use a null-text representation together with visual waveform and viseme-state inputs.

Modality-Specific Encoders

In some embodiments, each modality is converted into a learned embedding by a modalityspecific encoder. A text encoder may accept the typed prefix or typed string as a sequence of characters, subword units, or tokens. The text encoder may be implemented using convolutional neural networks, recurrent networks, GRUs, LSTMs, transformers, attention-based layers, or another sequence encoder. The text embedding may capture spelling patterns, edit-distance proximity, keyboard-adjacency error patterns, omissions, insertions, transpositions, and other typing-error characteristics. A lip or viseme encoder may accept one or more visual representations, including the normalized mouth-opening waveform, basic viseme labels, expanded viseme tokens, frame-level viseme probabilities, syllable-peak features, or landmark-derived features. Non-limiting lip encoders include:

(i) one-dimensional convolutional networks over waveform features;

(ii) GRUs or LSTMs over temporal viseme labels;

(iii) transformers over expanded viseme tokens;

(iv) temporal-convolution models over mouth-motion sequences;

(v) or hybrid encoders combining landmark and neural visual features.

A timing encoder may encode syllable spacing, peak intervals, duration patterns, relative timing between typing and mouthing, or other temporal features. In some embodiments, timing features are appended to the lip encoder output. In other embodiments, they are processed as a separate modality. An optional audio encoder may convert low-amplitude acoustic evidence into spectral embeddings, phoneme-posteriogram embeddings, ASR-hypothesis embeddings, or other learned audio representations. The audio encoder may be configured for whisper, breathy utterances, quiet speech, or other low-volume acoustic inputs.

Cross-Modal Attention and Fusion

In some embodiments, the outputs of the modality-specific encoders are combined using a cross-modal attention block. The attention block may learn relationships among:

(i) typed text characters or tokens;

(ii) viseme or expanded-viseme sequences;

(iii) mouth-opening waveform features;

(iv) syllable timing intervals;

(v) optional whisper audio features; and (vi) context or candidate information.

The fusion block may determine, for a particular input instance, which modality should dominate. For example, if the typed input is severely garbled but the visual syllable pattern is strong, the model may weight the visual branch more heavily. If the lip signal is unreliable but the typed input is clear, the model may weight the text branch more heavily. If whisper evidence strongly supports a candidate, the model may incorporate that acoustic signal into the joint representation. The fusion mechanism may include attention, cross-attention, gating, concatenation, learned weighted fusion, product-of-experts fusion, transformer fusion, or another learned combination method.

Output Layer and Decoding

In some embodiments, the neural model produces a correction-oriented output. Non-limiting outputs include:

(i) a probability distribution over a full vocabulary;
(ii) a probability distribution over a candidate subset;
(iii) a ranked candidate list;
(iv) a score vector over vocabulary items;
(v) a neural reranking score for candidates generated elsewhere; or
(vi) an auxiliary score used in a broader fusion controller.

A non-limiting direct-decoding output is:

$$P_{joint}(w)$$

representing the model's estimated probability that candidate text string w is the intended word, conditioned jointly on the active input modalities. In some embodiments, the model supports vocabularies ranging from a small demonstration lexicon to a full production vocabulary, for example tens of thousands of words or more. In other embodiments, the neural model operates over a smaller candidate set generated by a text engine, visual index, phonetic index, or heuristic early-fusion pathway.

Training Data

In some embodiments, the neural model is trained using examples that include:

(i) typed input, which may be correct, slightly wrong, abbreviated, or heavily garbled;
(ii) corresponding viseme sequences, visual waveforms, expanded viseme states, or other visual evidence;
(iii) ground-truth intended words or output tokens;
(iv) optional whisper or low-amplitude audio; and
(v) optional timing features, such as syllable spacing or peak intervals.

The training data may include real user examples, synthetic typing errors, simulated keyboard-adjacency errors, recorded calibration examples, visual-speech datasets, or combinations thereof. In some embodiments, the training data includes examples in which the typed string alone is insufficient to identify the intended word but the visual or audio channel provides disambiguating evidence.

Training Objective and Augmentation

A non-limiting training objective is to minimize cross-entropy between the predicted word probabilities and the correct target word:

$$\text{Loss}=-\log P_{joint}(w)^{*})$$

where w* is the ground-truth intended word. Other objectives may be used, including ranking loss, contrastive loss, auxiliary viseme-prediction loss, auxiliary syllable-count loss, CTC-style loss, distillation loss, or combinations thereof. Training may include augmentation of one or more input modalities. Non-limiting augmentations include:

(i) artificially distorted typing;
(ii) adjacent-key substitutions;
(iii) omitted characters;
(iv) inserted characters;
(v) transposed characters;
(vi) waveform noise injection;
(vii) video brightness perturbation;
(viii) rotation or jitter perturbation;
(ix) head-pose variation;
(x) syllable-timing variation;
(xi) mouthing-speed variation;
(xii) dialectal vowel-space transformation;
(xiii) acoustic noise injection; and
(xiv) whisper-amplitude variation.

Such augmentation may improve robustness to ordinary typing errors, camera variation, lighting changes, user-specific articulation, and environmental noise.

Learned Alignment Across Modalities

In some embodiments, the neural model learns an alignment among the typed prefix, viseme nuclei, peak timing, expanded-state transitions, and optional whisper audio. This learned alignment may be implicit rather than explicitly programmed. For example, the model may learn that a particular garbled typed prefix, combined with a four-syllable visual pattern and a particular sequence of expanded viseme states, is more likely to correspond to one candidate text string than another. The model may also learn that certain visual peaks occur before or after corresponding keystrokes and may therefore tolerate timing offsets between typing and mouthing. This learned alignment may complement, replace, or refine explicit alignment methods such as edit distance, dynamic time warping, template matching, or transition-likelihood scoring.

Deployment and Relationship to Other Modes

In some embodiments, the neural early-fusion implementation runs entirely on-device. In other embodiments, it may run partially on-device, may be accelerated by a GPU, NPU, DSP, or other processor, or may be compressed using quantization, pruning, distillation, or other model-compression methods. The neural implementation may be used in several ways:

(i) as the primary Mode B-2 decoder;
(ii) as a reranker for candidates generated by Mode B-1;
(iii) as a backend used by Mode C when compute resources permit;
(iv) as a validator for candidates recovered by Mode D;
(v) as an auxiliary source of $S_{lip}(w)$, $S_{audio}(w)$, or $P_{joint}(w)$; or
(vi) as a training or distillation source for a smaller heuristic or on-device model.

The neural embodiment can support larger vocabularies, faster inference in suitable hard-ware, and end-to-end learnable fusion. However, the invention is not limited to neural early fusion, and the neural implementation may be omitted, simplified, or combined with the heuristic and reverse-garbled embodiments described elsewhere herein.

Privacy, Local Processing, Sensor Gating, Power Management, and Deployment Environments Privacy, Local Processing, Sensor Gating, and Power Management FIG. 21 illustrates a non-limiting privacy, local-processing, sensor-gating, and power-management architecture. User computing device 2102 may include text-entry interface 2104. Privacy or permission policy 2106 and start/end event and text-entry interval logic 2126 may control sensor-gating controller 2108.

The sensor-gating controller 2108 may enable or disable imaging sensor 2110 and optional microphone 2112 based on text-entry activity, user permission, power state, application context, tracking quality, audio availability, or expected correction benefit. Local inference and feature extraction engine 2114 may process mouth-region image data, lip-movement evidence, visual speech cues, optional whisper-level audio, candidate scoring inputs, and confidence values on device. Volatile buffer or temporary memory 2116 may hold derived features and intermediate values temporarily. Raw-frame or raw-audio discard 2118 may delete raw image frames or raw audio frames after feature extraction, scoring, interval finalization, correction processing, or another privacy-preserving event. Low-power or sleep controller 2120 may power down or duty-cycle inactive sensors. Optional remote service 2122 may be used only when policy permits, user consent is present, and network availability or deployment configuration supports it. Correction result 2124 may include a suggestion, reordered candidate list, preview, or automatic replacement.

In some platform embodiments, sensor use may be disabled, restricted, or placed into suggestion-only operation for password fields, passcode fields, payment credential fields, secure text fields, or other application or operating-system contexts designated as sensitive or policy-restricted. The system may require user authorization for camera or microphone use and may display or rely on host-platform camera or microphone indicators. Processing may be limited to a mouth-region crop, mouth-region landmarks, or derived visual features, and the system need not perform face recognition or identify the user.

If permission, privacy policy, power state, lighting, tracking quality, audio quality, application context, or user setting is unsuitable, the sensor-gating controller or commit controller may fall back to text-only correction, suggestion-only output, or no auxiliary correction for the affected text-entry interval.

Device and Deployment Environments

FIG. 22 illustrates representative deployment environments 2200. Non-limiting device examples include smartphone or tablet 2202, laptop or desktop 2204, wearable or smart watch 2206, smart glasses 2208, XR or VR headset 2210, and external peripherals 2212 such as an external webcam, microphone, or keyboard.

Software deployment layer 2214 may include operating-system keyboard service 2216, input method editor or mobile keyboard extension 2218, application-level text-entry service 2220, and wearable or XR text-entry service 2222. Across such deployments, shared text-entry correction architecture 100 may include keyboard-based text-entry interface 104, autocorrect or spell-correction engine 108, visual feature extractor 116, optional audio feature extractor 2224, candidate lists, visual descriptors, and templates 2226, candidate-set merging module 130, fusion controller 132, commit controller 134, and correction result 136. The device and deployment examples of FIG. 22 are illustrative rather than limiting.

The same architecture may run locally on-device, partially on-device, or within a privacy-authorized deployment. Any keyboard-based text-entry device with a mouth-region sensor or access to mouth-region evidence may use the disclosed correction techniques.

Non-Limiting Nature of Embodiments

The embodiments described herein are illustrative and may be combined, omitted, re-ordered, or modified. Features described in connection with one mode, figure, device, user interface, scoring method, or implementation may be used with another mode, figure, device, user interface, scoring method, or implementation unless the context clearly requires otherwise. No embodiment requires a particular camera, microphone, visual model, audio model, viseme taxonomy, fusion formula, user-interface layout, candidate count, threshold, device class, or deployment layer.

What is claimed is:

1. A computer-implemented method for correcting text input, the method comprising:

receiving, by one or more processors, a typed string entered through a keyboard-based text-entry interface;

providing the typed string to an autocorrect engine or spell-correction engine to generate, from the typed string alone, a text-origin candidate list comprising a plurality of candidate text strings;

receiving lip-movement evidence captured by an imaging sensor while or in association with entry of the typed string, the lip-movement evidence comprising one or more visual speech cues;

for each of at least two candidate text strings in the text-origin candidate list, computing a lip-alignment score by comparing the visual speech cues with a reference viseme, syllable, phoneme, pronunciation-derived, or visual speech representation associated with the respective candidate text string;

computing, for each of the at least two candidate text strings, a fused score based at least in part on a text score from the autocorrect engine or spell-correction engine and the lip-alignment score for the respective candidate text string;

reordering at least a portion of the text-origin candidate list based at least in part on the fused scores; and outputting, through the keyboard-based text-entry interface, a correction result for the typed string, the correction result comprising a reordered candidate list, a suggested replacement, or an automatically inserted replacement.

2. The method of claim 1, wherein the one or more visual speech cues comprise one or more of a viseme sequence, a partial viseme sequence, a syllable count, a syllable-peak sequence, mouth landmark trajectories, mouth-opening measurements, peak timing information, visual articulatory features, or learned visual embeddings derived from image data of a mouth region.

3. The method of claim 1, wherein the reference viseme, syllable, phoneme, pronunciation-derived, or visual speech representation associated with a candidate text string is obtained from one or more of a pronunciation lexicon, a grapheme-to-phoneme model, a stored template library, a user-specific template, a learned model, or candidate metadata associated with the candidate text string.

4. The method of claim 1, wherein computing the lip-alignment score comprises comparing the visual speech cues with the reference representation using dynamic time warping, edit distance, confusion-weighted viseme edit distance, syllable-consistency scoring, template matching, transition-likelihood scoring, neural matching, or a combination thereof.

5. The method of claim 1, further comprising:

receiving whisper-level audio evidence associated with entry of the typed string;

computing, for each of the at least two candidate text strings, a whisper-alignment score from the whisper-level audio evidence; and computing the fused score based at least in part on the text score, the lip-alignment score, and the whisper-alignment score.

6. The method of claim 5, wherein computing the fused score comprises weighting active modalities using confidence values associated with the active modalities, and wherein a modality that is unavailable or inactive is omitted from weight normalization.

7. The method of claim 1, wherein outputting the correction result comprises automatically inserting a top-ranked candidate text string only when the top-ranked candidate text string satisfies a confidence rule comprising at least one of a score threshold, a margin over a runner-up candidate, an entropy threshold, or stability over successive updates.

8. The method of claim 1, wherein the lip-movement evidence is used together with the typed string and the text-origin candidate list to disambiguate among candidate text strings, without requiring the lip-movement evidence by itself to uniquely identify the candidate text string selected as the correction result.

9. The method of claim 1, further comprising processing image frames containing the lip-movement evidence locally on a user device and discarding raw image frames after feature extraction, after candidate scoring, or after completion of correction processing for the typed string.

10. A computer-implemented method for generating correction candidates for text input, the method comprising:

receiving, by one or more processors, a typed string entered through a keyboard-based text-entry interface;

receiving lip-movement evidence captured by an imaging sensor while or in association with entry of the typed string;

generating, from the typed string alone, a standard autocorrect candidate list comprising one or more candidate text strings;

deriving, from the lip-movement evidence, one or more visual speech cues comprising a syllable count, a coarse phoneme sequence, a viseme sequence, a partial viseme sequence, a mouth-shape cue, or another lip-derived candidate cue;

generating, based at least in part on the typed string, a text-derived candidate pool;

using the one or more visual speech cues before or during candidate generation to retrieve, add, or inject one or more candidate text strings, including at least one candidate text string that was not present in the standard autocorrect candidate list generated from the typed string alone;

forming a fused candidate set comprising candidates derived from the typed string and candidates retrieved, added, or injected using the one or more visual speech cues;

scoring candidate text strings in the fused candidate set using both text-derived evidence and lip-derived evidence; and outputting, through the keyboard-based text-entry interface, a correction result for the typed string based at least in part on the scoring.

11. The method of claim 10, wherein the text-derived candidate pool is generated using a relaxed text gate that is broader than a standard autocorrect threshold, the relaxed text gate using edit distance, keyboard-adjacency cost, language-model probability, prefix consistency, or a combination thereof.

12. The method of claim 10, wherein the one or more visual speech cues comprise one or more of an estimated syllable count, a likely first viseme, a likely last viseme, a salient mouth-shape class, a partial viseme sequence, a visual-vowel pattern, an onset class, an ending class, or a learned visual embedding.

13. The method of claim 10, wherein retrieving, adding, or injecting the one or more candidate text strings comprises querying a viseme-syllable index, a pronunciation index, a phonetic index, a visual-template library, an embedding index, or a candidate metadata index.

14. The method of claim 10, wherein the at least one candidate text string that was not present in the standard autocorrect candidate list is retrieved, added, or injected based on expected visual speech characteristics rather than based solely on edit distance from the typed string, and wherein a text-derived score for the at least one candidate text string is assigned using a fallback score, a relaxed-edit-distance score, a language-model score, or another normalized text-derived score.

15. The method of claim 10, further comprising receiving whisper-level audio evidence and using the whisper-level audio evidence to retrieve, add, inject, prune, downrank, or score one or more candidate text strings in the fused candidate set.

16. The method of claim 10, further comprising computing a cue-confidence value for at least one lip-derived candidate cue and using the at least one lip-derived candidate cue as a pruning cue to remove or downrank candidate text strings having expected visual speech characteristics inconsistent with the pruning cue when the cue-confidence value satisfies a pruning threshold.

17. The method of claim 10, wherein at least one of retrieving, adding, or injecting candidate text strings, forming the fused candidate set, or scoring candidate text strings in the fused candidate set comprises using a learned multimodal model that receives a representation of the typed string and a representation of the lip-movement evidence and produces one or more candidate text strings, a joint output distribution, a score vector, or a ranked candidate list for correction of the typed string.

18. A text-entry correction system comprising:

one or more processors; and one or more memories storing instructions that, when executed by the one or more processors, cause the text-entry correction system to:

receive typed input through a keyboard-based text-entry interface;

receive lip-movement evidence from an imaging sensor when a lip-movement input channel is active;

receive whisper-level audio evidence from a microphone or audio interface when a whisper-level audio input channel is active;

operate a shared autocorrect or spell-correction pipeline using one, two, or all of a typed-input channel, the lip-movement input channel, and the whisper-level audio input channel without requiring explicit user toggling between a typing mode, a mouthing mode, a whispering mode, or a mixed-input mode;

when the typed-input channel is active, generate or receive candidate text strings based at least in part on the typed input;

when the lip-movement input channel is active, generate lip-derived evidence for candidate scoring, candidate reordering, candidate retrieval, candidate pruning, or candidate injection;

when the whisper-level audio input channel is active, generate audio-derived evidence for candidate scoring, candidate reordering, candidate retrieval, candidate pruning, or candidate injection;

combine available evidence from the active input channels to produce a correction result for a current typed string or current text-entry state; and output the correction result through the keyboard-based text-entry interface as a suggestion, reordered candidate list, or automatic replacement.

19. The system of claim 18, wherein the text-entry correction system is implemented as an operating-system keyboard service, an input method editor, a mobile keyboard extension, an application-level text-entry service, a desktop input method, a wearable-device text-entry system, or an extended-reality text-entry system.

20. The system of claim 18, wherein the imaging sensor comprises or is coupled to a front-facing camera, an external webcam, a depth camera, an infrared sensor, a wearable camera, a smart-glasses camera, a headset camera, or another sensor configured to capture mouth-region motion.

21. The system of claim 18, wherein the whisper-level audio evidence comprises whispered speech, near-whispered speech, subvocal audio, low-volume speech, phoneme posterior information, automatic-speech-recognition hypotheses, or acoustic features associated with entry of a candidate text string.

22. The system of claim 18, wherein the instructions further cause the text-entry correction system to gate activation of the imaging sensor, the whisper-level audio input channel, or both, based on text-entry activity, user permission, power state, privacy setting, application context, tracking quality, audio level, or modality confidence.

23. The system of claim 18, wherein the shared autocorrect or spell-correction pipeline normalizes modality weights over only active input channels, and wherein an inactive or unavailable input channel is omitted from multimodal scoring or assigned a zero contribution to multimodal scoring.

24. The system of claim 18, wherein the instructions further cause the text-entry correction system to perform user-specific calibration comprising generating or updating one or more of visual baselines, viseme templates, mouth-shape centroids, syllable-peak thresholds, lip-alignment thresholds, audio thresholds, or user-specific correction thresholds.

25. A computer-implemented method for correcting text input using an existing spell-correction engine, the method comprising:

receiving, by one or more processors, a current typed string entered through a keyboard-based text-entry interface;

receiving lip-movement evidence, whisper-level audio evidence, or both, while or in association with entry of the current typed string;

deriving, from the lip-movement evidence, the whisper-level audio evidence, or both, a phoneme, viseme, syllable, pronunciation-derived, or visual speech representation associated with an intended text string;

generating, from the phoneme, viseme, syllable, pronunciation-derived, or visual speech representation, a bounded set of plausible misspellings or orthographic proxy strings;

submitting the current typed string and the bounded set of plausible misspellings or orthographic proxy strings to the existing spell-correction engine;

receiving, from the existing spell-correction engine, one or more recovered candidate text strings; and outputting, through the keyboard-based text-entry interface, a correction result based at least in part on the one or more recovered candidate text strings.

26. The method of claim 25, wherein the phoneme, viseme, syllable, pronunciation-derived, or visual speech representation comprises one or more of a phoneme sequence, a phoneme-likelihood sequence, a phoneme posterior representation, a viseme sequence, a viseme-to-phoneme approximation, a consonant-vowel pattern, a syllable-linked representation, or another symbolic or semi-symbolic articulatory representation.

27. The method of claim 25, wherein generating the bounded set of plausible misspellings or orthographic proxy strings comprises using grapheme-generation rules, phoneme-to-grapheme alternatives, viseme-to-grapheme alternatives, beam search, a stochastic grapheme model, a grapheme-to-phoneme model used in reverse, a sequence-to-sequence model, or a learned text-generation model.

28. The method of claim 25, further comprising forming an input bundle comprising the current typed string and the bounded set of plausible misspellings or orthographic proxy strings, de-duplicating strings in the input bundle, limiting the input bundle to a maximum number of strings, and submitting the input bundle to the existing spell-correction engine.

29. The method of claim 25, further comprising rescoring the one or more recovered candidate text strings using at least one of a spell-correction-engine score, a language-model score, a lip-alignment score, a candidate-specific visual compatibility score, a text-derived score, or an audio-derived score.

30. The method of claim 25, wherein outputting the correction result comprises automatically inserting a recovered candidate text string when a confidence rule is satisfied and, when the confidence rule is not satisfied, leaving the current typed string unchanged while presenting one or more recovered candidate text strings as suggestions.

* * * * *